United States Patent
Okumura et al.

(10) Patent No.: US 11,620,414 B2
(45) Date of Patent: Apr. 4, 2023

(54) DISPLAY APPARATUS, DISPLAY METHOD, AND IMAGE PROCESSING SYSTEM

(71) Applicants: Ayako Okumura, Kanagawa (JP); Susumu Fujioka, Kanagawa (JP)

(72) Inventors: Ayako Okumura, Kanagawa (JP); Susumu Fujioka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 276 days.

(21) Appl. No.: 17/083,344

(22) Filed: Oct. 29, 2020

(65) Prior Publication Data

US 2021/0133363 A1    May 6, 2021

(30) Foreign Application Priority Data

Oct. 30, 2019   (JP) .............................. JP2019-197897

(51) Int. Cl.
  *G06F 21/84*  (2013.01)
  *G09G 3/20*   (2006.01)
  *G06F 21/34*  (2013.01)

(52) U.S. Cl.
  CPC .............. *G06F 21/84* (2013.01); *G06F 21/34* (2013.01); *G09G 3/20* (2013.01); *G09G 2354/00* (2013.01); *G09G 2358/00* (2013.01); *G09G 2370/02* (2013.01); *G09G 2370/042* (2013.01)

(58) Field of Classification Search
  CPC ........... G06F 21/84; G06F 21/34; G09G 3/20; G09G 2354/00; G09G 2358/00; G09G 2370/02; G09G 2370/042
  See application file for complete search history.

(56) References Cited

U.S. PATENT DOCUMENTS

| | | | |
|---|---|---|---|
| 2015/0002435 A1* | 1/2015 | Shimizu | G06F 3/0416 345/173 |
| 2017/0177190 A1 | 6/2017 | Inoue et al. | |
| 2018/0234579 A1 | 8/2018 | Watanabe et al. | |
| 2018/0321840 A1 | 11/2018 | Watanabe et al. | |

FOREIGN PATENT DOCUMENTS

JP    2017-112581    6/2017

\* cited by examiner

*Primary Examiner* — Abbas I Abdulselam
(74) *Attorney, Agent, or Firm* — Xsensus LLP

(57) ABSTRACT

A display apparatus capable of displaying previously-displayed presented data stored in association with meeting identification information identifying each meeting, includes circuitry configured to receive particular meeting identification information stored at an information processing apparatus from the information processing apparatus; and display at least a part of particular presented data associated with the received particular meeting identification information, on a display.

13 Claims, 40 Drawing Sheets

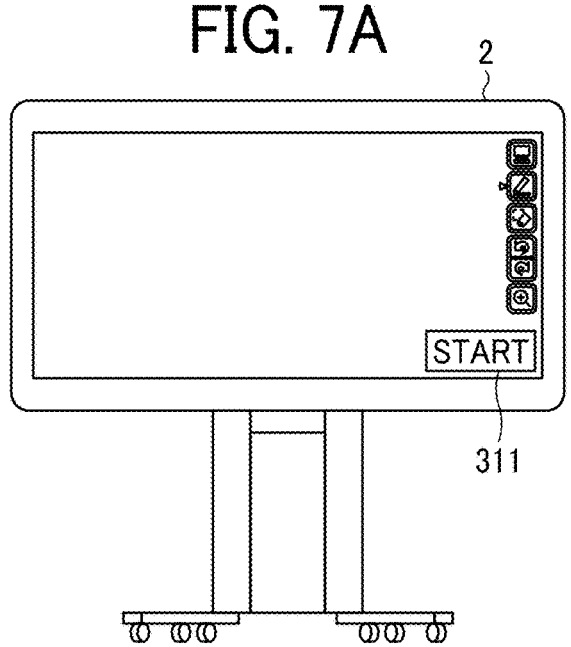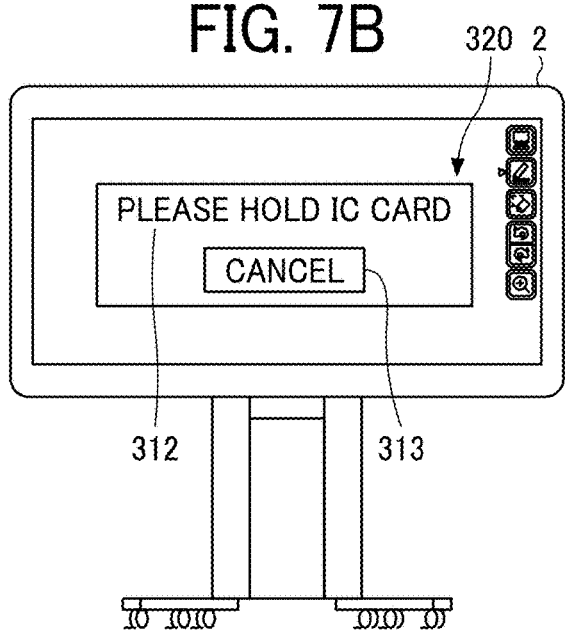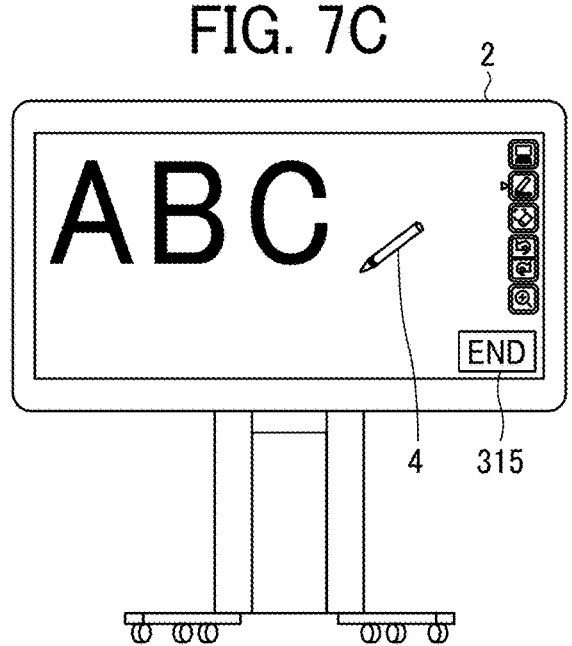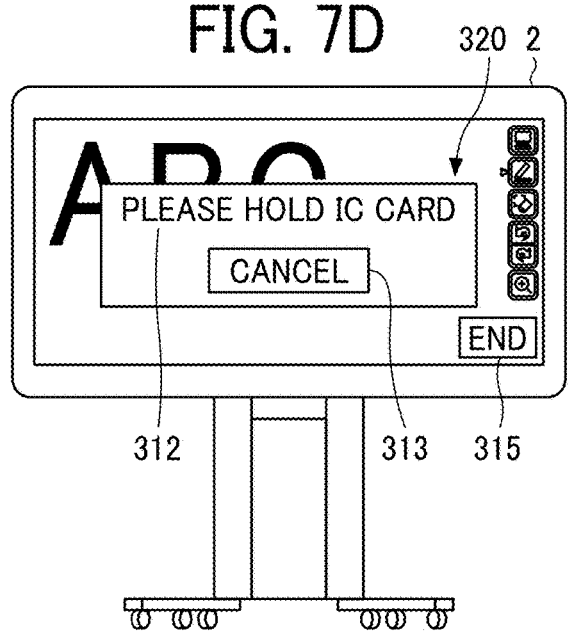

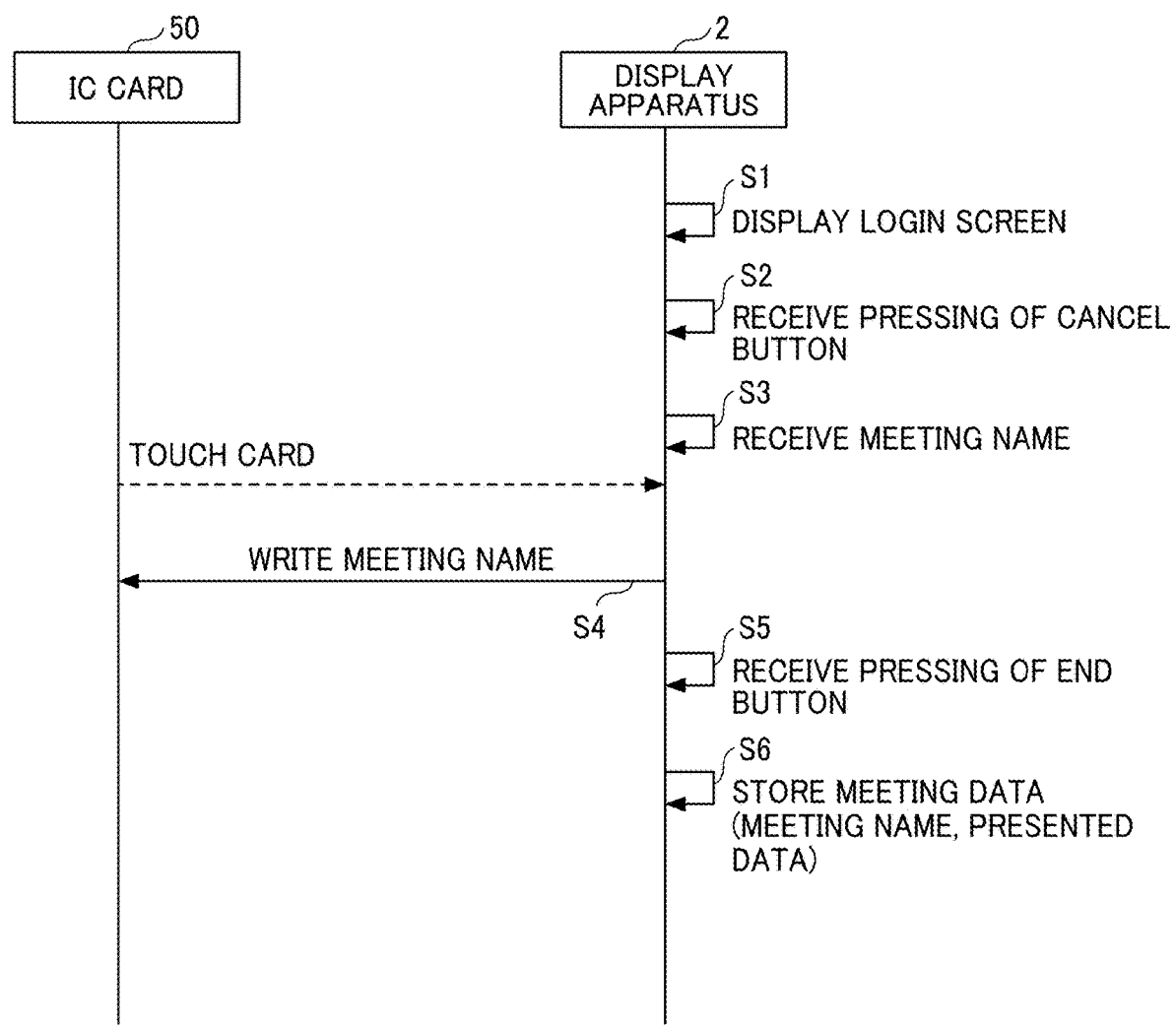

FIG. 19

| MEETING ROOM ID | MEETING ID |
|---|---|
| A | 12398 |
| B | 5463 |

FIG. 21

| USER ID | PRESENTED DATA | |
|---|---|---|
| | SELECT MEETING FOR DISPLAY | |
| 458723 | ABC | |
| 458723 | GHK | LM |
| 25799 | UVW | |
| 36789 | XYZ | |

DISPLAY

FIG. 39

| MEETING ID | PRESENTED DATA | LAST PAGE NO. |
|---|---|---|
| 12398 | ABC | 2p |
| 77236 | UVW | 5p |
| ... | ... | ... |

FIG. 40

| MEETING NAME | PRESENTED DATA | LAST PAGE NO. |
|---|---|---|
| BUSINESS REGULAR MEETING | ABC | 2p |
| DEVELOPMENT REGULAR MEETING | UVW | 5p |
| ... | ... | ... |

FIG. 41

| MEETING ID | MEETING ROOM ID | PRESENTED DATA | LAST PAGE NO. |
|---|---|---|---|
| 12398 | A | ABC | 2p |
| 77236 | B | UVW | 5p |
| ... | ... | ... | ... |

FIG. 42

| MEETING ID | USER ID | PRESENTED DATA | LAST PAGE NO. |
|---|---|---|---|
| 12398 | 458723 | ABC | 2p |
| 234567 | 458723 | GHK    LM | 5p |
| 5463 | 25799 | UVW | 1p |
| 345678 | 36789 | XYZ | 3p |
| ... | ... | ... | ... |

FIG. 43

| MEETING ID | MEETING DATE | PRESENTED DATA | LAST PAGE NO. |
|---|---|---|---|
| 12398 | 2019/1/23 14:06 | ABC | 2p |
| 5463 | 2019/1/17 10:58 | UVW | 5p |
| ... | ... | ... | ... |

DISPLAY APPARATUS, DISPLAY METHOD, AND IMAGE PROCESSING SYSTEM

CROSS-REFERENCE TO RELATED APPLICATION

This application claims priority pursuant to 35 U.S.C. § 119(a) to Japanese Patent Application No. 2019-197897, filed on Oct. 30, 2019 in the Japan Patent Office, the disclosure of which is incorporated by reference herein in its entirety.

BACKGROUND

Technical Field

This disclosure relates to a display apparatus, a display method, and an image processing system.

Background Art

When users use display apparatuses such as electronic information boards, the users may enter authentication information to the display apparatuses to log in, and then the users may be allowed to use the display apparatuses if the login is successful. Further, as to the login methods, the users hold integrated circuit (IC) cards over IC card readers disposed for the display apparatuses.

A technology that displays presented data used and stored for gatherings, such as meetings, using the user authentication, is known. For example, a display apparatus stores the presented data and user identifier (ID) in association with each other, and when the same user logs in the display apparatus later, the display apparatus displays the stored presented data.

SUMMARY

As one aspect of the present disclosure, a display apparatus capable of displaying previously-displayed presented data stored in association with meeting identification information identifying each meeting detection apparatus is devised. The display apparatus includes circuitry configured to receive particular meeting identification information stored at an information processing apparatus from the information processing apparatus; and display at least a part of particular presented data associated with the received particular meeting identification information, on a display.

As another aspect of the present disclosure, a method of displaying previously-displayed presented data stored in association with meeting identification information identifying each meeting is devised. The method includes receiving particular meeting identification information stored at an information processing apparatus from the information processing apparatus; and displaying at least a part of particular presented data associated with the received particular meeting identification information, on a display.

As another aspect of the present disclosure, an image processing system is devised. The image processing system includes an information processing apparatus configured to store meeting identification information identifying each meeting; and a display apparatus configured to store presented data, displayed on the display apparatus, in association with the meeting identification information. The information processing apparatus includes a memory that stores the meeting identification information transmitted from the display apparatus. The display apparatus includes circuitry configured to receive particular meeting identification information stored at the information processing apparatus from the information processing apparatus; and display at least a part of particular presented data associated with the received particular meeting identification information, on a display.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIGS. 7A, 7B, 7C, and 7D illustrate an example of screen displayed on a display apparatus from a start to an end of meeting according to an embodiment 1 of this disclosure;

FIG. 13 is an example of a sequence diagram illustrating a flow of processing performed by a display apparatus at a start of a meeting when a meeting name is not stored according to an embodiment 2 of this disclosure;

FIG. 19 illustrates an example of meeting room ID and meeting ID displayed on a display according to an embodiment 3 of this disclosure;

FIG. 21 is an example of a list of presented data displayed on a display according to an embodiment 4 of this disclosure;

FIG. 39 is an example of meeting data stored in the meeting data storage unit 301.

FIG. 40 is an example of meeting data stored in the meeting data storage unit 301 of the embodiment 2.

FIG. 41 is an example of meeting data stored in the meeting data storage unit 301 of the embodiment 3.

FIG. 42 is an example of meeting data stored in the meeting data storage unit 301 of the embodiment 4.

FIG. 43 is an example of meeting data stored in the meeting data storage unit 301 of the embodiment 5.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

Further, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments of a display apparatus and a display method performed by the display apparatus of this disclosure with reference to the accompanying drawings.

Embodiment 1

Outline of Processing of Display Apparatus

Figure 1:
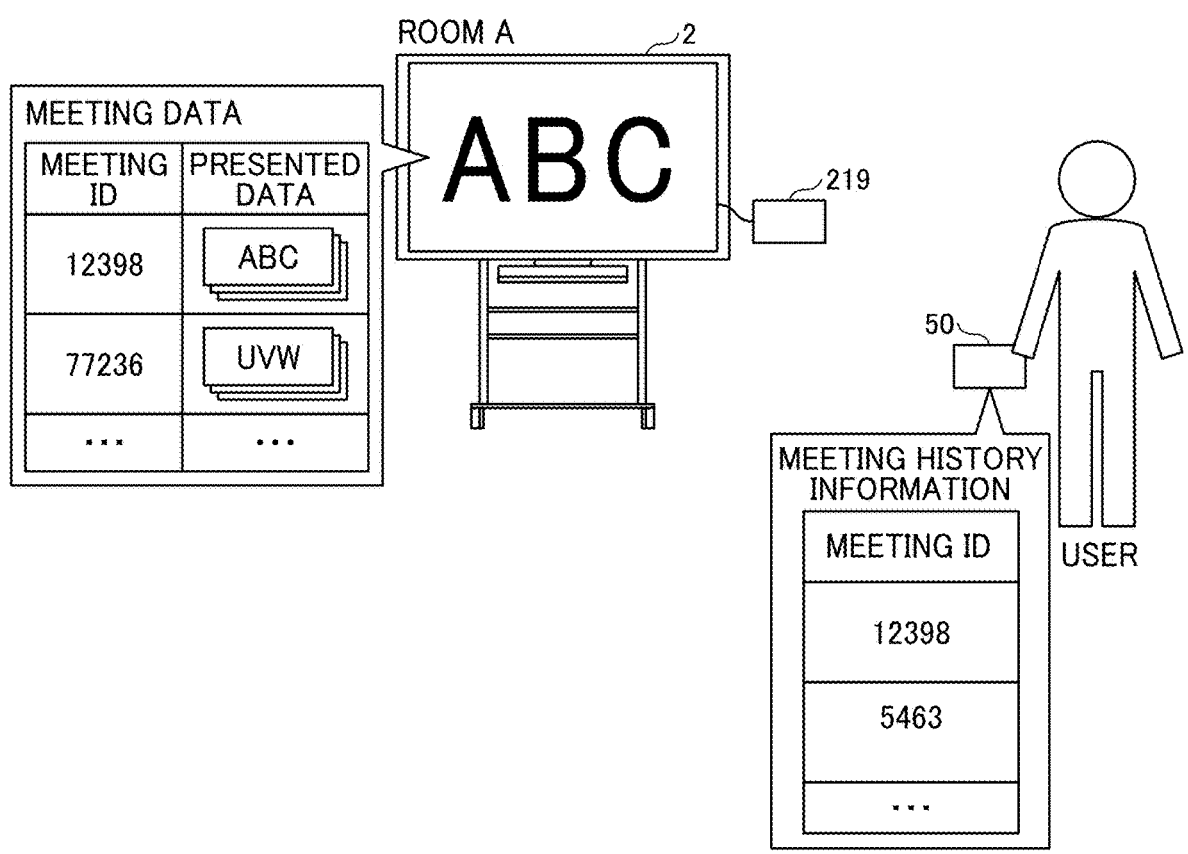
FIG. 1 is a diagram illustrating a process of displaying meeting data using a display apparatus according to an embodiment of this disclosure.

FIG. 1 is a diagram illustrating a process of displaying meeting data using a display apparatus 2. As illustrated in FIG. 1, an integrated circuit (IC) card 50 stores meeting identification information, such as meeting identifier (ID) of meeting to which a user has participated. Further, data displayed on the display apparatus 2 during a meeting is stored at the display apparatus 2 in association with the meeting ID, for example, at an end of the meeting (e.g., when closing the meeting). Hereinafter, the data displayed on the display apparatus 2 may be simply referred to as presented data, previously-displayed data, used data, or reference material data.

When the user holds the IC card 50 over a short-range communication circuit 219 of the display apparatus 2, the display apparatus 2 can acquire or obtain the meeting ID stored in the IC card 50. Then, the display apparatus 2 reads out meeting data of the meeting identified by the meeting ID, and displays at least a part of presented data included in the meeting data. With this configuration, the user can resume the meeting from the end of past or previously performed meeting by only holding the IC card 50 over the display apparatus 2. Further, the user authentication is not required.

Further, the user is not required to search a target meeting from many meetings and designate a storage location (folder, URL) of the to-be resumed meeting data, with which a time period counted from an entry of participant into a meeting room until starting the meeting can be shortened.

Terms

A meeting is a gathering that people gather together for consultation and discussion. There are various types of gathering, such as meeting, gathering meeting, consultation meeting, study meeting, class, seminar, and presentation meeting.

The resuming of meeting means displaying the presented data used in the meeting that was performed previously. Further, the presented data to be displayed may be a last page or a page when an end button of meeting was pressed previously.

The presented data is data being displayed on the display apparatus 2 during the meeting. For example, the presented data is an image capturing a stroke or an image acquired from PC, and may be stored page-by-page.

System Configuration

Figure 2:
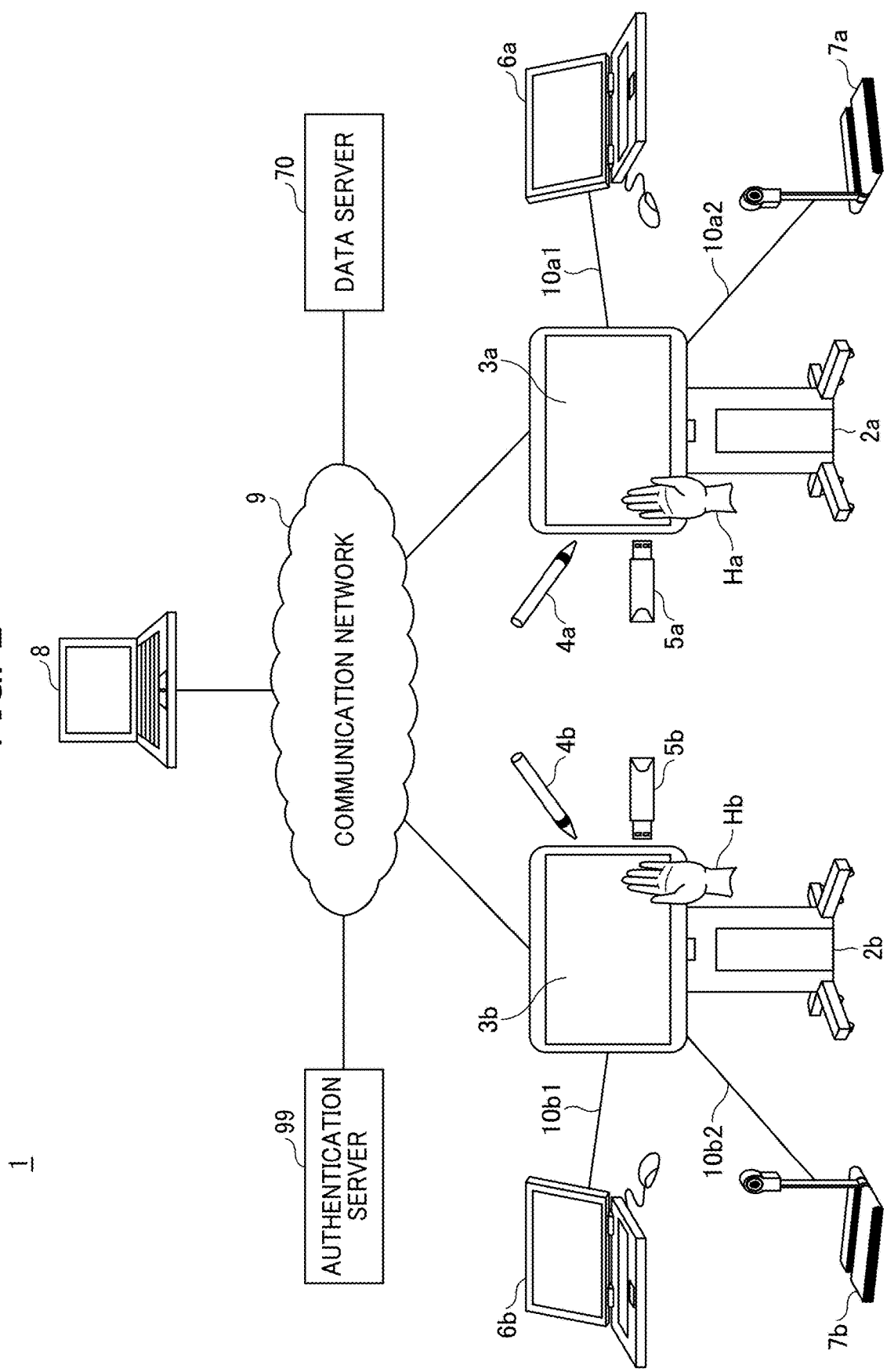
FIG. 2 is an example of configuration of an image processing system according to an embodiment 1 of this disclosure.

FIG. 2 is an example of configuration of an image processing system 1 according to the embodiment 1. In FIG. 2, two display apparatuses 2a and 2b, and two electronic pens 4a and 4b are illustrated to simplify the description, but three or more display apparatuses 2 and electronic pens 4 can be used.

As illustrated in FIG. 2, the image processing system 1 includes, for example, a plurality of display apparatuses 2a and 2b, a plurality of electronic pens 4a and 4b, a plurality of universal serial bus (USB) memories 5a and 5b, and a plurality of notebook personal computers (PCs) 6a and 6b, a plurality of teleconference terminals 7a and 7b (video meeting terminals), and a personal computer (PC) 8.

Further, the display apparatuses 2a and 2b and PC 8 are communicatively connected via communication network 9. Further, displays 3a and 3b are respectively provided for the display apparatuses 2a and 2b.

Further, the display apparatus 2a can display, on the display 3a, an image drawn by an event caused by the electronic pen 4a when a pen tip of the electronic pen 4a or a pen end of the electronic pen 4a touches the display 3a.

Further, the display apparatus 2a can change an image displayed on the display 3a based on an event caused by hand Ha including a finger of user, such as enlargement, reduction, and page turning, in addition to the event caused by the electronic pen 4a.

Further, the display apparatus 2a can be connected to the USB memory 5a, and the display apparatus 2a can read out an electronic file, such as portable document format (PDF), from the USB memory 5a, and the display apparatus 2a can record an electronic file into the USB memory 5a.

Further, the display apparatus 2a is connected to the notebook PC 6a via a cable 10a1, which allows communication using standards, such as DisplayPort, Digital Visual Interface (DVI), and High-Definition Multimedia Interface (HDMI: registered trademark), and Video Graphics Array (VGA).

Further, the display apparatus 2a generates an event by a contact onto the display 3a, and processes the event information in the same manner as the event from an input device, such as mouse or keyboard.

Similarly, the display apparatus 2a is connected to the teleconference terminal 7a (video meeting terminal) via a cable 10a2 capable of communication using the above described standards.

Further, the notebook PC 6a and the teleconference terminal 7a may communicate with the display apparatus 2a using wireless communication conforming to various wireless communication protocols, such as Bluetooth (registered trademark).

Further, in another location where the display apparatus 2b is disposed, as similar to the display apparatus 2a, the display apparatus 2b including the electronic pen 4b, the USB memory 5b, the notebook PC 6b, the teleconference terminal 7b, the cables 10b1 and 10b2 are used in the same manner. Further, an image displayed on the display 3b can be changed based on an event generated by hand Hb of user or the like.

With this configuration, an image drawn on the display 3a of the display apparatus 2a used at one location is displayed on the display 3b of the display apparatus 2b used at another location, and an image drawn on the display 3b of the display apparatus 2b used at another location is displayed on the display 3a of the display apparatus 2a used at the one location. Thus, as to the image processing system 1, the remote sharing processing, which shares the same image at remote locations, can be performed, and thereby the image processing system 1 can be useful and convenient for a meeting performed by linking the remote locations.

Further, in the following description, when any one of the plurality of display apparatuses 2 is denoted, the "display apparatus 2" is used. Further, when any one of the plurality of displays 3 is denoted, the "display 3" is used. Further, when any one of the plurality of electronic pens 4a and 4b is denoted, the "electronic pen 4" is used. Further, when any one of the plurality of USB memories 5a and 5b is denoted, the "USB memory 5" is used. Further, when any one of the plurality of notebook PCs 6a and 6b is denoted, the "notebook PC 6" is used. Further, when any one of the plurality of teleconference terminals 7a and 7b is denoted, the "teleconference terminal 7" is used. Further, when any one of the plurality of user hands is denoted, the "hand H" is used. Further, when any one of the cables 10a1, 10a2, 10b1 and 10b2 is denoted, the "cable 10" is used.

In the embodiment, an electronic information board is described as an example of the display apparatus 2, but is not limited thereto. For example, the display apparatus 2 may be a telestrator used in an electronic signage (digital signage), sport or weather forecast, or a remote image (video) diagnostic device. A general purpose information processing apparatus, such as PC, may be used as the display apparatus 2 by executing an application.

Further, the notebook PC 6 is described as an example of the information processing terminal, but is not limited thereto. For example, the information processing terminal may be a terminal capable of supplying image frames such as desktop PC, tablet PC, personal digital assistant (PDA), digital video camera, digital camera, game machine, or the like.

Further, the communication network includes, for example, the Internet, local area network (LAN), mobile telephone network, or the like.

Further, in the embodiment, the USB memory is described as an example of the recording medium, but is not limited thereto. For example, the recording medium may be any recording medium, such as secure digital (SD) card.

Further, a data server 70 and an authentication server 99 are connected to the communication network 9. The data server 70 is an information processing apparatus used for storing the meeting data. The data server 70 is provided as a server used by the plurality of display apparatuses 2 as a common server. When a user logs in from any one of the display apparatuses 2, the data server 70 can provide the meeting data associated with the meeting ID stored in the IC card 50 of the user to the display apparatus 2. An embodiment utilizing the data server 70 will be described later.

The authentication server 99 authenticates the user, and transmits the user identifier (ID) and the user access right information to the display apparatus 2 when the user authentication is successful. The user access right information is used to restrict operations that the user can perform using the display apparatus 2. Further, the authentication server 99 or the function thereof may be set in the display apparatus 2.

The authentication server 99 can be, for example, a lightweight directory access protocol (LDAP) server. The LDAP is a protocol for connecting to a directory service that controls information on network devices and users. The directory service is a service that centrally manages various information existing on a network, and provides functions such as searching.

A client (e.g., the display apparatus 2 in the embodiment) is connected to the LDAP server using transmission control protocol (TCP) port 389 (default port number), and performs operations, such as searching, addition, deletion, and correction of entry (a set of related attributes), which is composed of attribute (internal name list, such as unit name and person name).

For example, if the user ID and password of multiple services are registered as attribute of one user ID, each service can perform authentication processing by only referring to the LDAP server. Since an administrator can manage information centrally, the administrator can reduce the amount of time required to change user information in the directory of each service. The LDAP server uses, for example, open software, such as OpenLDAP, and commercial software, such as Active Directory (registered trademark) of Microsoft.

Hardware Configuration

Figure 3:
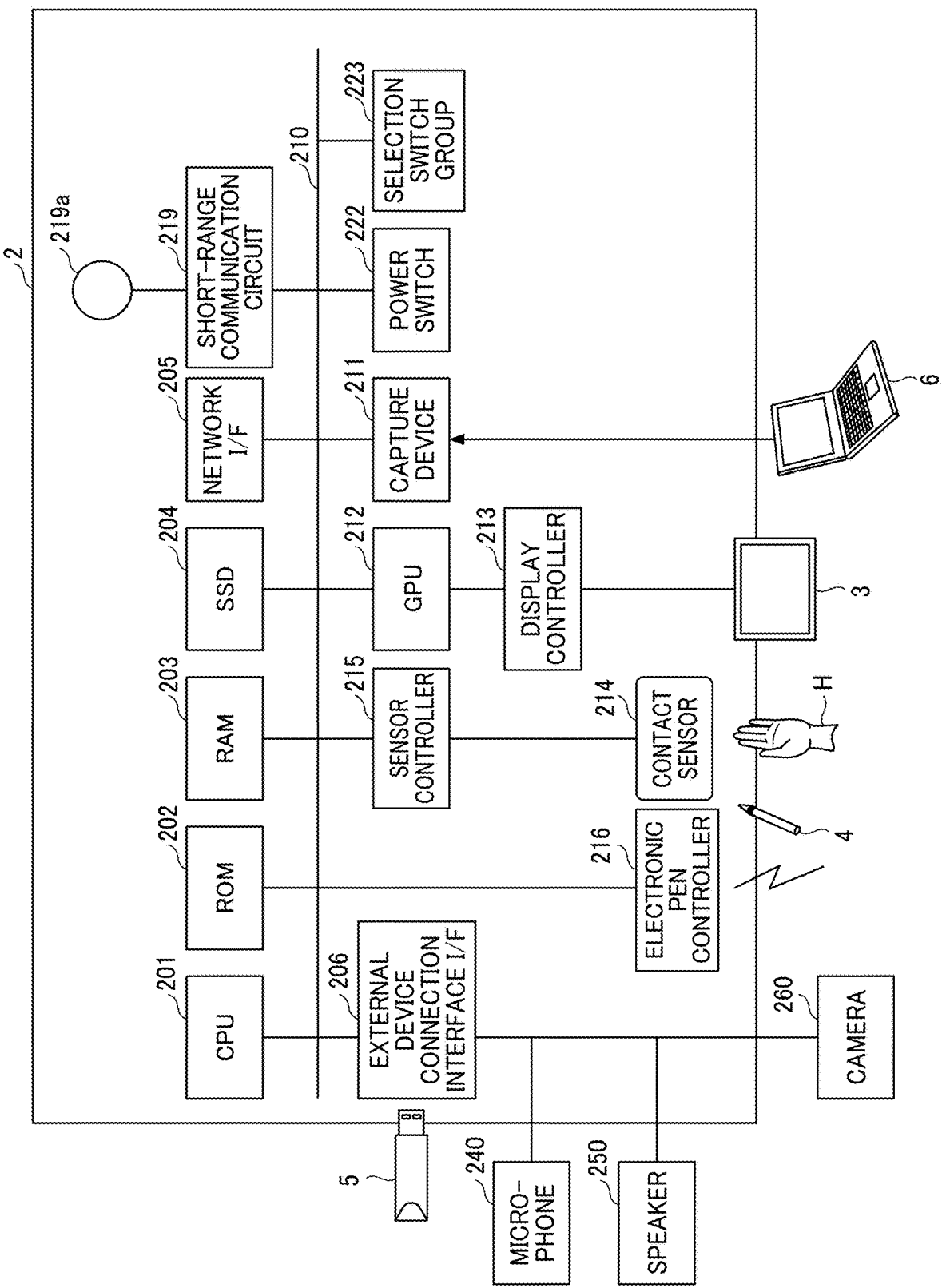
FIG. 3 is an example of configuration of hardware block diagram of a display apparatus according to an embodiment 1 of this disclosure.

FIG. 3 is an example of configuration of hardware block diagram of the display apparatus 2. As illustrated in FIG. 3, the display apparatus 2 includes, for example, central processing unit (CPU) 201, read only memory (ROM) 202, random access memory (RAM) 203, solid state drive (SSD) 204, network interface (I/F) 205, and external device connection interface (I/F) 206.

The CPU 201 controls the operation of the display apparatus 2 entirely. The ROM 202 stores programs used to drive the CPU 201 such as initial program loader (IPL). The RAM 203 is used as a work area of the CPU 201. The SSD 204 stores various data such as programs for the display apparatus 2.

The network I/F 205 controls communication with the communication network 9. The external device connection I/F 206 is an interface for connecting various external devices. The external device is, for example, universal serial bus (USB) memory 5, externally attachable device, such as microphone 240, speaker 250, and camera 260.

Further, the display apparatus 2 includes, for example, capture device 211, graphics processing unit (GPU) 212, display controller 213, contact sensor 214, sensor controller 215, electronic pen controller 216, short-range communication circuit 219, antenna 219a for the short-range communication circuit 219, power switch 222, and selection switch group 223.

The capture device 211 causes the display 3 to display image information input from the notebook PC 6 on the display as still image or movie image.

The GPU 212 is a semiconductor chip that specializes in graphics. The display controller 213 controls and manages the screen display to output the image from the GPU 212 to the display 3 or the like.

The contact sensor 214 detects that the electronic pen 4 and the hand H of user are being into contact on the display 3. The sensor controller 215 controls the processing of the contact sensor 214. The contact sensor 214 performs coordinate input and coordinate detection using the infrared blocking method.

As to the method of inputting coordinates and detecting coordinates, two light emission-reception devices disposed at the upper end corners of the display 3 radiate infrared rays parallel to the display 3, and the infrared rays are reflected by reflective members disposed around the display 3, and then the two light emission-reception receive the light beams coming from the optical path, which is the optical path of the light emitted by the two light emission-reception device.

The contact sensor 214 outputs ID of the infrared ray emitted by the two light emission-reception devices and blocked by an object to the sensor controller 215. The sensor controller 215 specifies or identifies the coordinate position where an object contacts on the display 3.

By communicating with the electronic pen 4, the electronic pen controller 216 determines whether or not a pen tip or pen end touches the display 3.

The short-range communication circuit 219 is a communication circuit, such as near field communication (NFC) and Bluetooth (registered trademark). In the embodiment, an IC card reader/writer is used.

The power switch 222 is a switch for switching ON-OFF of power supply to the display apparatus 2. The selection switch group 223 is, for example, a group of switches used for adjusting the display brightness and colors of the display 3.

Further, the display apparatus 2 includes bus line 210. The bus line 210 is address bus and data bus for electrically connecting each of the components, such as the CPU 201, illustrated in FIG. 3.

Further, the contact sensor 214 can use not only the infrared blocking system, but also various detection unit, such as a touch panel of electrostatic capacitance type that specifies a contact position by detecting a change in capacitance, a touch panel of resistance film type that specifies a contact position based on a voltage change of two resistive films, and a touch panel of electromagnetic induction type that detects a contact position by detecting the electromagnetic induction caused by a contact of an object on the touch panel.

Further, the electronic pen controller 216 can determine whether a user grip portion of the electronic pen 4 or other portion of the electronic pen 4 touches the display 3 in addition to the pen tip and pen end of the electronic pen 4.

Data Server, Authentication Server

Figure 4:
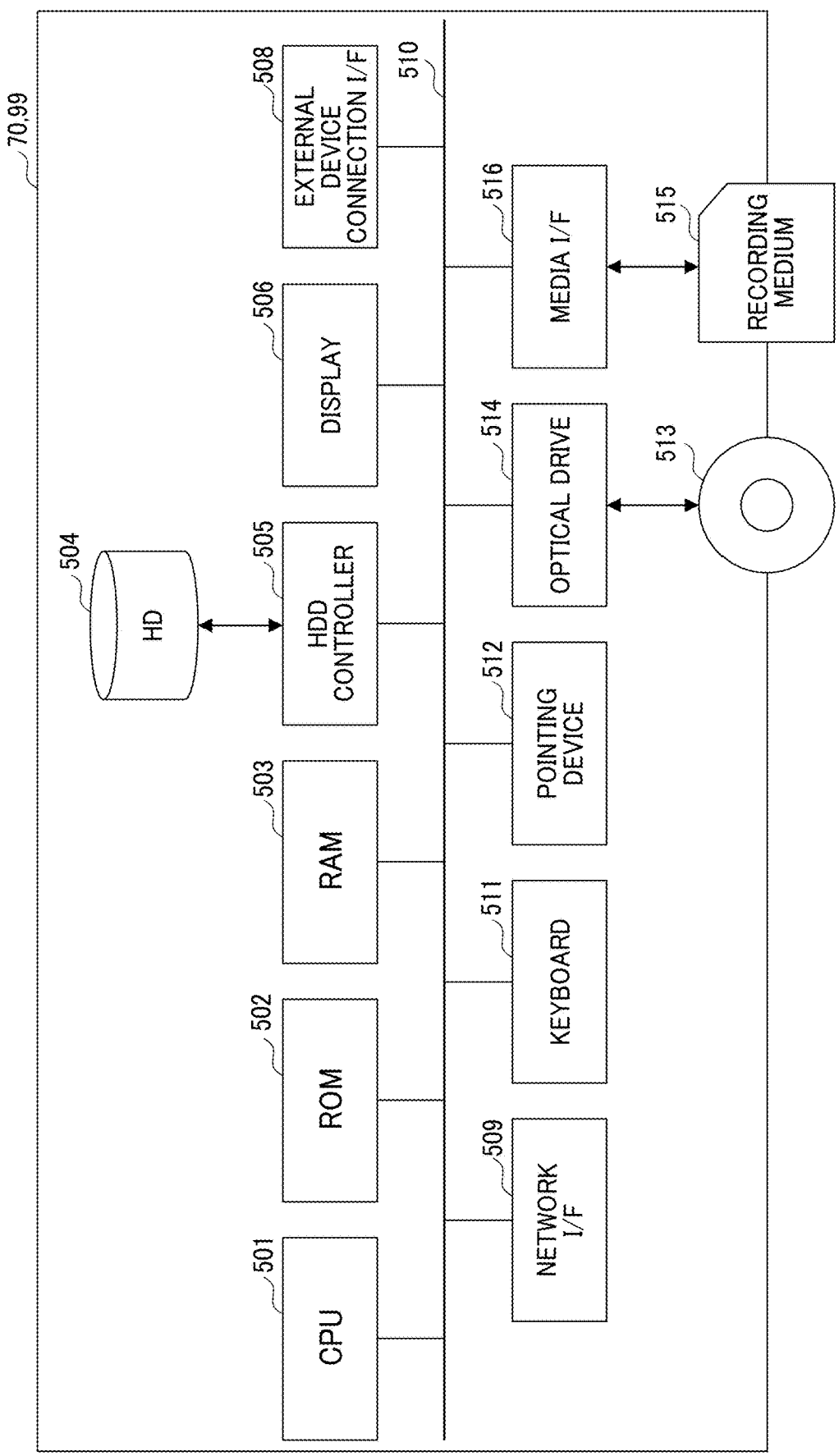
FIG. 4 is an example of configuration of hardware block diagram of a data server or an authentication server according to an embodiment 1 of this disclosure.

FIG. 4 is an example of configuration of hardware block diagram of the data server 70 or the authentication server 99. Hereinafter, a description is given of the hardware configuration of the data server 70.

As illustrated in FIG. 4, the data server 70 is constructed by computer. The data server 70 includes, for example, CPU 501, ROM 502, RAM 503, HD 504, hard disk drive (HDD) controller 505, display 506, external device connection I/F 508, network I/F 509, bus line 510, keyboard 511, pointing device 512, optical drive 514, and media I/F 516.

The CPU 501 controls the operation of the data server 70 entirely. The ROM 502 stores programs to be executed first by the CPU 501, such as initial program reader (IPL). The RAM 503 is used as a work area of the CPU 501.

The HD 504 stores various data, such as programs. The HDD controller 505 controls reading or writing of various data from or to the HD 504 under the control of the CPU 501.

The display 506 displays various information, such as cursor, menu, window, characters, or image.

The external device connection I/F 508 is an interface for connecting various external devices. In this case, the external device is, for example, a USB memory or a printer. The network I/F 509 is an interface for performing data communication using the communication network 9. The bus line 510 is address bus and data bus for electrically connecting each component, such as the CPU 501 illustrated in FIG. 4.

The keyboard 511 is a type of input means including a plurality of keys for inputting characters, letters, numbers, and various instructions. The pointing device 512 is a type of input means for selecting or executing various instructions, selecting processing target, moving a cursor, or the like.

The optical drive 514 controls reading or writing of various data from or to the optical storage medium 513, which is as an example of removable recording medium. Further, the optical storage medium may be compact disk (CD), digital versatile disk (DVD), or Blu-Ray (registered trademark). The media I/F 516 controls reading or writing of data from or to a recording medium 515, such as flash memory.

IC Card

Figure 5:
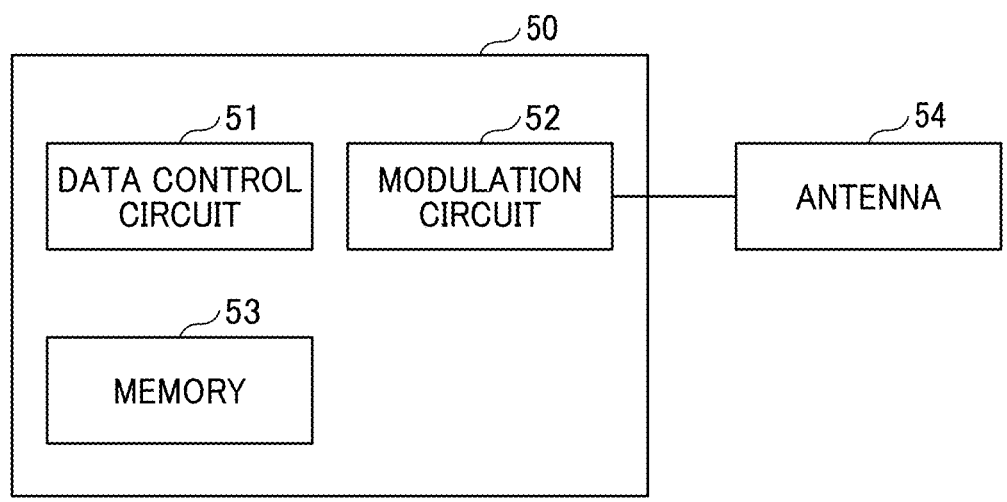
FIG. 5 is an example of configuration of hardware block diagram of an IC card according to an embodiment 1 of this disclosure.

FIG. 5 is a an example of configuration of hardware block diagram of the IC card 50. The IC card 50 has a function of an information processing apparatus. The IC card 50 includes, for example, data control circuit 51, modulation circuit 52, memory 53, and antenna 54 mounted on IC chip.

The data control circuit 51 is, for example, operated using operating system, such as Felica (registered trademark, JIS X 6319-4 standard). The data control circuit 51 stores the meeting ID received by the modulation circuit 52 in the memory 53, and transfers the meeting ID read out from the memory 53 to the modulation circuit 52.

The modulation circuit 52 performs, for example, Manchester encoding using ASK modulation on data transmitted and received from the short-range communication circuit 219.

The memory 53 is a non-volatile memory, such as ferroelectric random access memory (FerRAM). Further, the operating system is not limited to Felica (registered trademark).

When the IC card 50 enters a magnetic field generated by the short-range communication circuit 219, the antenna 54 generates electric power by electromagnetic induction, and supplies the electric power to the IC chip, and performs NFC communication with the short-range communication circuit 219 to perform data writing and reading to the memory 53.

Further, the IC card 50 can be an information processing apparatus having an IC card function, instead of the IC card function only. For example, the IC card 50 can be smartphone, tablet device, or personal digital assistant (PDA) computer.

Functional Configuration

Figure 6:
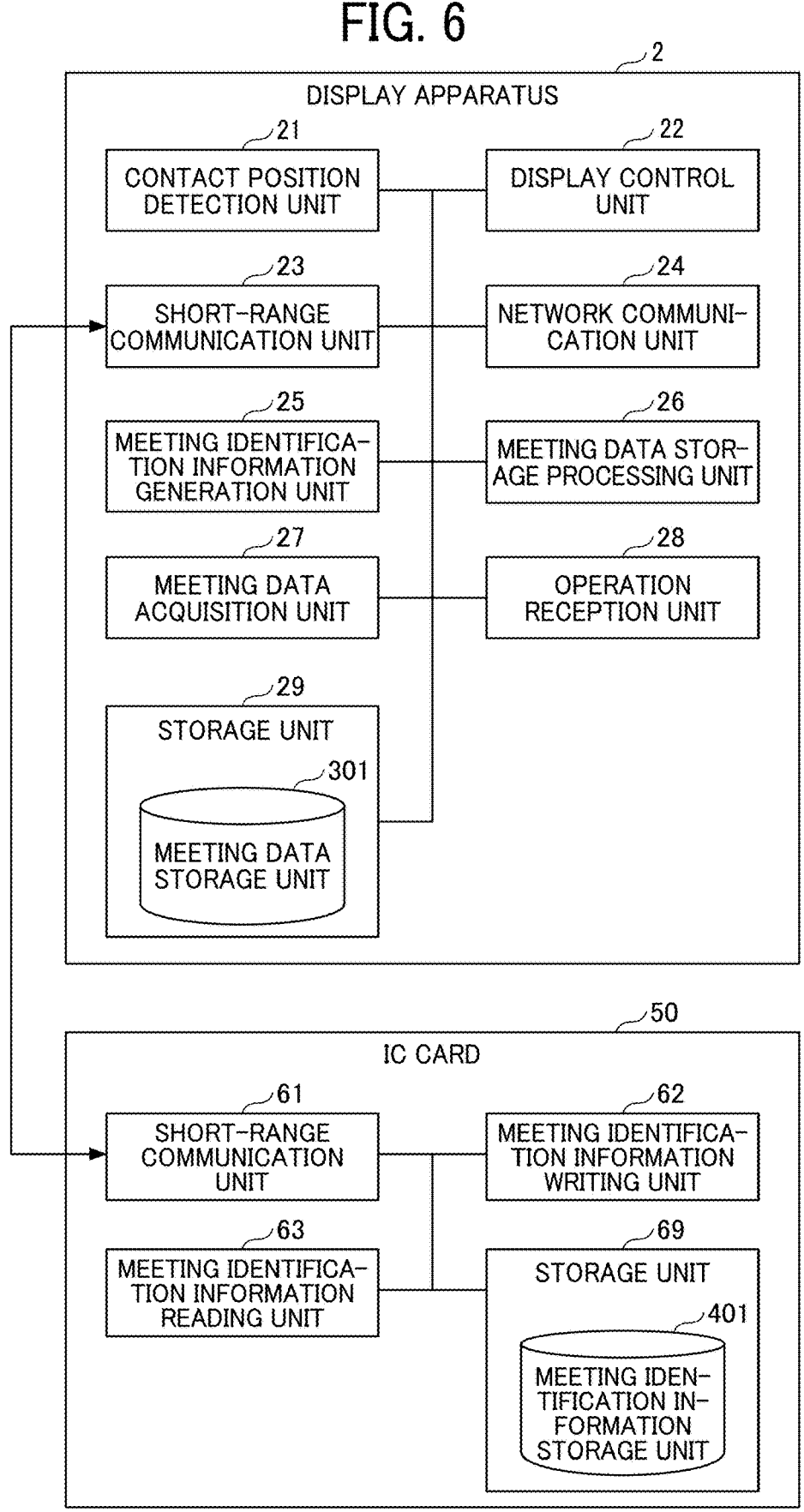
FIG. 6 is an example of configuration of functional block diagram of a display apparatus and IC card according to an embodiment 1 of this disclosure.

FIG. 6 is an example of configuration of functional block diagram of the display apparatus 2 and the IC card 50.

Display Apparatus

As illustrated in FIG. 6, the display apparatus 2 includes, for example, contact position detection unit 21, display control unit 22, short-range communication unit 23, network communication unit 24, meeting identification information generation unit 25, meeting data storage processing unit 26, meeting data acquisition unit 27, and operation reception unit 28. Each of the functional units of the display apparatus 2 is a function or means implemented by any one of the components illustrated in FIG. 3 under the instruction from the CPU 201 executing programs loaded on the RAM 203 from the SSD 204.

The contact position detection unit 21 detects coordinates of the electronic pen 4 or hand H in contact with the touch panel.

The display control unit 22 displays a stroke connecting the coordinates detected by the contact position detection unit 21 on the display 3. Further, the display control unit 22 displays an image being displayed on the notebook PC 6 as still image or movie image. Further, the display control unit 22 displays an operation menu used for receiving a color selected by the electronic pen 4, and a background image obtained by capturing the stroke and image.

The short-range communication unit 23 transmits and receives data with the IC card 50, such as Felica (registered trademark), using wireless communication. For example, the short-range communication unit 23 receives identification information of card from the IC card 50, and transmits at least the meeting ID to the IC card 50. Further, the short-range communication unit 23 receives the meeting ID stored in the IC card 50, from the IC card 50.

The network communication unit 24 connects to the communication network 9 to transmit data to and from the data server 70 to be described later. For example, the network communication unit 24 transmits and receives the meeting data.

The meeting identification information generation unit 25 generates an meeting ID not-overlapping with other existing meeting ID each time the meeting is held or performed. The holding of meeting means a state of power on, user login, or explicit user instruction (operation). For example, if a user logs in by holding the IC card 50, the meeting identification information generation unit 25 generates a meeting ID.

The meeting data storage processing unit 26 stores the meeting data related to the meeting in the meeting data storage unit 301. For example, the meeting data storage processing unit 26 stores the meeting data in the meeting data storage unit 301 at an end of the meeting (e.g., when closing the meeting), periodically during the meeting, or at the timing of user operation.

The meeting data acquisition unit 27 searches the meeting data storage unit 301 using the meeting ID received from the IC card 50 by the short-range communication unit 23 to acquire or obtain the meeting data having the meeting ID matching the meeting ID received from the IC card 50.

The operation reception unit 28 receives various operations performed by a user to the display apparatus 2.

Further, the display apparatus 2 includes a storage unit 29 implemented by the SSD 204 or RAM 203 illustrated in FIG. 3. The storage unit 29 configures meeting data storage unit 301. Table 1 indicates an example of meeting data stored in the meeting data storage unit 301.

Table 1 indicates an example of meeting data stored in the meeting data storage unit 301. The meeting data includes meeting ID, presented data, and last-page number in association with each other.

The meeting ID is identification information identifying or specifying each meeting. The ID stands for identification, and means identifier and identification information. The ID indicates a name, code, character string, numerical value, or a combination of one or more of name, code, and character string used for uniquely distinguishing a particular target from a plurality of targets. The same is applied to the ID used in this specification. Th meeting ID is generated by the meeting identification information generation unit 25.

The presented data is data stored page-by-page, such as the stroke written by user, or images capturing images acquired from the notebook PC 6.

The last-page number is a page number displayed on the display apparatus 2 at an end of the meeting (e.g., when closing the meeting).

IC Card

As illustrated in FIG. 6, the IC card 50 includes, for example, short-range communication unit 61, meeting identification information writing unit 62, and meeting identification information reading unit 63. Each of the functional units of the IC card 50 is a function or means implemented by any one of the components illustrated in FIG. 5 under the instruction from the data control circuit 51 executing programs loaded on the RAM 503 from the memory 53. The IC card 50 further includes storage unit 69 including meeting identification information storage unit 401.

The short-range communication unit 61 transmits and receives data with the display apparatus 2 using wireless communication and Felica (registered trademark) or the like. The short-range communication unit 61 receives a command from the short-range communication circuit 219 of the display apparatus 2, and returns a response to the short-range communication circuit 219. For example, the short-range communication unit 61 transmits the identification information of the IC card 50 (card ID to be described later) to the display apparatus 2, and receives the meeting ID from the display apparatus 2. Further, the short-range communication unit 61 transmits the meeting ID stored in the meeting identification information storage unit 401 to the display apparatus 2.

When the meeting identification information writing unit 62 receives a write command of meeting ID from the short-range communication circuit 219, the meeting identification information writing unit 62 writes a meeting ID to the meeting identification information storage unit 401.

When the meeting identification information reading unit 63 receives a read command of meeting ID from the short-range communication circuit 219, the meeting identification information reading unit 63 reads out a meeting ID from the meeting identification information storage unit 401, and transmits the read-out meeting ID to the short-range communication unit 61. Then, as a response to the read command, the short-range communication unit 61 includes the meeting ID in the response, and transmits the response including the meeting ID to the display apparatus 2.

Further, the IC card 50 includes a storage unit 69 implemented by the memory 53 illustrated in FIG. 5. The storage unit 69 configures meeting identification information storage unit 401. Table 2 indicates an example of meeting information stored in the meeting identification information storage unit 401.

TABLE 2

| CARD ID | MEETING ID |
|---------|------------|
| ABC     | 12398      |
|         | 5463       |
|         | . . .      |

Table 2 indicates an example of meeting information stored in the meeting identification information storage unit 401. The meeting information of Table 2 is a list of meeting IDs of meetings where the user participated in the past or previously.

The card ID is identification information of the IC card 50. For example, the card ID can be a card number. Further, instead of the card number, the card ID can be configured to written and stored as information identifying the IC card 50 to a storage area of the IC card 50, and then to be read out by the IC card reader when to identify the IC card 50. The information identifying the IC card 50, including the card ID, is referred to as the identification information of card.

Screen Transition

FIGS. 7A, 7B, 7C, and 7D illustrate an example of screen displayed on the display apparatus 2 from a start to an end of meeting.

As illustrated in FIG. 7A, before starting a meeting, the display apparatus 2 displays a start button 311 of meeting at the lower right corner of the display 3. When the user presses the start button 311 of meeting, the display apparatus 2 displays a login screen 320 on the display 3 as illustrated in FIG. 7B. For example, the login screen 320 displays a message 312 of "Please hold IC card."

If a meeting ID of a meeting to be resumed is stored in the IC card 50, the user holds the IC card 50 over the short-range communication circuit 219.

If a meeting ID of a meeting to be resumed is not stored in the IC card 50, the user performs an operation of erasing or deleting the message 312, such as pressing a cancel button 313 illustrated in FIG. 7B.

Hereinafter, a description is given of a case when the meeting ID to be resumed is not stored in the IC card 50.

A user presses the cancel button 313. Then, the meeting identification information generation unit 25 of the display apparatus 2 generates or assigns a meeting ID, and stores the meeting ID in the RAM 203. Then, a meeting is held or performed, and as illustrated in FIG. 7C, a user can write a stroke or the like using a hand or the like. During the meeting, an end button 315 of meeting is being displayed at the lower right corner of the display 3.

When the user ends the meeting, the user presses the end button 315 of meeting. Then, the meeting data storage processing unit 26 of the display apparatus 2 stores the presented data (e.g., handwritten data and captured image stored during the meeting, handwritten data and captured image being displayed) in association with the meeting ID, and stores the presented data in the meeting data storage unit 301.

Then, as illustrated in FIG. 7D, the display apparatus 2 displays the message 312 of "Please hold IC card" on the display 3. When the user holds the IC card 50 over the short-range communication circuit 219, the short-range communication unit 23 of the display apparatus 2 sets the meeting ID (e.g., 12398) stored in the RAM 203 in a write command, and transmits the write command to the IC card 50.

When the short-range communication unit 61 of the IC card 50 receives the write command, the short-range communication unit 61 transfers the write command to the meeting identification information writing unit 62, and then the meeting identification information writing unit 62 stores or writes the meeting ID included in the write command in the meeting identification information storage unit 401.

Figure 8A:
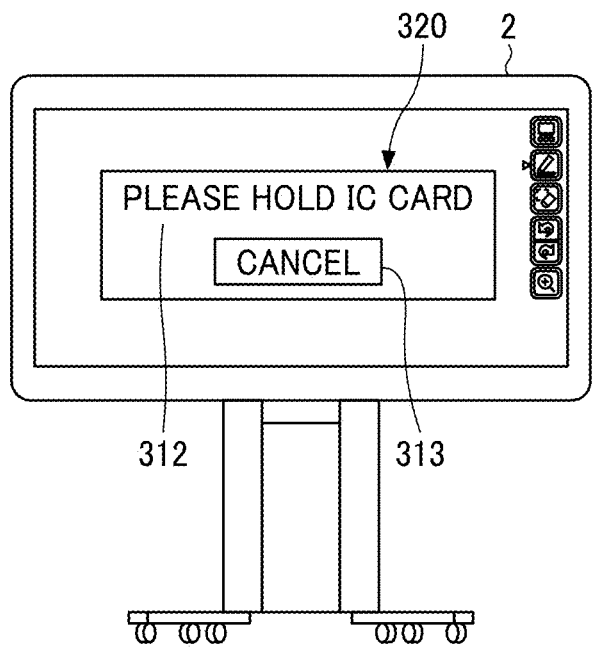
FIGS. 8A and 8B illustrate another example of screen displayed on a display apparatus from a start to an end of a meeting according to an embodiment 1 of this disclosure.

Hereinafter, a description is given of a case when a meeting ID to be resumed is stored in the IC card 50 with reference to FIGS. 8A and 8B. FIG. 8A is the same as FIG. 7B.

When the user holds the IC card 50 over the short-range communication circuit 219, the short-range communication unit 23 of the display apparatus 2 transmits a read command of meeting ID to the IC card 50.

When the short-range communication unit 61 of the IC card 50 receives the read command, the meeting identification information reading unit 63 reads out a meeting ID (e.g., 12398) from the meeting identification information storage unit 401, and transmits the read-out meeting ID (e.g., 12398) to the short-range communication unit 61. Then, as a response to the read command, the short-range communication unit 61 sets the meeting ID (e.g., 12398) in the response, and transmits the response to the display apparatus 2.

Then, the meeting data acquisition unit 27 of the display apparatus 2 acquires or obtains meeting data associated with the meeting ID (e.g., 12398) from the meeting data storage unit 301. Then, as illustrated in FIG. 8B, the display control unit 22 of the display apparatus 2 displays presented data included in the meeting data on the display 3. If the presented data includes a plurality of pages, the last page that was opened or used at the end of the previous meeting may be displayed. With this configuration, the user can resume the meeting easily. Further, the first page may be displayed.

Procedure

Figure 9:
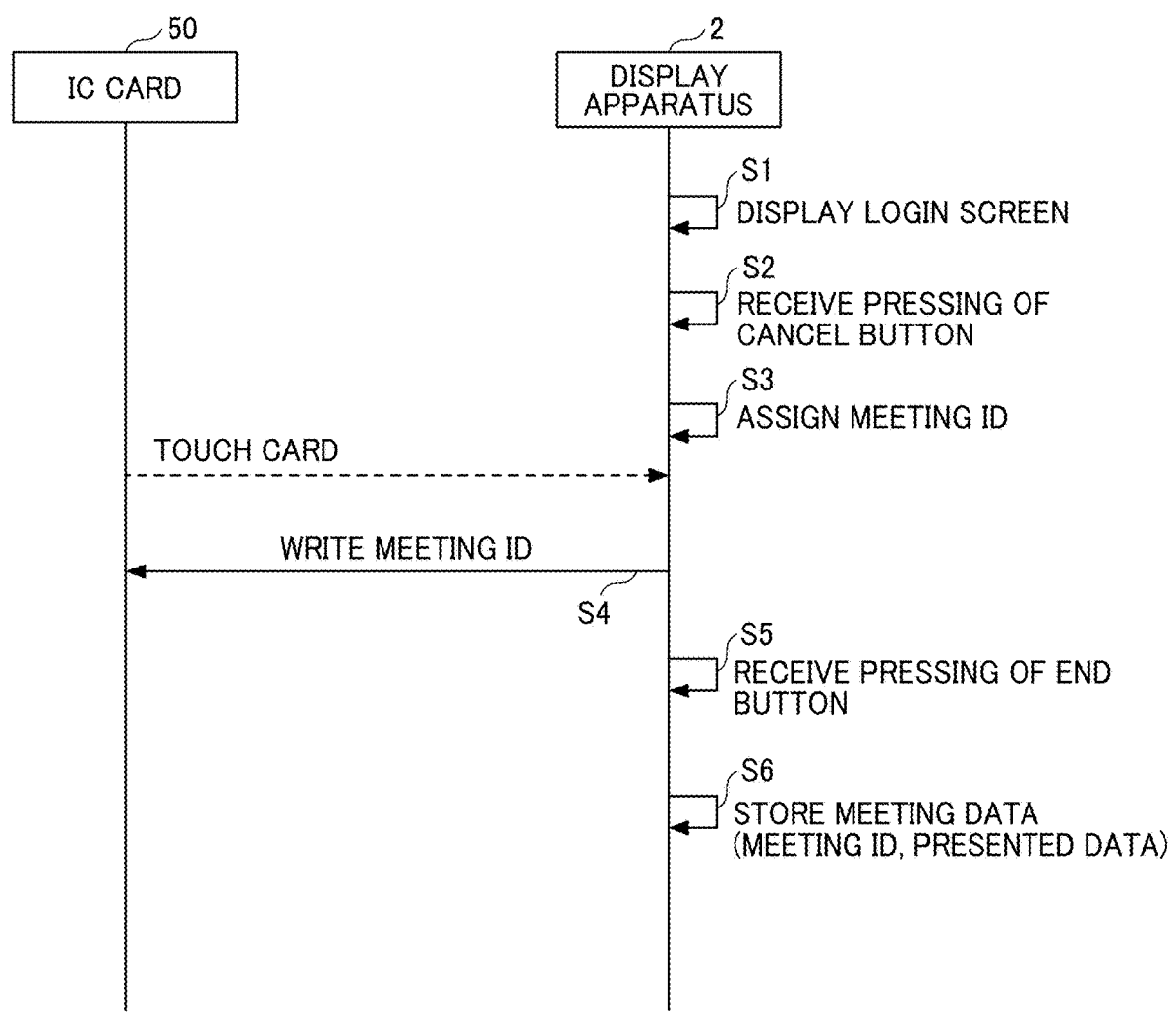
FIG. 9 is an example of a sequence diagram illustrating a flow of processing performed by a display apparatus at a start of a meeting when a meeting ID is not stored according to an embodiment 1 of this disclosure.

FIG. 9 is an example of a sequence diagram illustrating a flow of processing performed by the display apparatus 2 at a start of a meeting when a meeting ID is not stored. In FIG. 9, a description is given of a case when a meeting ID of a meeting to be resumed is not stored in the IC card 50.

S1: The operation reception unit 28 of the display apparatus 2 detects a pressing of the start button 311 of meeting. Then, the display control unit 22 displays the login screen 320 on the display 3.

S2: When a user presses the cancel button 313, the operation reception unit 28 of the display apparatus 2 receives the pressing of the cancel button 313, and then the display control unit 22 erases or deletes the login screen 320. Further, the display control unit 22 switches the start button 311 to the end button 315.

S3: The meeting identification information generation unit 25 generates or assigns a meeting ID, and stores the meeting ID in the RAM 203.

S4: Then, the user holds the IC card 50 over the short-range communication circuit 219. Then, the short-range communication unit 23 of the display apparatus 2 transmits a write command of meeting ID to the IC card 50. Then, the short-range communication unit 61 of the IC card 50 receives the write command, and the meeting identification information writing unit 62 writes the meeting ID to the meeting identification information storage unit 401. Further, the timing of storing the meeting ID may be at any time while the IC card 50 can communicate with the short-range communication circuit 219.

S5: The user performs the meeting, and displays handwritten data or the like on the display 3. When the meeting ends, the user presses the end button 315 of meeting. Then, the operation reception unit 28 of the display apparatus 2 receives the pressing of the end button 315 of meeting.

S6: The meeting data storage processing unit 26 stores the meeting data by associating the presented data and the meeting ID to the meeting data storage unit 301. Further, the page number displayed on the display apparatus 2 when the end button 315 was pressed may be also stored in the meeting data storage unit 301.

Figure 10:
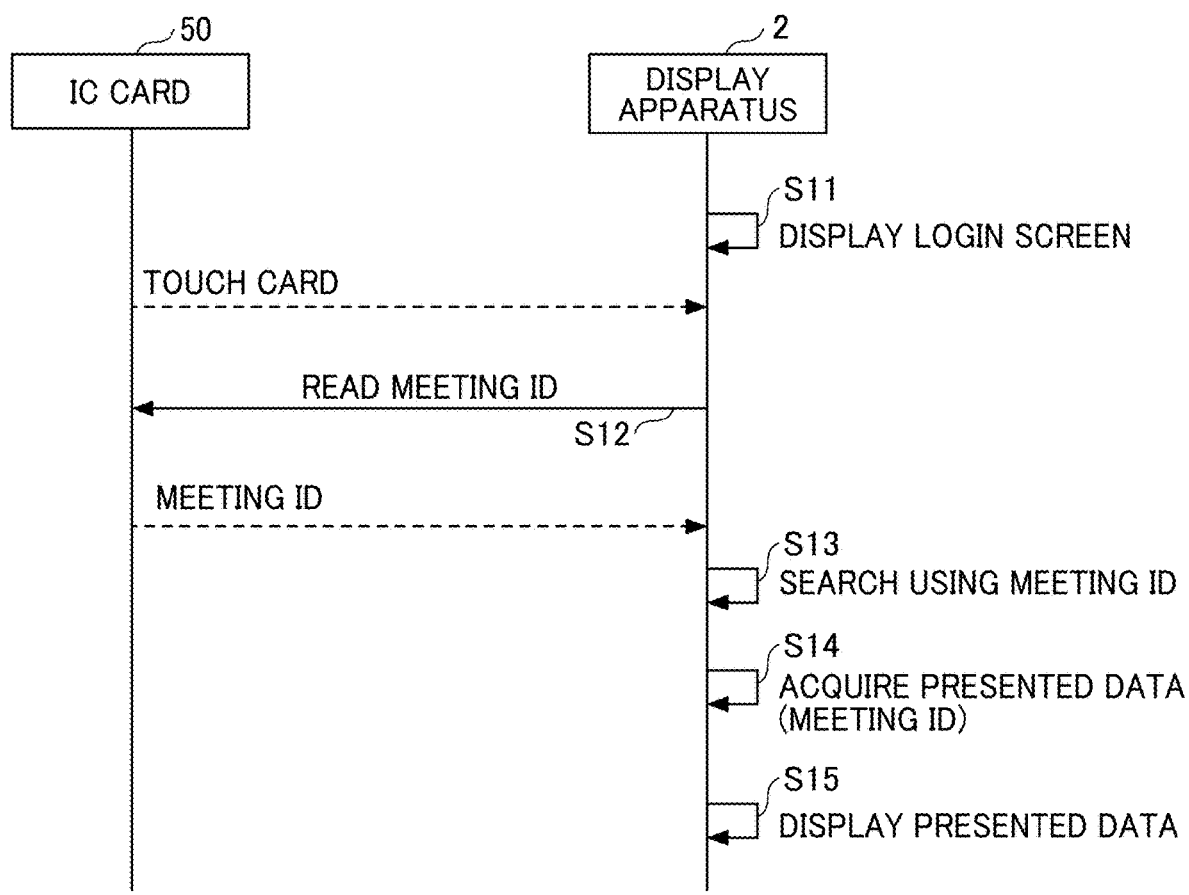
FIG. 10 is an example of a sequence diagram illustrating a flow of processing performed by a display apparatus at a start of a meeting when a user resumes the meeting according to an embodiment 1 of this disclosure.

FIG. 10 is an example of a sequence diagram illustrating a flow of processing performed by the display apparatus 2 at a start of a meeting when a user resumes the meeting. Hereinafter, with reference to FIG. 10, a description is given of a case when a meeting ID to be resumed is stored in the IC card 50.

S11: The operation reception unit 28 of the display apparatus 2 detects a pressing of the start button 311 of meeting. Then, the display control unit 22 displays the login screen 320 on the display 3.

S12: Then, a user holds the IC card 50 over the short-range communication circuit 219. Then, the short-range communication unit 23 of the display apparatus 2 transmits a read command of meeting ID to the IC card 50. Then, the short-range communication unit 61 of the IC card 50 receives the read command of meeting ID, the meeting identification information reading unit 63 reads out a meeting ID stored in the meeting identification information storage unit 401, and then the short-range communication unit 61 transmits the meeting ID to the display apparatus 2. Then, the short-range communication unit 23 of the display apparatus 2 receives the meeting ID.

S13: The meeting data acquisition unit 27 of the display apparatus 2 searches the meeting data storage unit 301 using the meeting ID received from the IC card 50. Hereinafter, it is assumed that the meeting data associated with the same meeting ID is found.

S14: The meeting data acquisition unit 27 of the display apparatus 2 acquires or obtains presented data included in the meeting data associated with the meeting ID from the meeting data storage unit 301.

S15: The display control unit 22 of the display apparatus 2 displays the presented data on the display 3. In step S15, if the meeting data includes a particular page number displayed on the display apparatus 2 when the end button 315 was pressed, the presented data corresponding to the particular page number is displayed.

Further, a case of storing a plurality of meeting IDs in the IC card 50 and the display apparatus 2 receives the plurality of meeting IDs is to be described later.

As described above, depending on whether the user holds the IC card 50 or not, the generation of meeting ID and the displaying of meeting data can be switched.

Figure 11:
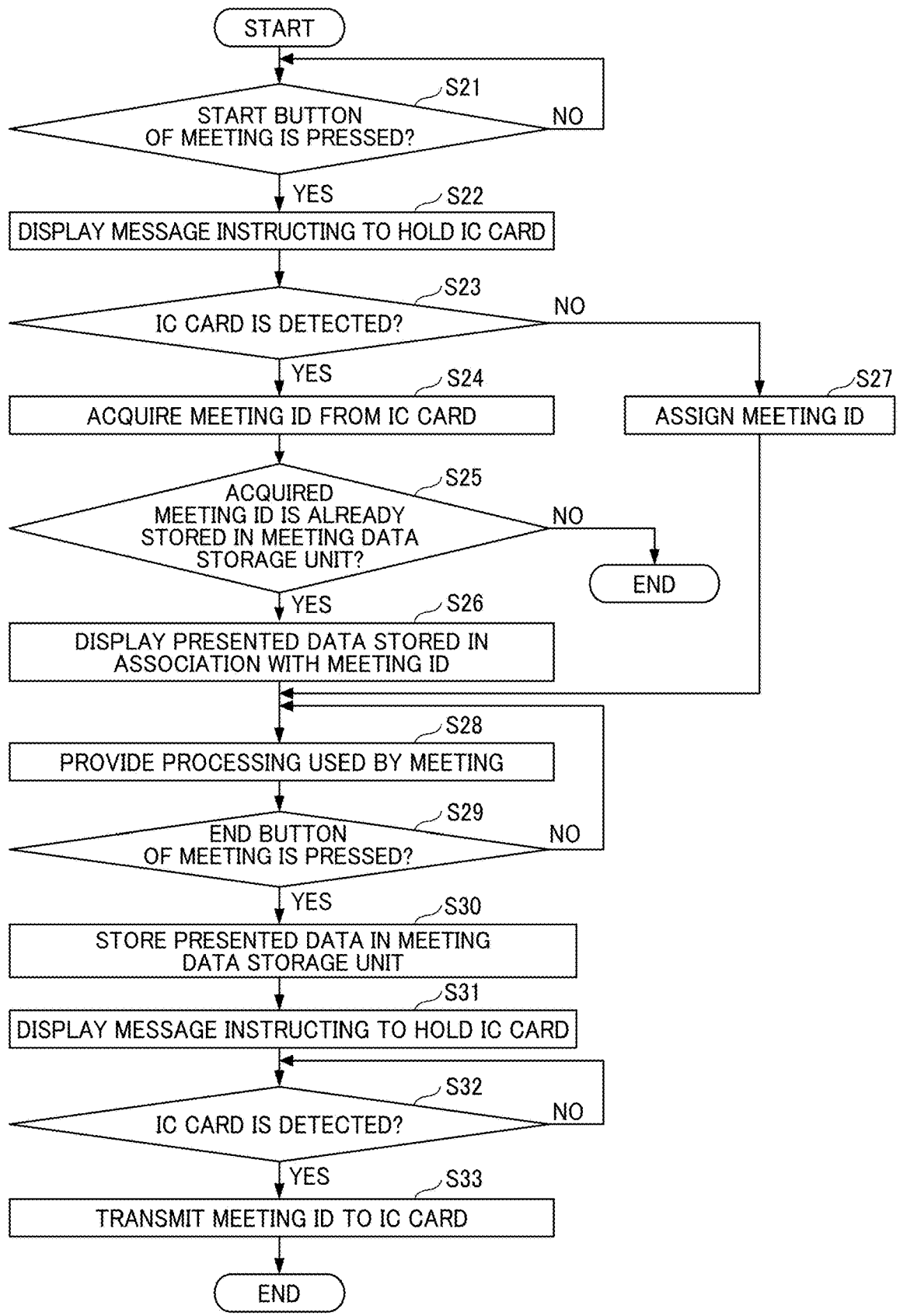
FIG. 11 is an example of a flowchart illustrating processing performed by a display apparatus.

FIG. 11 is an example of a flowchart illustrating processing performed by the display apparatus 2.

The operation reception unit 28 of the display apparatus 2 determines whether the start button 311 of meeting is pressed (step S21).

If the start button 311 of meeting is pressed (step S21: YES), the display control unit 22 displays the message 312 (e.g., login screen 320) instructing the user to hold the IC card 50 over the display 3 (step S22).

Then, the short-range communication unit 23 determines whether or not the IC card 50 can be detected (step S23). If the communication with the IC card 50 can be performed, the IC card 50 is detected.

If the IC card 50 is detected (step S23: YES), the short-range communication unit 23 acquires or obtains the meeting ID from the IC card 50 (step S24).

Then, the meeting data acquisition unit 27 determines whether the acquired meeting ID is already stored in the meeting data storage unit 301 (step S25). If the acquired meeting ID is not yet stored in the meeting data storage unit 301 (step S25: NO), the display apparatus 2 cannot display the meeting data, and thereby the sequence of FIG. 11 ends.

If the acquired meeting ID is already stored in the meeting data storage unit 301 (step S25: YES), the meeting data acquisition unit 27 acquires or obtains meeting data (e.g., presented data) from the meeting data storage unit 301, and the display control unit 22 displays the meeting data (e.g., presented data) on the display 3 (step S26).

If the IC card 50 is not detected in step S23 (step S23: NO), for example, if the cancel button 313 is pressed, the meeting identification information generation unit 25 generates or assigns a meeting ID not overlapping with other existing meeting ID (step S27).

During the meeting, the display apparatus 2 provides the processing used by the meeting, such as displaying stroke data on the display 3 (step S28).

Then, if the end button 315 of meeting is pressed (step S29: YES), the meeting data storage processing unit 26 stores the meeting data (e.g., presented data) in the meeting data storage unit 301 in association with the meeting ID (step S30).

Then, the display control unit 22 displays the message 312 instructing the user to hold the IC card 50 over the display 3 to store the meeting ID in the IC card 50 (step S31).

Then, the short-range communication unit 23 determines whether or not the IC card 50 can be detected (step S32).

If the IC card 50 is detected (step S32: YES), the short-range communication unit 23 transmits the meeting ID to the IC card 50 (step S33).

Further, if a plurality of meeting IDs are stored in the meeting identification information storage unit 401 of the IC card 50, when the IC card 50 receives the read command of meeting ID, the plurality of meeting IDs are read out from the meeting identification information storage unit 401, and then the IC card 50 transmits a response including the plurality of meeting ID to the display apparatus 2.

When the display apparatus 2 receives the plurality of meeting IDs from the IC card 50, the display apparatus 2 compares each of the plurality of meeting IDs with the meeting IDs being stored in the meeting data storage unit 301. Then, if the same meeting ID is found, the display apparatus 2 reads out the meeting data (e.g., presented data) stored in association with the same meeting ID from the meeting data storage unit 301, and displays a list of the meeting data on the display 3.

When the user selects a particular meeting ID (e.g., value=77236) to be resumed from the list, the meeting data acquisition unit 27 of the display apparatus 2 reads out particular presented data stored in association with the particular meeting ID from the meeting data storage unit 301, and displays the particular presented data on the display 3. With this configuration, even if the plurality of meeting IDs are stored in the IC card 50, the particular meeting data (e.g., presented data) of the particular meeting to be resumed can be displayed.

Further, in the embodiment, the display apparatus 2 stores the meeting data therein, but the meeting data may be stored on a network (e.g., server, network storage) where the display apparatus 2 can be connected.

As described above, when the user holds the IC card 50 over the display apparatus 2, the display apparatus 2 can acquire the particular meeting ID stored in the IC card 50. Then, the display apparatus 2 acquires or obtains the particular meeting data of the particular meeting identified by the particular meeting ID, and displays the particular meeting data of the particular meeting identified by the particular meeting ID. Therefore, the user can resume the particular meeting from the time that the particular meeting was ended previously by only holding the IC card 50 over the display apparatus 2. Further, the user authentication is not required.

Further, the user is not required to search a target meeting from many meetings and designate a storage location (folder, URL) of the to-be resumed meeting data, with which a time period counted from an entry of participant into a meeting room until starting the meeting can be shortened.

Embodiment 2

In an embodiment 2 of the image processing system 1, a description is given of a case that identifies the meeting data using the meeting name instead of the meeting ID. The meeting name is a name of meeting, which includes a text string set by alphabet, number, symbol, or combination of these. The meeting name is set by a user based on agenda discussed at the meeting.

In the embodiment 2, the hardware block diagram illustrated in FIGS. 3 to 5 and the functional block diagram illustrated in FIG. 6 described in the above embodiment 1 are also employed.

In the embodiment 2, the short-range communication unit 23 receives a particular meeting name from the IC card 50, and then the meeting data acquisition unit 27 searches the particular meeting name from the meeting data storage unit 301 to acquire meeting data of the meeting name matching the particular meeting name used for searching. Further, the meeting data storage processing unit 26 stores the particular meeting name and the presented data in the meeting data storage unit 301.

Table 3 is an example of meeting data stored in the meeting data storage unit 301 of the embodiment 2. The meeting data includes meeting name, presented data, and last-page number in association with each other.

TABLE 4

| CARD ID | MEETING NAME |
| --- | --- |
| ABC | BUSINESS REGULAR MEETING |
|  | DEVELOPMENT REGULAR MEETING |
|  | . . . |

Table 4 is an example of meeting information stored in the meeting identification information storage unit 401 of the embodiment 2. In Table 4, the meeting information is a list of meeting names.

Screen Transition

FIG. 12 (12(a), 12(b), 12(c), 12(d)) illustrates an example of screen displayed on the display apparatus 2 at a start of a meeting. FIG. 12(a) illustrates the login screen 320 as similar to FIG. 7, and the login screen 320 displays the message 312 of "Please hold IC card."

If a particular meeting name to be resumed is stored in the IC card 50, the user holds the IC card 50 over the short-range communication circuit 219. On the other hand, if the particular meeting name to be resumed is not stored in the IC card 50, the user presses the cancel button 313.

Figure 12A:
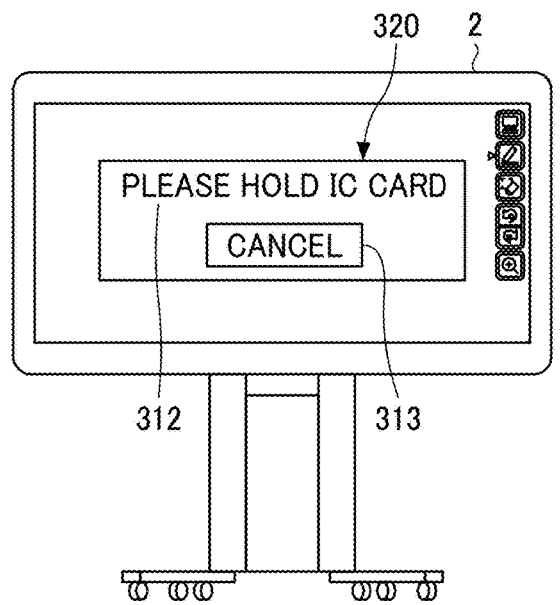
FIG. 12 (12(a), 12(b), 12(c), 12(d)) illustrates an example of screen displayed on a display apparatus at a start of a meeting according to an embodiment 2 of this disclosure.
Figure 12B:
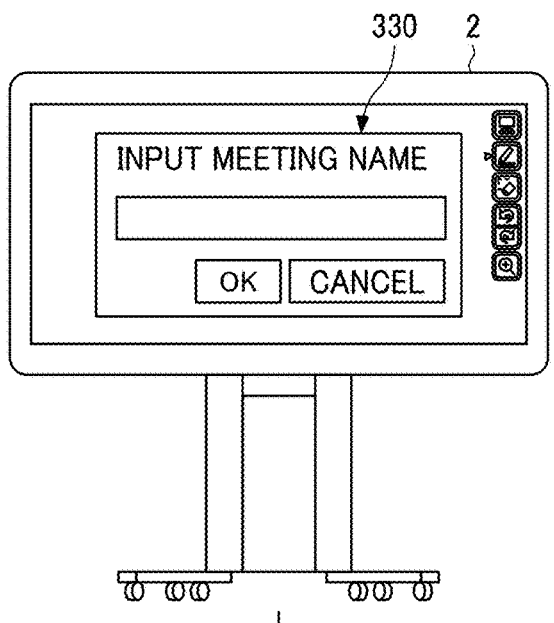
Figure 12D:
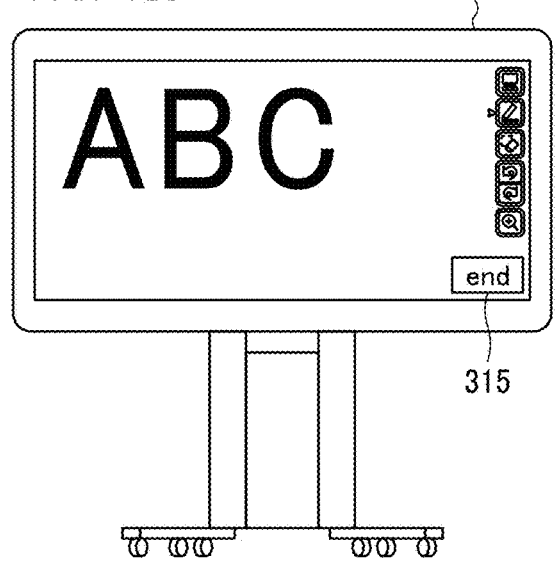
Figure 12C:
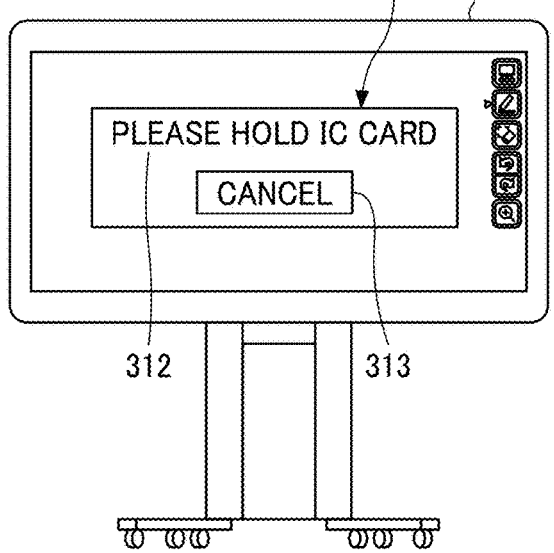

Since the particular meeting name to be resumed is not stored in the IC card 50, the user presses the cancel button 313. In this case, as illustrated in FIG. 12(b), the display apparatus 2 displays an input screen 330 of meeting name on the display 3.

When the user inputs the particular meeting name using the input screen 330, the operation reception unit 28 of the display apparatus 2 stores the input particular meeting name in the RAM 203. Then, when the user performs a particular meeting and ends the particular meeting, the user presses the end button 315 of meeting displayed on the display 3.

Then, the meeting data storage processing unit 26 of the display apparatus 2 stores the particular meeting data including the particular meeting name in the meeting data storage unit 301. Then, the display apparatus 2 displays the message 312 of "Please hold IC card" on the display 3 (FIG. 12(c)).

When the user holds the IC card 50 over the short-range communication circuit 219, the short-range communication unit 23 of the display apparatus 2 sets the particular meeting name, stored in the RAM 203, in a write command, and transmits the write command to the IC card 50.

When the short-range communication unit 61 of the IC card 50 receives the write command, the short-range communication unit 61 transfers the write command to the meeting identification information writing unit 62, and then the meeting identification information writing unit 62 stores or writes the particular meeting name (e.g., "business regular meeting") included in the write command to the meeting identification information storage unit 401. With this configuration, the IC card 50 stores the particular meeting name, and the display apparatus 2 stores the particular meeting data associated with the particular meeting name.

Further, the IC card 50 can avoid the overlapping of the meeting names stored in the meeting identification information storage unit 401. When the short-range communication unit 61 of the IC card 50 receives a write command of particular meeting name, the short-range communication unit 61 transfers a read command of meeting name to the meeting identification information reading unit 63, and then the meeting identification information reading unit 63 reads out one or more meeting names stored in the meeting identification information storage unit 401 and transmits the read-out one or more meeting names to the short-range communication unit 61.

Then, the short-range communication unit 61 compares the one or more meeting names read out from the meeting identification information storage unit 401 and the particular meeting name included in the received write command. If any one of the one or more meeting names read out from the meeting identification information storage unit 401 matches the particular meeting name included in the received write command, the short-range communication unit 61 does not transmit the write command of particular meeting name to the meeting identification information writing unit 62. In this case, the short-range communication unit 61 includes a code indicating that the particular meeting name already exists in a response, and transmits the response to the display apparatus 2. This allows the user to input or enter the meeting name not overlapping with other existing meeting names.

Hereinafter, with reference to FIG. 12, a description is given of a case when a meeting name to be resumed is stored in the IC card 50. A user presses the start button 311 of meeting displayed on the display 3 to resume a particular meeting having a particular meeting name="business regular meeting." Then, as illustrated in FIG. 12(a), the display apparatus 2 displays the message 312 of "Please hold IC card." When the user holds the IC card 50 over the short-range communication circuit 219, the short-range communication unit 23 of the display apparatus 2 transmits the read command of meeting name to the IC card 50. When the short-range communication unit 61 of the IC card 50 receives the read command, the short-range communication unit 61 transmits the read command to the meeting identification information reading unit 63, and then the meeting identification information reading unit 63 reads out the particular meeting name="business regular meeting" from the meeting identification information storage unit 401.

Then, the short-range communication unit 61 of the IC card 50 includes the particular meeting name in a response, and transmits response to the display apparatus 2. When the short-range communication unit 23 of the display apparatus 2 receives the response, the meeting data acquisition unit 27 compares the particular meeting name included in the response and one or more meeting names stored in the meeting data storage unit 301.

If the particular meeting name included in the response and any one of the one or more meeting names stored in the meeting data storage unit 301 are the same, the meeting data acquisition unit 27 reads out particular meeting data stored in association with the particular meeting name from the meeting data storage unit 301, and displays particular presented data on the display 3. With this configuration, the particular meeting identified by particular meeting name="business regular meeting" is resumed.

Procedure

FIG. 13 is an example of a sequence diagram illustrating a flow of processing performed by the display apparatus 2 at a start of a meeting when a meeting name is not stored. A difference with respect to FIG. 9 is mainly described for FIG. 13.

As illustrated in FIG. 13, the operation reception unit 28 of the display apparatus 2 receives a particular meeting name in step S3. The sequence of FIG. 13 is same as the sequence of FIG. 9 except that the meeting ID is changed to the meeting name.

Figure 14:
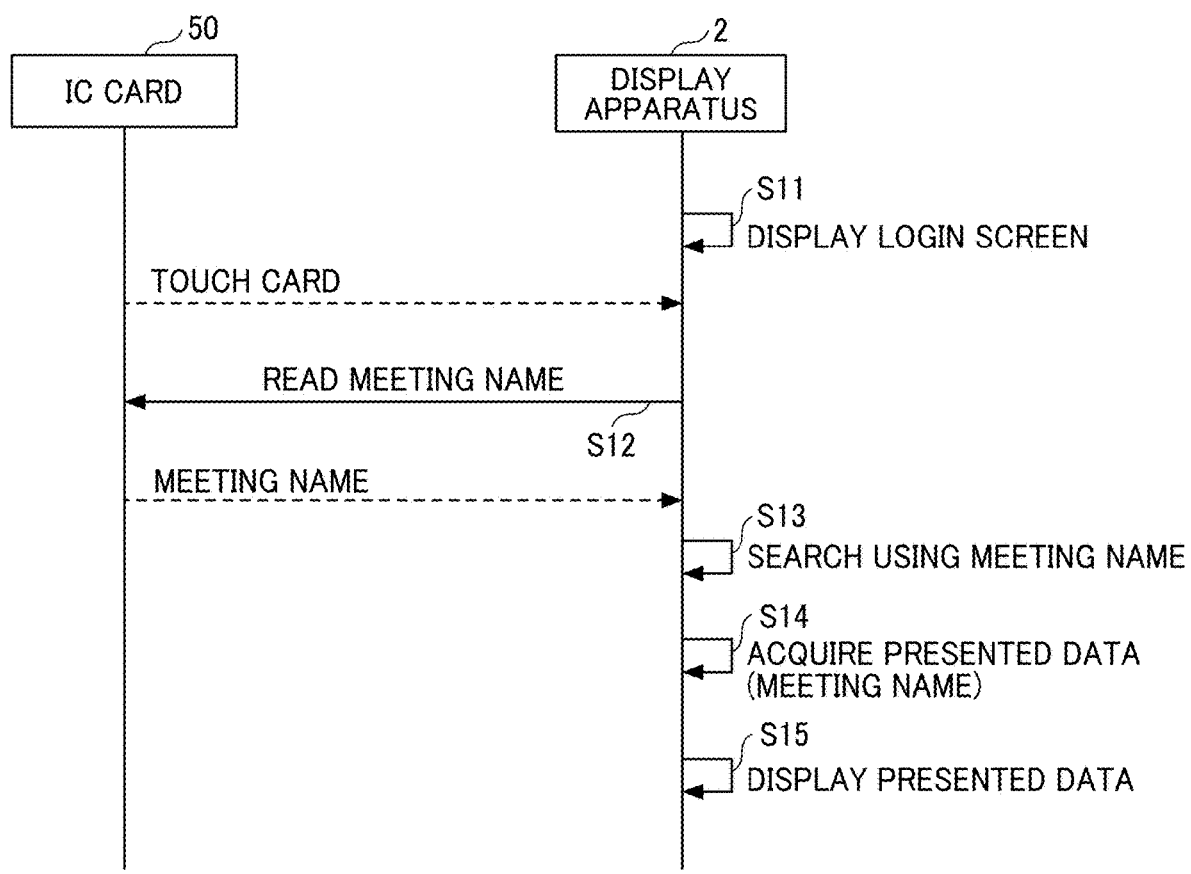
FIG. 14 is an example of a sequence diagram illustrating a flow of processing performed by a display apparatus at a start of a meeting when a user resumes the meeting according to an embodiment 2 of this disclosure.

FIG. 14 is an example of a sequence diagram illustrating a flow of processing performed by the display apparatus 2 at a start of a meeting when a user resumes the meeting. A difference with respect to FIG. 10 is mainly described for FIG. 14. As illustrated in FIG. 14, the sequence of FIG. 14 is same as the sequence of FIG. 10 except that the meeting ID is changed to the meeting name.

Figure 15:
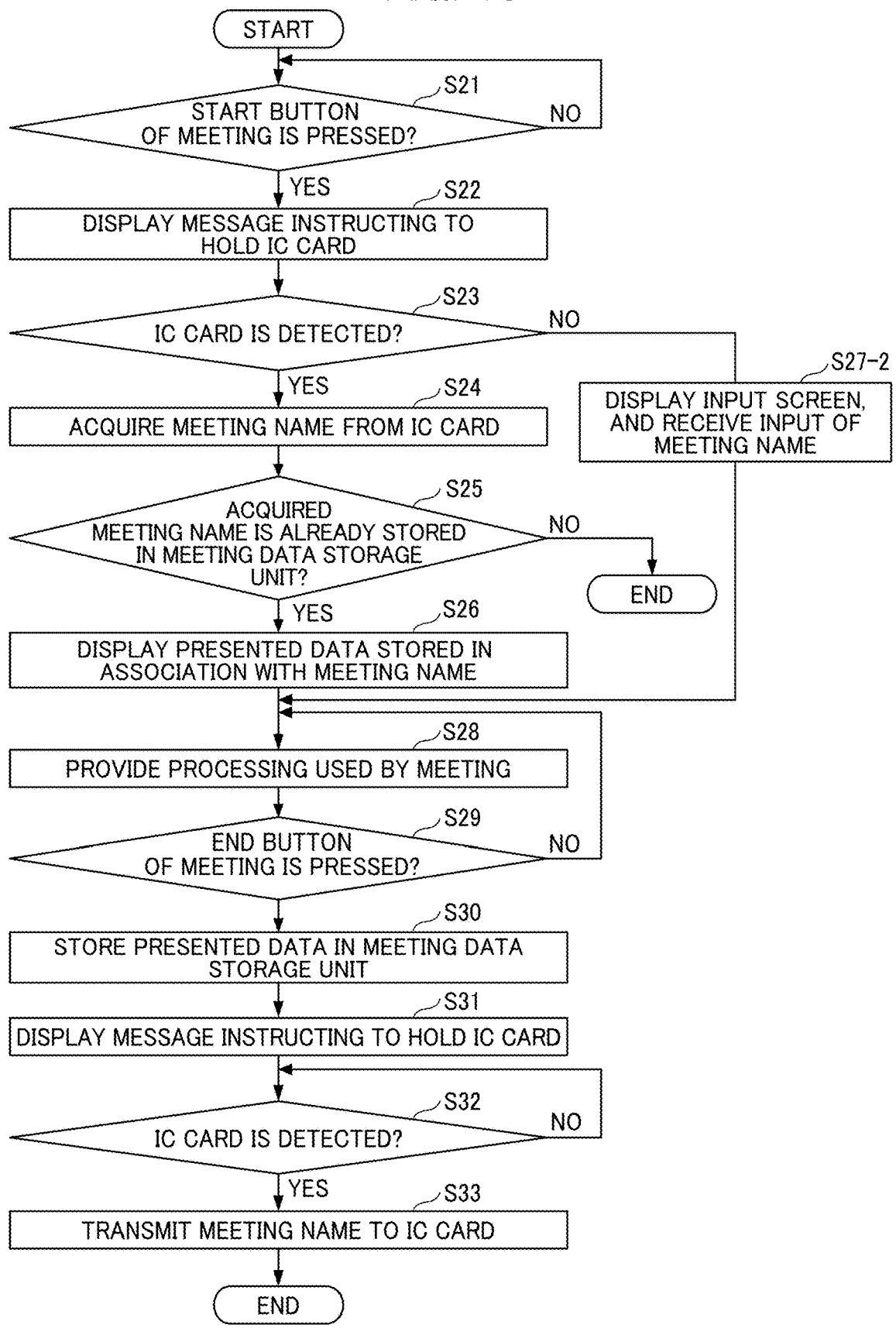
FIG. 15 is an example of a flowchart illustrating processing performed by a display apparatus according to an embodiment 2 of this disclosure.

FIG. 15 is an example of a flowchart illustrating processing performed by the display apparatus 2. A difference with respect to FIG. 11 is mainly described for FIG. 15.

In FIG. 15, in step S27-2, the display control unit 22 displays the input screen 330, and the operation reception unit 28 receives an input of meeting name via the input screen 330. The sequence of FIG. 15 is same as the sequence of FIG. 11 except that the meeting ID is changed to the meeting name.

As described above, in addition to the effect of the embodiment 1, the meeting data associated with the meeting name and stored in the IC card 50 can be displayed on the display apparatus 2.

Embodiment 3

In an embodiment 3 of the image processing system 1, a description is given of a case that the display apparatus 2 causes the IC card 50 to store a meeting room identifier (ID) with a meeting identifier (ID) at an end of a meeting (e.g., when closing the meeting). The meeting room ID is identification information identifying or specifying each meeting room. The meeting room is a place where a meeting is held or performed.

In the embodiment 3, the hardware block diagram illustrated in FIGS. 3 to 5 and the functional block diagram illustrated in FIG. 6 described in the above embodiment 1 are also employed.

In the embodiment 3, the short-range communication unit 23 receives a particular meeting ID and a particular meeting room ID from the IC card 50, and then the meeting data acquisition unit 27 searches the particular meeting ID and the particular meeting room ID from the meeting data storage unit 301, and acquires or obtains meeting data of the meeting ID and meeting room ID matching the searched particular meeting ID and meeting room ID.

Further, the meeting data storage processing unit 26 stores the particular meeting room ID in the meeting data storage unit 301 with the particular meeting ID.

Further, the storage unit 29 is registered with the particular meeting room ID of the particular meeting room where the display apparatus 2 is disposed by an administrator or the like in advance.

Table 5 is an example of meeting data stored in the meeting data storage unit 301 of the embodiment 3. The meeting data includes meeting ID, meeting room ID, presented data, and last-page number in association with each other as each item. The meeting room ID is identification information identifying each meeting room, and may be a meeting room name.

TABLE 6

| CARD ID | MEETING ID | MEETING ROOM ID |
|---|---|---|
| ABC | 12398 | A |
|  | 5463 | B |
|  | . . . | . . . |

Table 6 is an example of meeting information stored in the meeting identification information storage unit 401 of the embodiment 3. In Table 6, the meeting information associates the meeting ID and the meeting room ID.

Screen Transition

The screen transition of the embodiment 3 is similar to that of FIG. 7 and FIG. 8 of the embodiment 1. Further, a flow of starting the meeting without holding the IC card 50 is the same as in the embodiments 1 and 2.

When a user performs a meeting and ends the meeting, the user presses the end button 315 of meeting displayed on the display 3 (FIG. 7C). Then, the meeting data storage processing unit 26 of the display apparatus 2 stores the presented data in the meeting data storage unit 301 in association with the meeting ID and the meeting room ID.

Then, the display apparatus 2 displays the message 312 of "Please hold IC card" on the display 3 (FIG. 7D).

When the user holds the IC card 50 over the short-range communication circuit 219, the short-range communication unit 23 of the display apparatus 2 sets the meeting ID, stored in the RAM 203, and the meeting room ID, stored in the storage unit 29, in a write command, and transmits the write command to the IC card 50.

When the short-range communication unit 61 of the IC card 50 receives the write command, the short-range communication unit 61 transmits the write command to the meeting identification information writing unit 62, and then the meeting identification information writing unit 62 writes the meeting ID (value=12398) and the meeting room ID (value=A) included in the write command to the meeting identification information storage unit 401.

Then, when the user selects the start button 311 of meeting displayed on the display 3 to resume the meeting identified by the meeting room ID=A and the meeting ID=12398 (FIG. 7A), the display apparatus 2 displays the message 312 of "Please hold IC card" on the display 3 (FIG. 8A).

If the user holds the IC card 50 over the short-range communication circuit 219, the short-range communication unit 23 of the display apparatus 2 transmits a read command of meeting ID and meeting room ID to the IC card 50.

When the short-range communication unit 61 of the IC card 50 receives the read command, the short-range communication unit 61 transmits the read command to the meeting identification information reading unit 63, and then the meeting identification information reading unit 63 reads out the meeting ID (value=12398) and the meeting room ID (value=A) from the meeting identification information storage unit 401.

Then, the short-range communication unit 61 of the IC card 50 sets the meeting ID and the meeting room ID in a response, and transmits the response to the display apparatus 2.

When the short-range communication unit 23 of the display apparatus 2 receives the response, the meeting data acquisition unit 27 compares the meeting ID and the meeting room ID included in the response and the meeting ID and the meeting room ID stored in the meeting data storage unit 301.

Figure 8B:
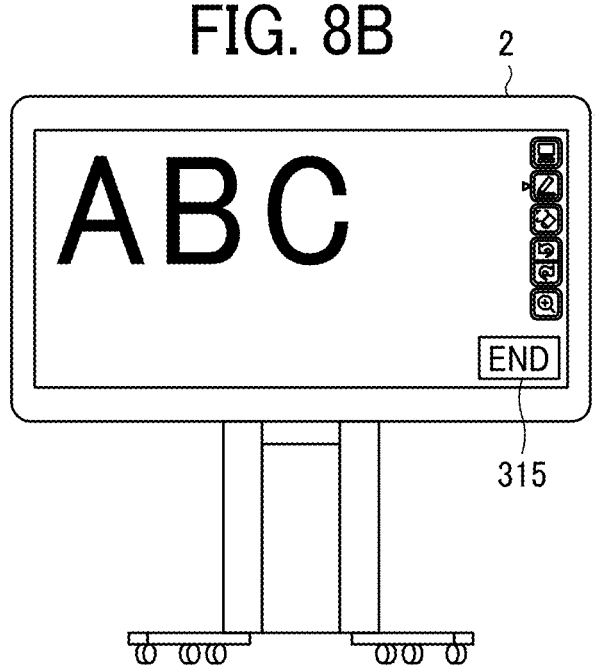

Then, the meeting data acquisition unit 27 reads out the presented data associated with the meeting ID and the meeting room ID included in the response from the meeting data storage unit 301, and the display control unit 22 displays the presented data on the display 3 (FIG. 8B). With this configuration, the meeting identified by the meeting room ID=A and the meeting ID=12398 is resumed.

Further, if there is no matching for any one of the meeting ID and the meeting room ID, the presented data is not displayed on the display 3, and the meeting is not resumed.

Procedure

Figure 16:
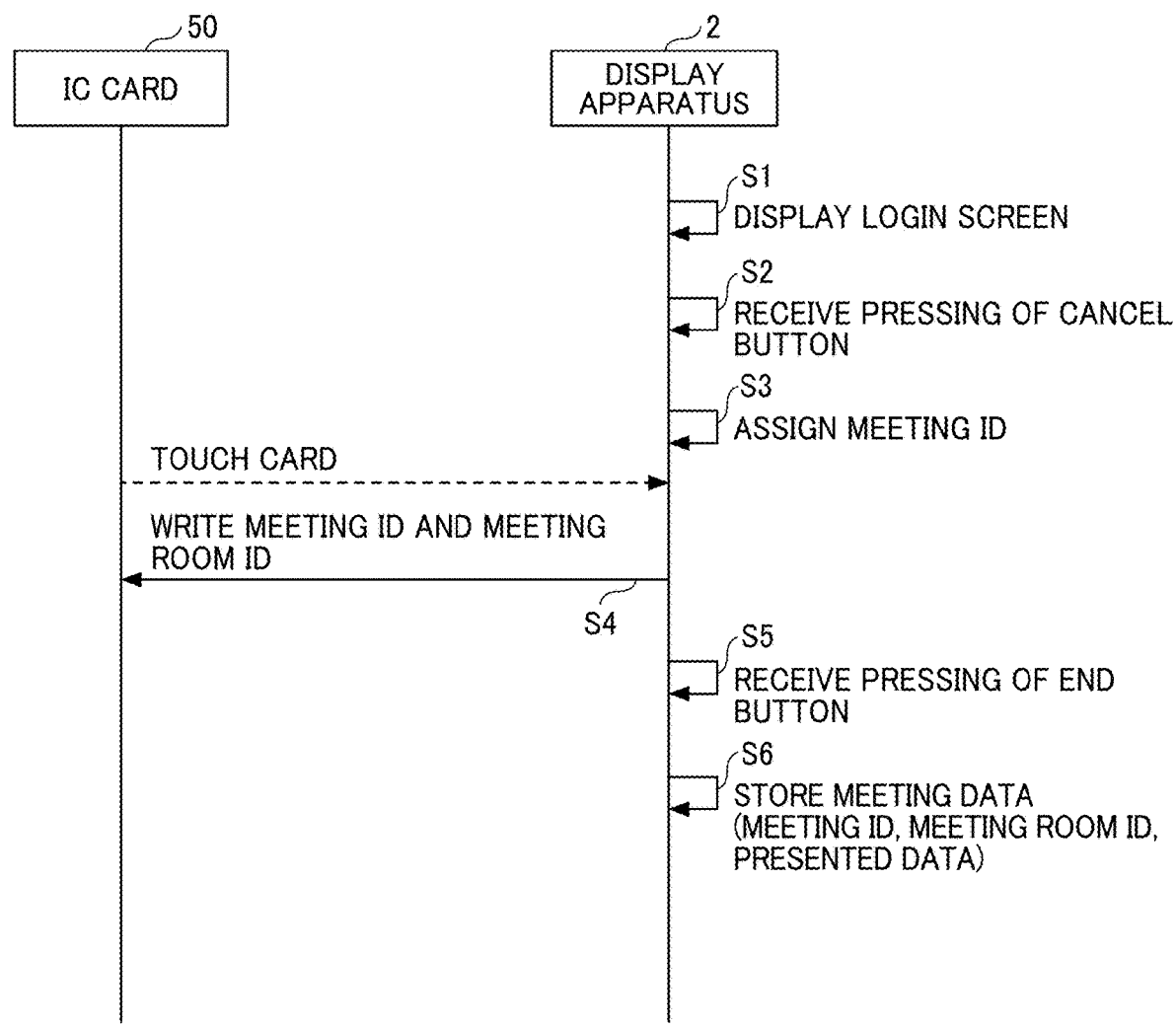
FIG. 16 is an example of a sequence diagram illustrating a flow of processing performed by a display apparatus at a start a meeting when a meeting ID and a meeting room ID are not stored according to an embodiment 3 of this disclosure.

FIG. 16 is an example of a sequence diagram illustrating a flow of processing performed by the display apparatus 2 at a start a meeting when a meeting ID and a meeting room ID are not stored. A difference with respect to FIG. 9 is mainly described for FIG. 16. The sequence of FIG. 16 is same as the sequence of FIG. 9 except that the meeting ID and the meeting room ID are to be stored in the IC card 50 and the meeting data storage unit 301.

Figure 17:
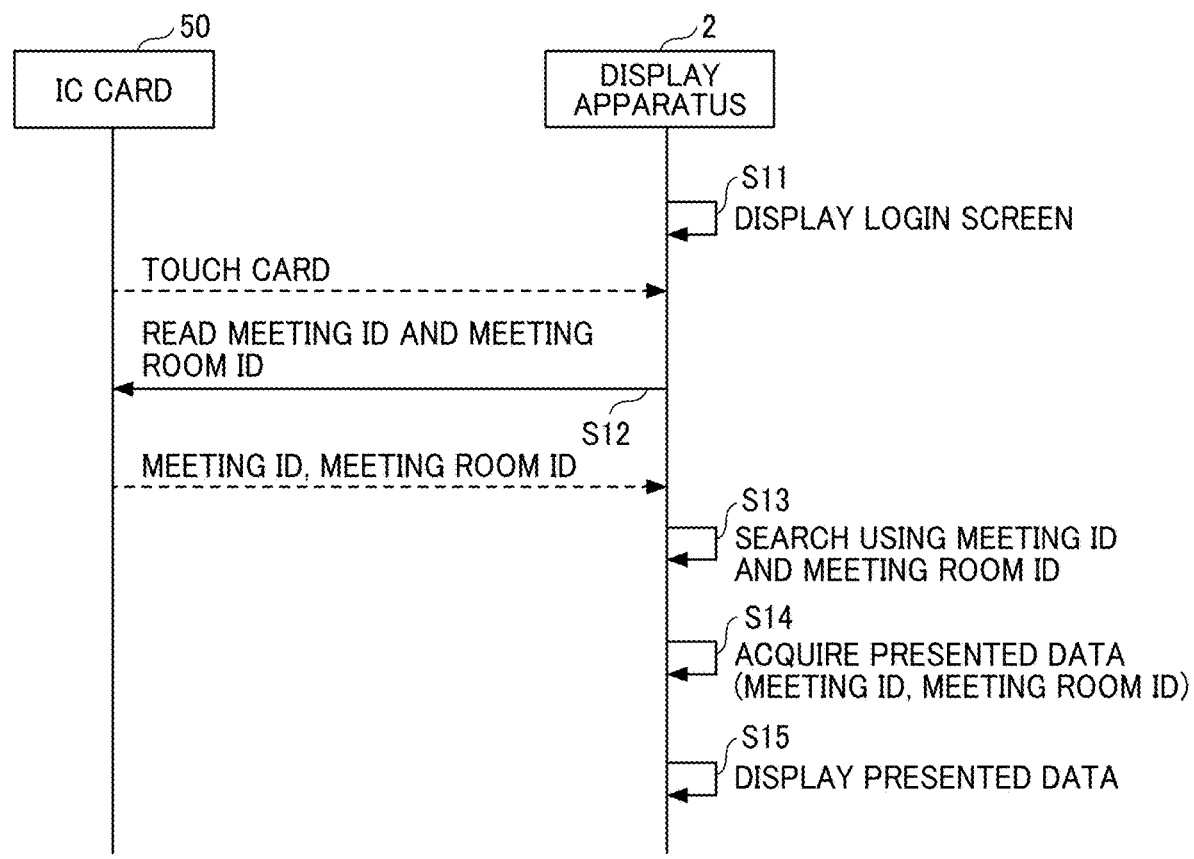
FIG. 17 is an example of a sequence diagram illustrating a flow of processing performed by a display apparatus at a start a meeting when a user resumes the meeting according to an embodiment 3 of this disclosure.

FIG. 17 is an example of a sequence diagram illustrating a flow of processing performed by the display apparatus 2 at a start a meeting when a user resumes the meeting. A difference with respect to FIG. 10 is mainly described for FIG. 17. The sequence of FIG. 17 is same as the sequence of FIG. 10 except that the meeting ID and the meeting room ID are used for searching the meeting data storage unit 301.

Figure 18:
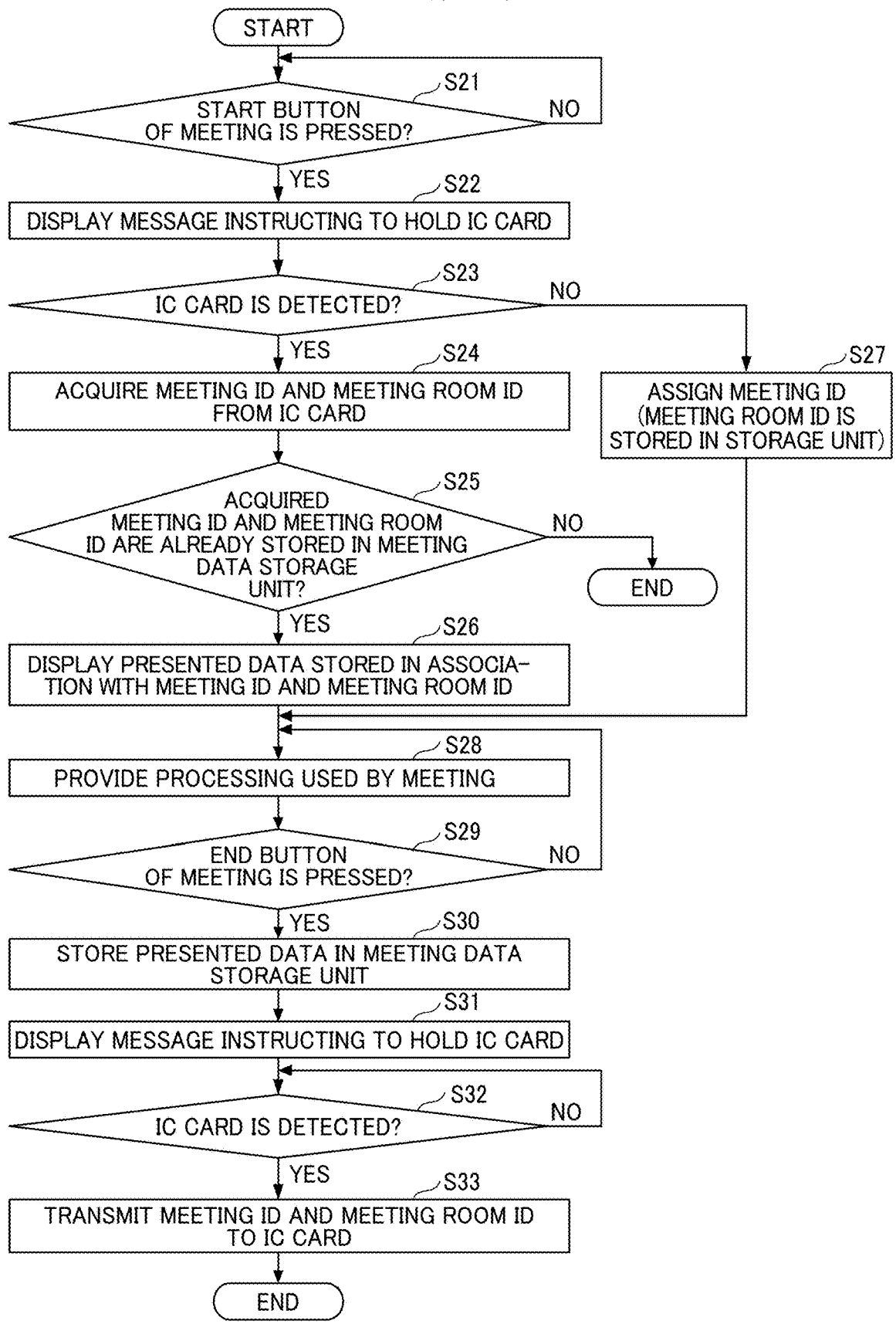
FIG. 18 is an example of a flowchart illustrating processing performed by a display apparatus according to an embodiment 3 of this disclosure.

FIG. 18 is an example of a flowchart illustrating processing performed by the display apparatus 2. A difference with respect to FIG. 11 is mainly described for FIG. 18. The sequence of FIG. 18 is same as the sequence of FIG. 11 except that the meeting ID and the meeting room ID are to be stored.

As described above, the meeting data associated with the meeting ID and the meeting room ID stored in the IC card 50 can be displayed on the display apparatus 2. Therefore, the user can resume only the meeting that was held in the meeting room where the display apparatus 2 is disposed.

Modification Example

If a user has performed the meeting in multiple meeting rooms in the past, the following processing is performed.

If the user performs a meeting and ends the meeting at the meeting room A, the user stores the meeting ID (value=12398) and the meeting room ID (value=A) in the IC card 50. Further, if the user performs a meeting and ends the meeting at the meeting room B, the user stores the meeting ID (value=5463) and the meeting room ID (value=B) in the IC card 50. With this configuration, two pairs of meeting ID and meeting ID are stored in the IC card 50.

Then, when the user presses the start button 311 of meeting displayed on the display 3 to resume the meeting identified by the meeting ID=12398 in the meeting room identified by the meeting room ID=A, the display apparatus 2 displays the message 312 of "Please hold IC card" on the display 3.

If the user holds the IC card 50 over the short-range communication circuit 219, the short-range communication unit 23 of the display apparatus 2 transmits the read command of meeting ID and meeting room ID to the IC card 50.

When the short-range communication unit 61 of the IC card 50 receives the read command, the short-range communication unit 61 transmits the read command to the meeting identification information reading unit 63, and then the meeting identification information reading unit 63 reads out one pair of the meeting ID (value=12398) and the meeting room ID (value=A), and another pair of the meeting ID (value=5463) and the meeting room ID (value=B) from the meeting identification information storage unit 401.

Then, the short-range communication unit 61 of the IC card 50 sets these meeting IDs and the meeting room IDs in a response, and transmits the response to the display apparatus 2.

When the short-range communication unit 23 of the display apparatus 2 receives the response, the meeting data acquisition unit 27 compares the meeting ID and the meeting room ID included in the response and the meeting ID and the meeting room ID stored in the meeting data storage unit 301.

Since the display apparatus 2 used by the user is disposed in the meeting room A, a pair of the meeting ID and the meeting room ID matching the one pair of the meeting ID (value=12398) and the meeting room ID (value=A) exists in the meeting data storage unit 301. However, a pair of the meeting ID and the meeting room ID matching the another pair of the meeting ID (value=5463) and the meeting room ID (value=B) does not exist in the meeting data storage unit 301.

Then, the display apparatus 2 displays the one pair of the meeting ID (value=12398) and the meeting room ID (value=A) on the display 3 with a higher priority, and then the display apparatus 2 displays the another pair of the meeting ID (value=5463) and the meeting ID (value=B) on the display 3.

Figure 19:
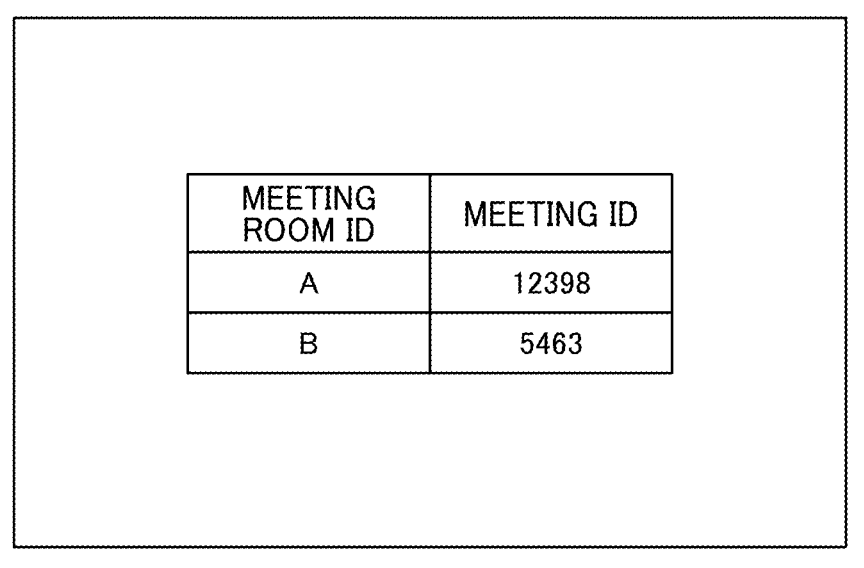

FIG. 19 illustrates an example of meeting room ID and meeting ID displayed on the display 3. FIG. 19 is displayed subsequent to FIG. 8A.

If the user selects the one pair of the meeting ID (value=12398) and the meeting room ID (value=A), the meeting data acquisition unit 27 of the display apparatus 2 reads out presented data stored in association with the meeting ID (value=12398) and the meeting room ID (value=A) from the meeting data storage unit 301, and displays the presented data on the display 3. With this configuration, the meeting identified by the meeting room ID=A and the meeting ID=12398 is resumed.

Further, if the user selects the another pair of the meeting ID (value=5463) and the meeting room ID (value=B), the presented data is not displayed on the display 3, and the meeting is not resumed because the display apparatus 2 does not store the meeting data associated with the another pair of the meeting ID (value=5463) and the meeting room ID (value=B). Then, the display apparatus 2 may display a message indicating that the meeting data associated with the another pair of the meeting ID (value=5463) and the meeting room ID (value=B) is not stored.

Embodiment 4

In an embodiment 4 of the image processing system 1, a description is given of a case that a user ID of owner user is stored in the IC card 50, and the meeting data is displayed using the user ID.

In the embodiment 4, the hardware block diagram illustrated in FIGS. 3 to 5 described in the above embodiment 1 are also employed.

Functional Configuration

Figure 20:
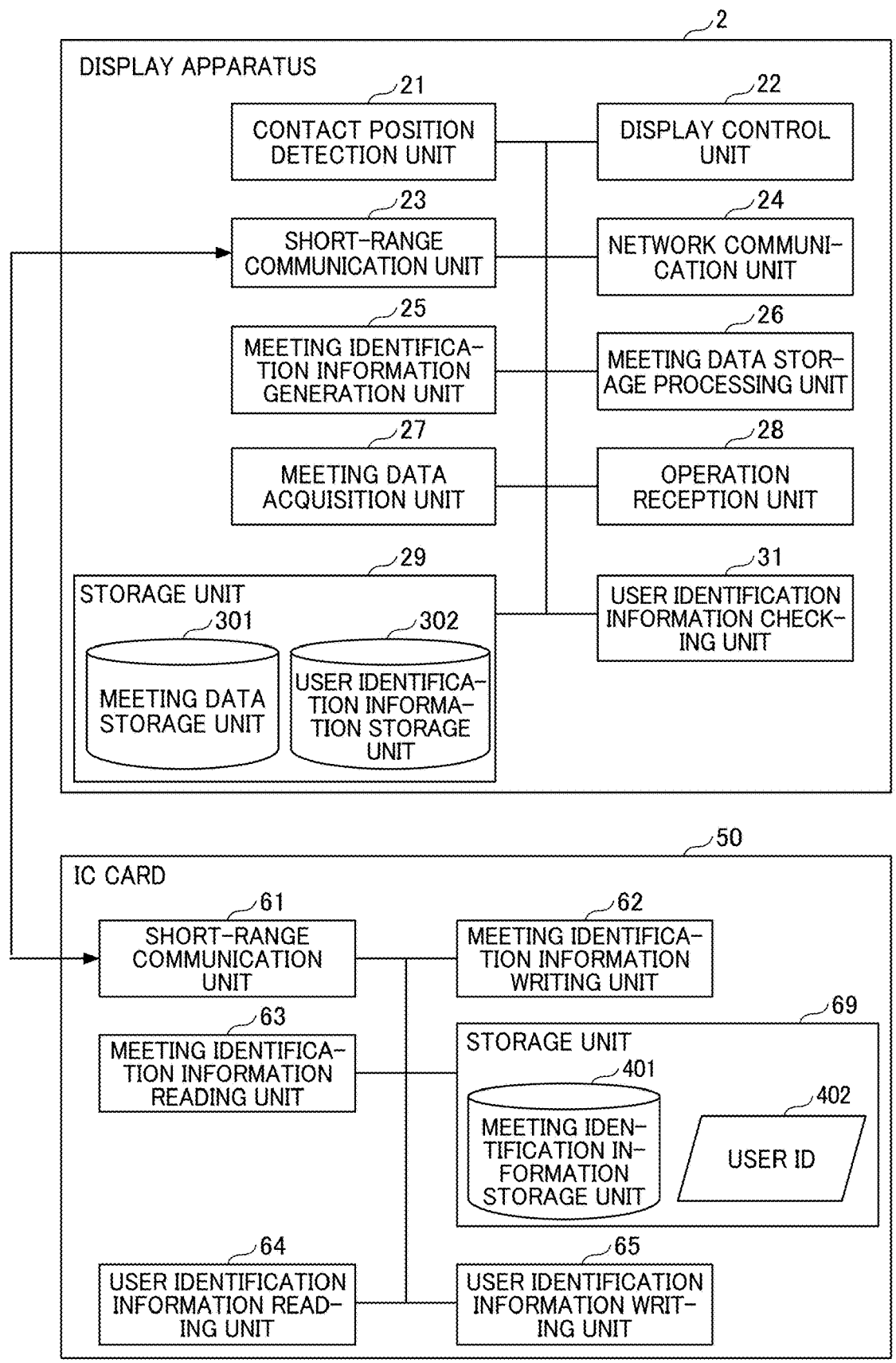
FIG. 20 is an example of configuration of functional block diagram of a display apparatus and an IC card according to an embodiment 4 of this disclosure.

FIG. 20 is an example of configuration of functional block diagram of the display apparatus 2 and the IC card 50. A difference with respect to FIG. 6 is mainly described for FIG. 20.

In the embodiment 4, the display apparatus 2 includes user identification information checking unit 31, and the storage unit 29 includes user identification information storage unit 302.

The user identification information checking unit 31 compares the user ID transmitted from the IC card 50 and the user ID stored in the user identification information storage unit 302. The user ID of user who uses the display apparatus 2 is pre-set in the user identification information storage unit 302 by an administrator or the like.

Further, in the embodiment 4, the IC card 50 includes user identification information reading unit 64, and user identification information writing unit 65. The user stores a user ID 402 (hereinafter, user ID code is omitted) in the IC card 50 in advance. For example, the user connects an IC card reader/writer to a PC used by the user, and uses an application software for the IC card 50 to store the user ID in the IC card 50. Specifically, the user identification information writing unit 65 writes the user ID to the storage unit 69. The user identification information reading unit 64 reads out the user ID from the storage unit 69.

Table 7 is an example of meeting data stored in the meeting data storage unit 301 of the embodiment 4. The meeting data includes presented data associated with meeting ID and user ID. The user ID is identification information identifying each user.

TABLE 8

| USER ID = 458723 | |
| --- | --- |
| CARD ID | MEETING ID |
| ABC | 12398 |
|  | 5463 |
|  | ... |

Table 8 is an example of meeting information stored in the meeting identification information storage unit 401 of the embodiment 4. In Table 8, the meeting information is a list of meeting IDs. Further, the user ID is stored in the storage unit 69.

Screen Transition

The screen transition of the embodiment 4 is similar to that of FIG. 7 and FIG. 8 of the embodiment 1. Further, a flow of starting the meeting without holding the IC card 50 is the same as in the embodiments 1 and 2.

When the user performs a meeting and ends the meeting, the user presses the end button 315 of meeting displayed on the display 3 (FIG. 7C). Then, the meeting data storage processing unit 26 of the display apparatus 2 stores the presented data in association with the meeting ID and the user ID in the meeting data storage unit 301, in which the user ID was read out from the IC card 50 at the start of the meeting to perform the user authentication.

Then, the display apparatus 2 displays the message 312 of "Please hold IC card" on the display 3 (FIG. 7D). Then, the user stores the meeting ID in the IC card 50.

At a later time, if the user selects the start button 311 of meeting displayed on the display 3 to start the meeting, the display apparatus 2 displays the message 312 of "Please hold IC card" on the display 3 (FIG. 8A). When the user holds the IC card 50 over the short-range communication circuit 219, the short-range communication unit 23 of the display apparatus 2 transmits a read command of meeting ID to the IC card 50.

When the short-range communication unit 61 of the IC card 50 receives the read command, the short-range communication unit 61 transmits the read command to the meeting identification information reading unit 63, and then the meeting identification information reading unit 63 reads out a meeting ID from the meeting identification information storage unit 401. If a plurality of meeting IDs is stored in the meeting identification information storage unit 401, the meeting identification information reading unit 63 reads out the plurality of meeting IDs from the meeting identification information storage unit 401.

The short-range communication unit 61 also transmits the same read command to the user identification information reading unit 64, and then the user identification information reading unit 64 reads out the user ID (value=458723) from the storage unit 69. Then, the short-range communication unit 61 of the IC card 50 sets the meeting ID and the user ID in a response, and transmits the response to the display apparatus 2.

When the short-range communication unit 23 of the display apparatus 2 receives the response, the meeting data acquisition unit 27 compares the meeting ID included in the response and the meeting ID stored in the meeting data storage unit 301. Further, the user identification information checking unit 31 compares the user ID included in the response and the user ID stored in the user identification information storage unit 302.

If the meeting ID and the user ID received from the IC card 50 are respectively stored in the meeting data storage unit 301 and the user identification information storage unit 302, the display control unit 22 displays a list of user ID and presented data on the display 3.

Further, if the meeting ID received from the IC card 50 matches the meeting ID stored in the meeting data storage unit 301, the display apparatus 2 displays the user ID and presented data stored in association with the matched meeting ID in the meeting data storage unit 301. FIG. 21 illustrates an example of display of the list of user ID and presented data. With this displaying style, the meeting data stored by different users can be also displayed.

FIG. 21 is an example of a list of presented data displayed on the display 3. The size of presented data is reduced because the presented data is displayed in the list. Although not indicated in FIG. 21, presented data of "ABC" is associated with the meeting ID=12398, and other presented data is associated with other meeting ID.

Procedure

Figure 22:
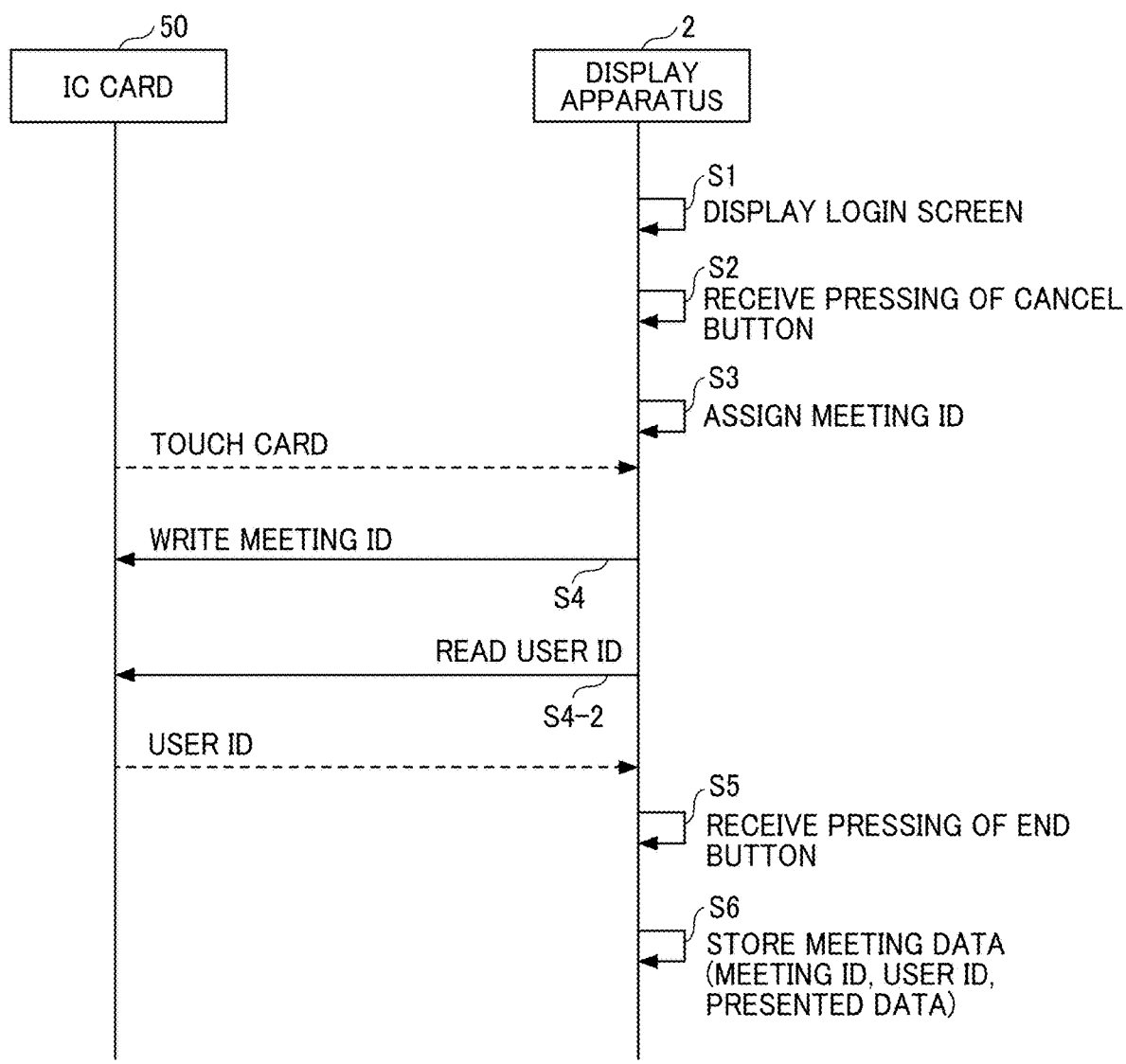
FIG. 22 is an example of a sequence diagram illustrating a flow of processing performed by a display apparatus at a start of a meeting when a meeting ID is not stored according to an embodiment 4 of this disclosure.

FIG. 22 is an example of a sequence diagram illustrating a flow of processing performed by the display apparatus 2 at a start of a meeting when a meeting ID is not stored. A difference with respect to FIG. 9 is mainly described for FIG. 22.

As illustrated in FIG. 22, in step S4-2, the user ID is transmitted to the display apparatus 2 from the IC card 50.

In step S6, the presented data is stored in association with the meeting ID and the user ID.

Figure 23:
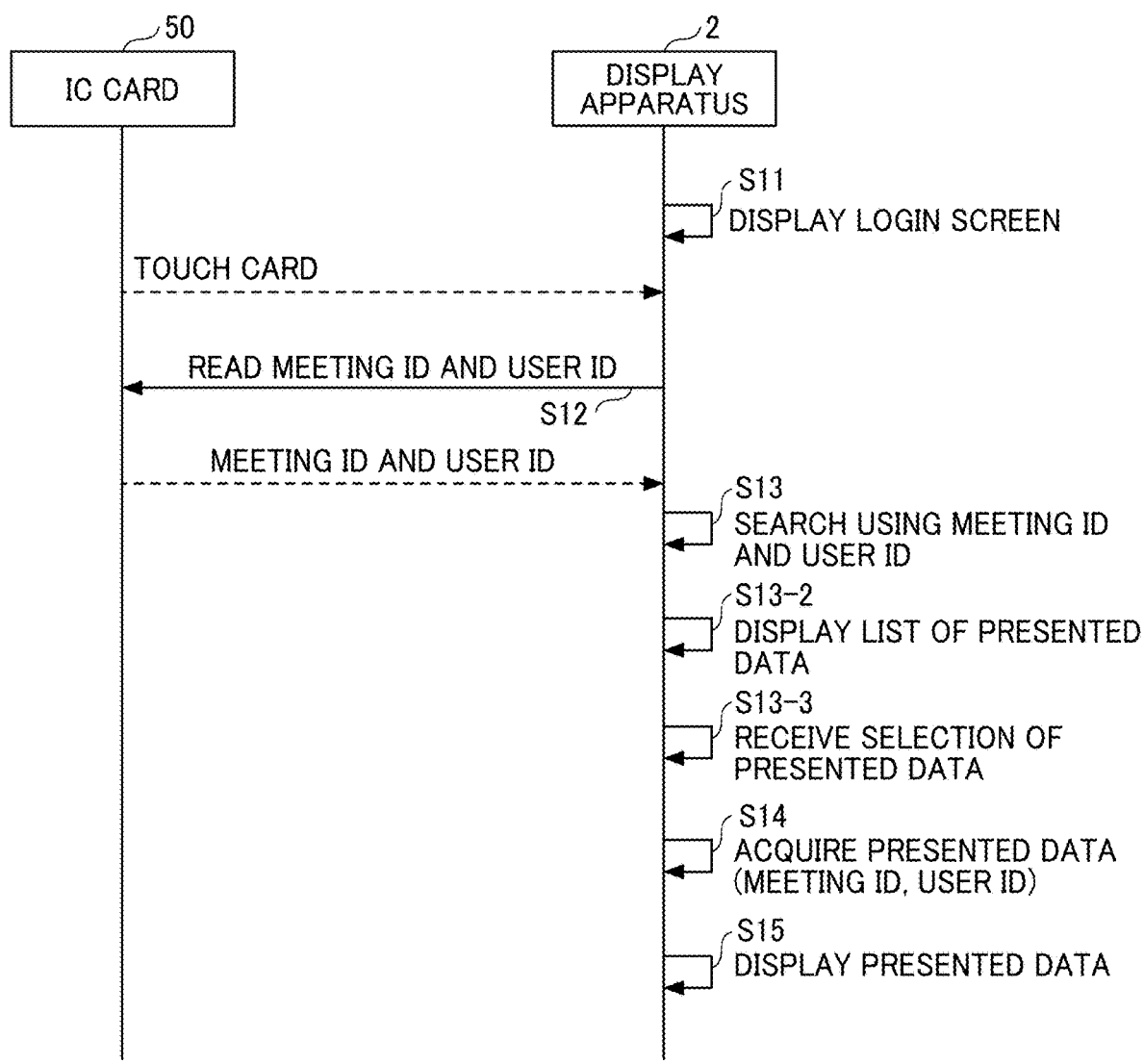
FIG. 23 is an example of a sequence diagram illustrating a flow of processing performed by a display apparatus at a start of a meeting when a user resumes the meeting according to an embodiment 4 of this disclosure.

FIG. 23 is an example of a sequence diagram illustrating a flow of processing performed by the display apparatus 2 at a start of a meeting when a user resumes the meeting. A difference with respect to FIG. 10 is mainly described for FIG. 23.

As illustrated in FIG. 23, in step S12, the user ID is transmitted to the display apparatus 2 with the meeting ID from the IC card 50.

In step S13, the meeting data storage unit 301 is searched using the meeting ID and the user ID.

In step S13-2, the display control unit 22 displays the list of presented data as illustrated in FIG. 21.

In step S13-3, the operation reception unit 28 receives a selection of presented data.

In step S14, the meeting data acquisition unit 27 uses the user ID and the meeting ID as a search key to acquire or obtain the selected presented data from the meeting data storage unit 301.

In step S15, the display control unit 22 displays the presented data on the display 3.

Figure 24:
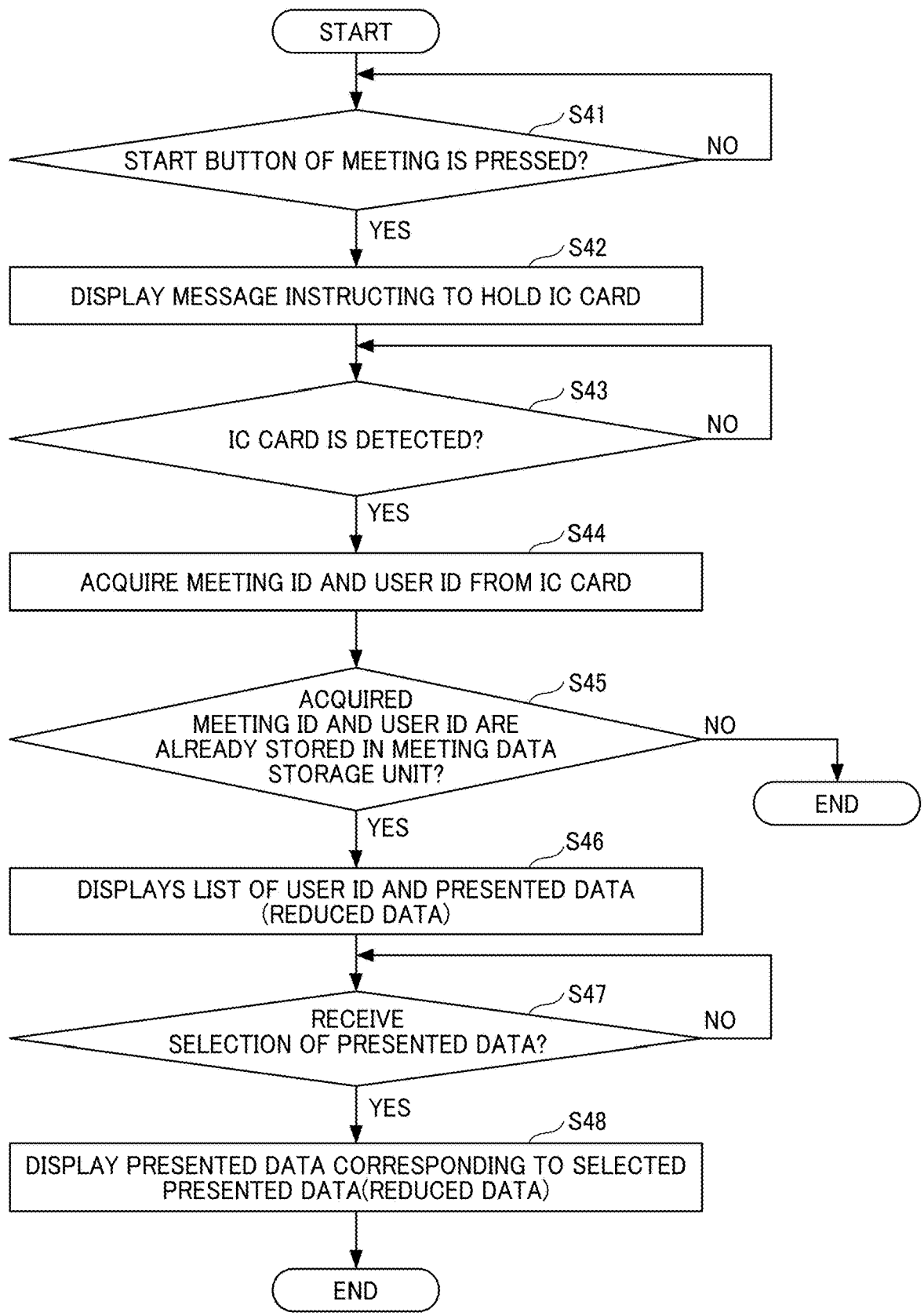
FIG. 24 is an example of a flowchart illustrating processing performed by a display apparatus according to an embodiment 4 of this disclosure.

FIG. 24 is an example of a flowchart illustrating processing performed by the display apparatus 2. FIG. 24 illustrates the processing at a start of a meeting. A difference with respect to FIG. 11 is mainly described for FIG. 24. The processing in steps S41 to S43 are the same as those in steps S21 to S23 in FIG. 11.

If the IC card 50 is detected (step S43: YES), the short-range communication unit 23 acquires or obtains the meeting ID and the user ID from the IC card 50 (step S44).

Then, the meeting data acquisition unit 27 determines whether the meeting data (e.g., presented data), associated with the read-out meeting ID and the user ID, is stored in the meeting data storage unit 301 (step S45). If the meeting data (e.g., presented data), associated with the read-out meeting ID and the user ID, is not stored in the meeting data storage unit 301 (step S45: NO), the display apparatus 2 cannot display the meeting data (e.g., presented data), and then the sequence of FIG. 24 ends.

If the meeting data (e.g., presented data), associated with the read-out meeting ID and the user ID, is stored in the meeting data storage unit 301 (step S45: YES), the meeting data acquisition unit 27 acquires or obtains the meeting data (e.g., presented data) from the meeting data storage unit 301, and displays a list of user ID and presented data (step S46).

When the operation reception unit 28 receives a selection of meeting data (presented data) by the user (step S47: YES), the display control unit 22 displays the selected presented data on the display 3 (step S48).

As described above, in the embodiment 4, the meeting data (e.g., presented data), associated with the meeting ID and the user ID, can be displayed on the display apparatus 2, in addition to the effect of the embodiment 1.

Embodiment 5

In an embodiment 5 of the image processing system 1, a description is given of a case that the display apparatus 2 causes the IC card 50 to store a meeting date (e.g., meeting holding date) with a meeting ID.

In the embodiment 5, the hardware block diagram illustrated in FIGS. 3 to 5 and the functional block diagram illustrated in FIG. 6 described in the above embodiment 1 are also employed. In the embodiment 5, the meeting data acquisition unit 27 uses a particular meeting date input by an user to search the meeting data storage unit 301 to acquire particular meeting data of the meeting date matching the particular meeting date used for searching.

Table 9 is an example of meeting data stored in the meeting data storage unit 301 of the embodiment 5. The meeting data includes presented data and last-page number associated with meeting ID and meeting date. The meeting date is a start time of meeting. Further, the end time of meeting, or the start time and end time of meeting may be recorded and stored as the meeting date.

TABLE 10

| CARD ID | MEETING ID | MEETING DATE |
|---------|------------|--------------|
| ABC     | 12398      | 2019 Jan. 23 14:06 |
|         | 5463       | 2019 Jan. 17 10:58 |
|         | . . .      | . . .        |

Table 10 is an example of meeting information stored in the meeting identification information storage unit 401 of the embodiment 5. In Table 10, the meeting information associates the meeting ID and the meeting date.

Screen Transition

The screen transition of the embodiment 5 is similar to that of FIG. 7 and FIG. 8 of the embodiment 1. When the user selects the start button 311 of meeting displayed on the display 3 of the display apparatus 2 to start the meeting (FIG. 7A), the meeting identification information generation unit 25 of the display apparatus 2 generates a meeting ID, and stores the meeting ID in the RAM 203 with a meeting date.

Then, when the user performs the meeting and ends the meeting, the user selects the end button 315 of meeting displayed on the display 3 (FIG. 7D). Then, the meeting data storage processing unit 26 of the display apparatus 2 stores the presented data in the meeting data storage unit 301 in association with the meeting ID and the meeting date. Then, the display apparatus 2 displays the message 312 of "Please hold IC card" on the display 3 (FIG. 7D).

When the user holds the IC card 50 over the short-range communication circuit 219, the short-range communication unit 23 of the display apparatus 2 sets the meeting ID and the meeting date, stored in the RAM 203, in a write command, and transmits the write command to the IC card 50.

When the short-range communication unit 61 of the IC card 50 receives the write command, the short-range communication unit 61 transfers the write command to the meeting identification information writing unit 62, and then the meeting identification information writing unit 62 stores or writes the meeting ID and the meeting date included in the write command to the meeting identification information storage unit 401.

Further, if the above described operation is performed at a plurality of meetings, a plurality number of pair of meeting ID and meeting date is stored in the IC card 50.

At a later time, if the user selects the start button 311 of meeting displayed on the display 3 of the display apparatus 2 to start the meeting, the display apparatus 2 displays the message 312 of "Please hold IC card" on the display 3 (FIG. 8A).

When the user holds the IC card 50 over the short-range communication circuit 219, the short-range communication unit 23 of the display apparatus 2 transmits the read command of meeting ID to the IC card 50.

When the short-range communication unit 61 of the IC card 50 receives the read command, the short-range communication unit 61 transmits the read command to the meeting identification information reading unit 63, and then the meeting identification information reading unit 63 reads out one or more pairs of meeting ID and meeting date being stored in the meeting identification information storage unit 401, from the meeting identification information storage unit 401.

Then, the short-range communication unit 61 of the IC card 50 sets the read-out one or more pairs of meeting ID and meeting date in a response, and transmits the response to the display apparatus 2.

When the short-range communication unit 23 of the display apparatus 2 receives the response, the meeting data acquisition unit 27 compares the meeting ID included in the response and the meeting ID stored in the meeting data storage unit 301.

Figure 25:
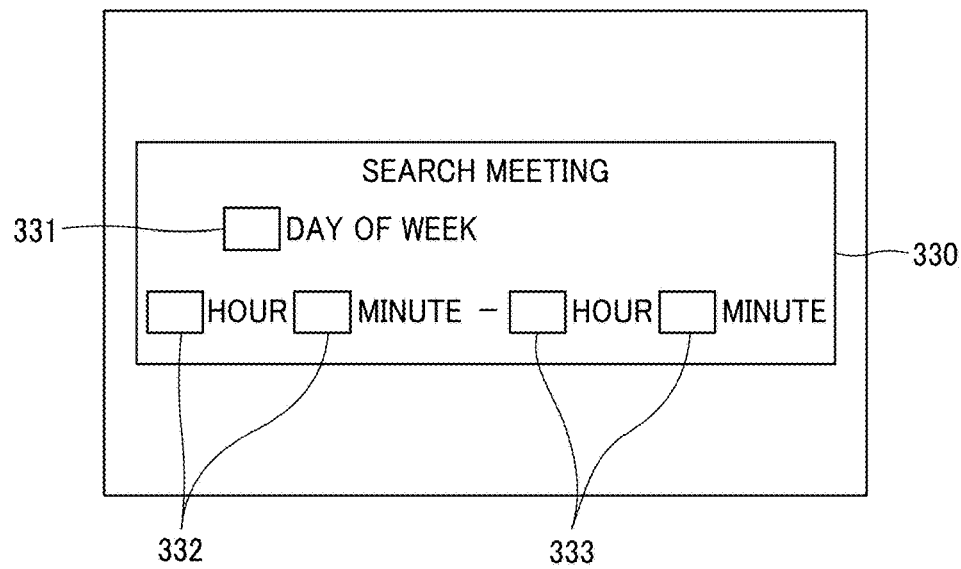
FIG. 25 is an example of input screen used for inputting a meeting date of meeting displayed on a display according to an embodiment 5 of this disclosure.

Then, if the compared meeting IDs have the same value, the display control unit 22 of the display apparatus 2 displays an input screen 330 of meeting date on the display 3 (see FIG. 25).

FIG. 25 is an example of the input screen 330 used for inputting a meeting date of meeting, displayed on the display 3. The input screen 330 of meeting date includes, for example, a day field 331, a start time field 332, and an end time field 333. For example, when a user inputs "Wednesday, 13:55 to 14:10," the operation reception unit 28 receives the input information, and then the meeting data acquisition unit 27 of the display apparatus 2 displays the meeting ID received from the IC card 50 matching the meeting ID stored in the meeting data storage unit 301 and having the matched meeting date, on the display 3.

Figure 26A:
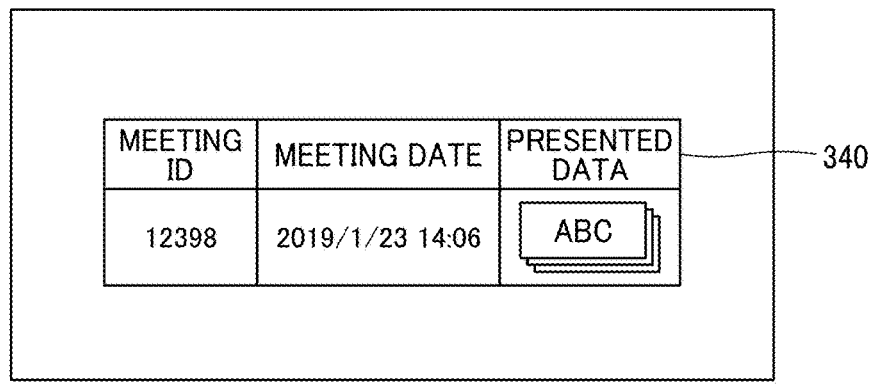
FIGS. 26A and 26B illustrate examples of screen of a list of meeting data displayed on a display according to an embodiment 5 of this disclosure.
Figure 26B:
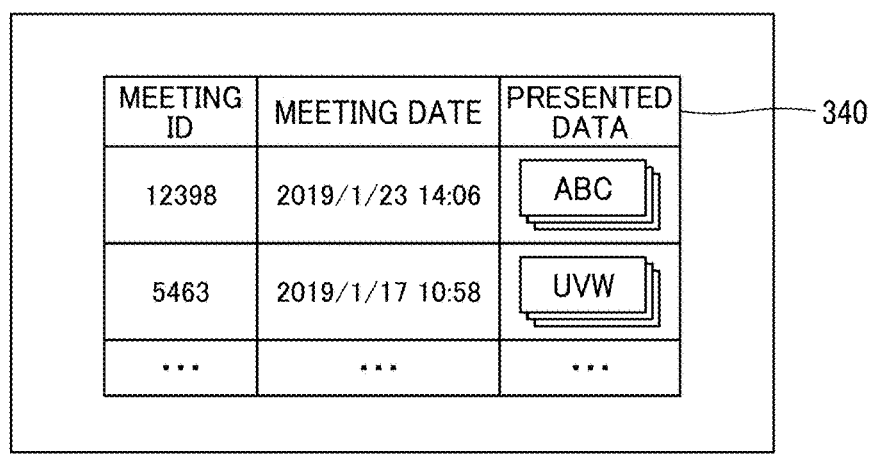

FIGS. 26A and 26B illustrate examples of a list screen 340 of meeting data displayed on the display 3. As indicated in FIG. 26A, the list screen 340 displays the meeting ID, meeting date, and presented data (reduced size) of the meeting data satisfying the search condition input in FIG. 25.

Further, as illustrated in FIG. 26B, the display apparatus 2 can display any meeting data having the meeting ID, received from the IC card 50 and matching the meeting ID stored in the meeting data storage unit 301. Although the meeting date of the second row of FIG. 26B does not satisfy the search condition input in FIG. 25, the meeting data is displayed because the two meeting IDs match.

When the user selects the meeting ID (value=12398) displayed in FIG. 26A or FIG. 26B, the display apparatus 2 reads out the presented data stored in association with the meeting ID (value=12398) from the meeting data storage unit 301, and displays the presented data on the display 3. With this configuration, the meeting identified by the meeting ID=12398 is resumed.

Procedure

Figure 27:
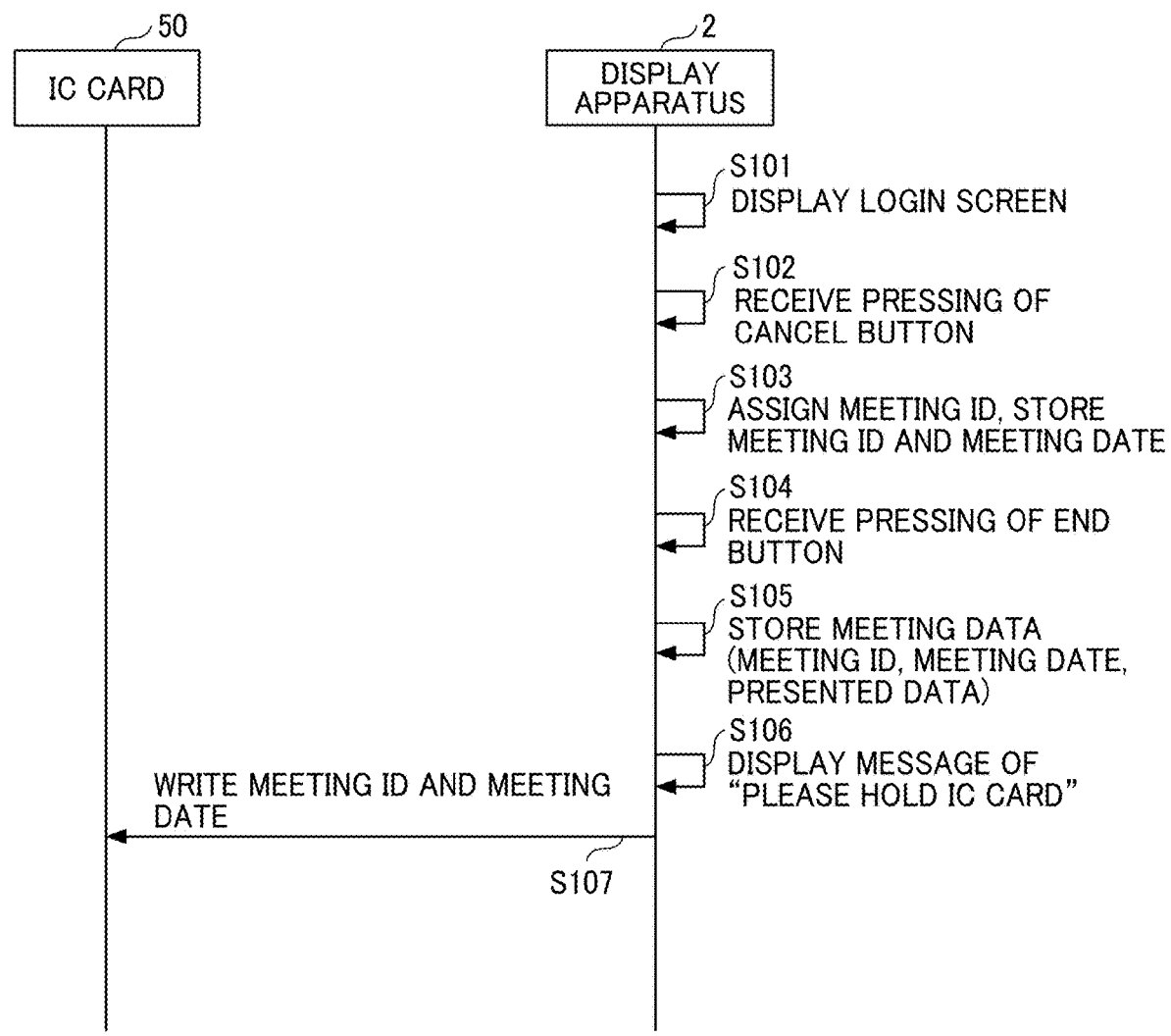
FIG. 27 is an example of a sequence diagram illustrating a flow of processing performed by a display apparatus at a start of a meeting when a meeting ID and a meeting date are not stored according to an embodiment 5 of this disclosure.

FIG. 27 is an example of a sequence diagram illustrating a flow of processing performed by the display apparatus 2 at a start of a meeting when a meeting ID and a meeting date are not stored.

S101: The operation reception unit 28 of the display apparatus 2 detects a pressing of the start button 311 of meeting. Then, the display control unit 22 displays the login screen 320 on the display 3.

S102: When the user presses the cancel button 313, the operation reception unit 28 of the display apparatus 2 receives the pressing of the cancel button 313, and then the display control unit 22 erases or deletes the login screen 320. Further, the start button 311 is switched to the end button 315.

S103: The meeting identification information generation unit 25 of the display apparatus 2 generates or assigns a meeting ID, and stores the meeting ID in the RAM 203 with a meeting date (e.g., current date and time).

S104: Then, when the user performs the meeting and ends the meeting, the user presses the end button 315 of meeting displayed on the display 3, and then the operation reception unit 28 receives the pressing of the end button 315.

S105: The meeting data storage processing unit 26 of the display apparatus 2 stores the presented data and the meeting ID in the meeting data storage unit 301 in association with the meeting date.

S106: The display apparatus 2 displays the message 312 of "Please hold IC card" on the display 3.

S107: When the user holds the IC card 50 over the short-range communication circuit 219, the short-range communication unit 23 of the display apparatus 2 sets the meeting ID and the meeting date, stored in the RAM 203, in a write command, and transmits the write command to the IC card 50. Then, the IC card 50 stores the meeting ID and the meeting date.

Figure 28:
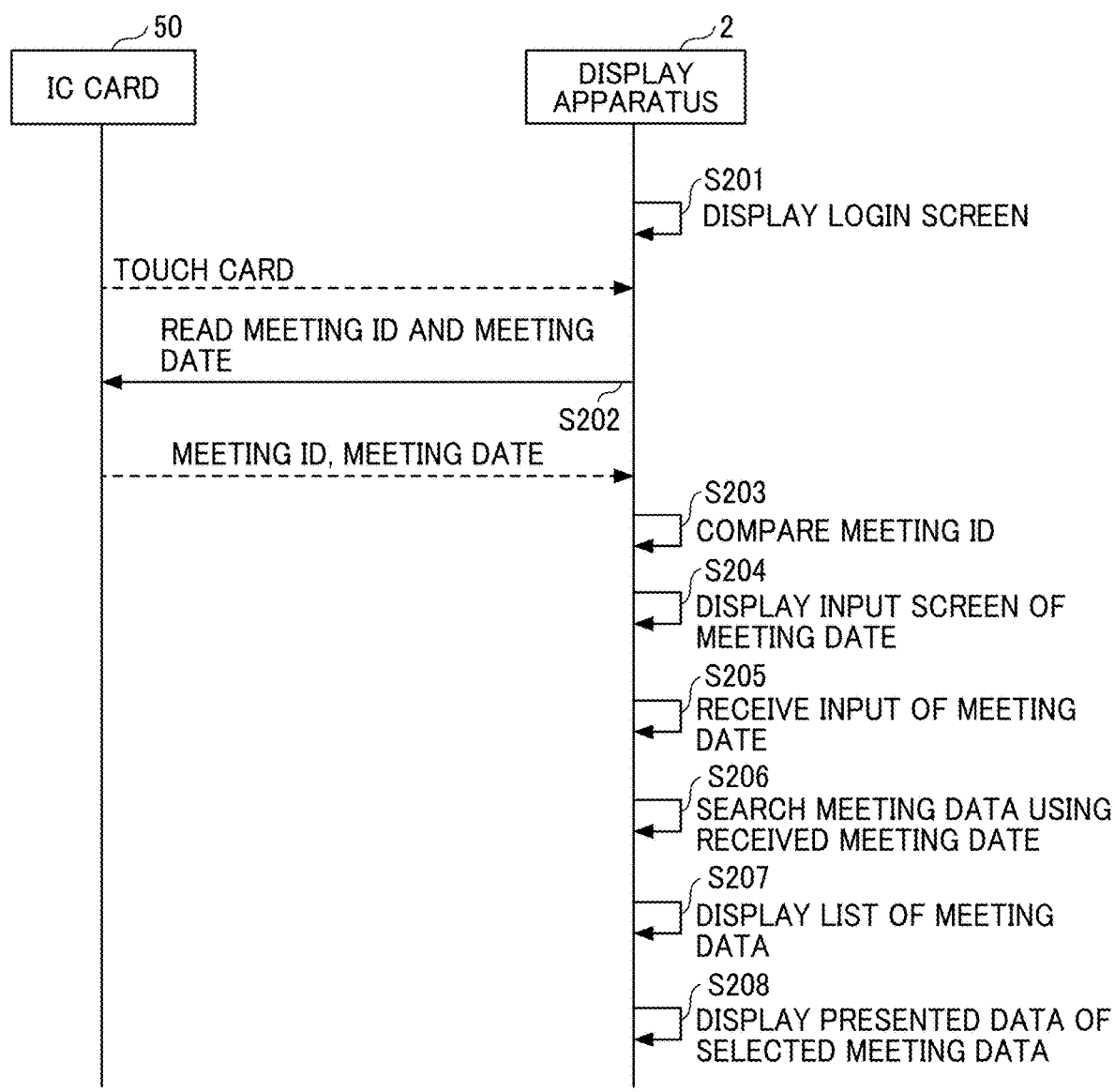
FIG. 28 is an example of a sequence diagram illustrating a flow of processing performed by a display apparatus at a start of a meeting when a user resumes the meeting according to an embodiment 5 of this disclosure.

FIG. 28 is an example of a sequence diagram illustrating a flow of processing performed by the display apparatus 2 at a start of a meeting when a user resumes the meeting.

S201: The operation reception unit 28 of the display apparatus 2 detects a pressing of the start button 311 of meeting. Then, the display control unit 22 displays the login screen 320 on the display 3.

S202: Then, the user holds the IC card 50 over the short-range communication circuit 219. Then, the short-range communication unit 23 of the display apparatus 2 transmits a read command of meeting ID and meeting date to the IC card 50. Then, the short-range communication unit 61 of the IC card 50 transmits the being-stored meeting ID and meeting date to the display apparatus 2.

S203: When the short-range communication unit 23 of the display apparatus 2 receives the response including the meeting ID and the meeting date, the meeting data acquisition unit 27 compares the meeting ID included in the response and the meeting ID stored in the meeting data storage unit 301.

S204: Then, if the compared meeting IDs have the same value, the display control unit 22 of the display apparatus 2 displays the input screen 330 of meeting date on the display 3.

S205: When the user inputs a particular meeting date, the operation reception unit 28 receives the input particular meeting date.

S206: The meeting data acquisition unit 27 uses the received particular meeting date to search the meeting data in the meeting data storage unit 301.

S207: The display control unit 22 displays a list of meeting data matching the particular meeting date used for searching, on the display 3.

S208: When the user selects the meeting data, the operation reception unit 28 receives the selection of the meeting data, the meeting data acquisition unit 27 acquires or obtains the meeting data identified by the meeting ID from the meeting data storage unit 301, and then displays the presented data on the display 3.

Figure 29:
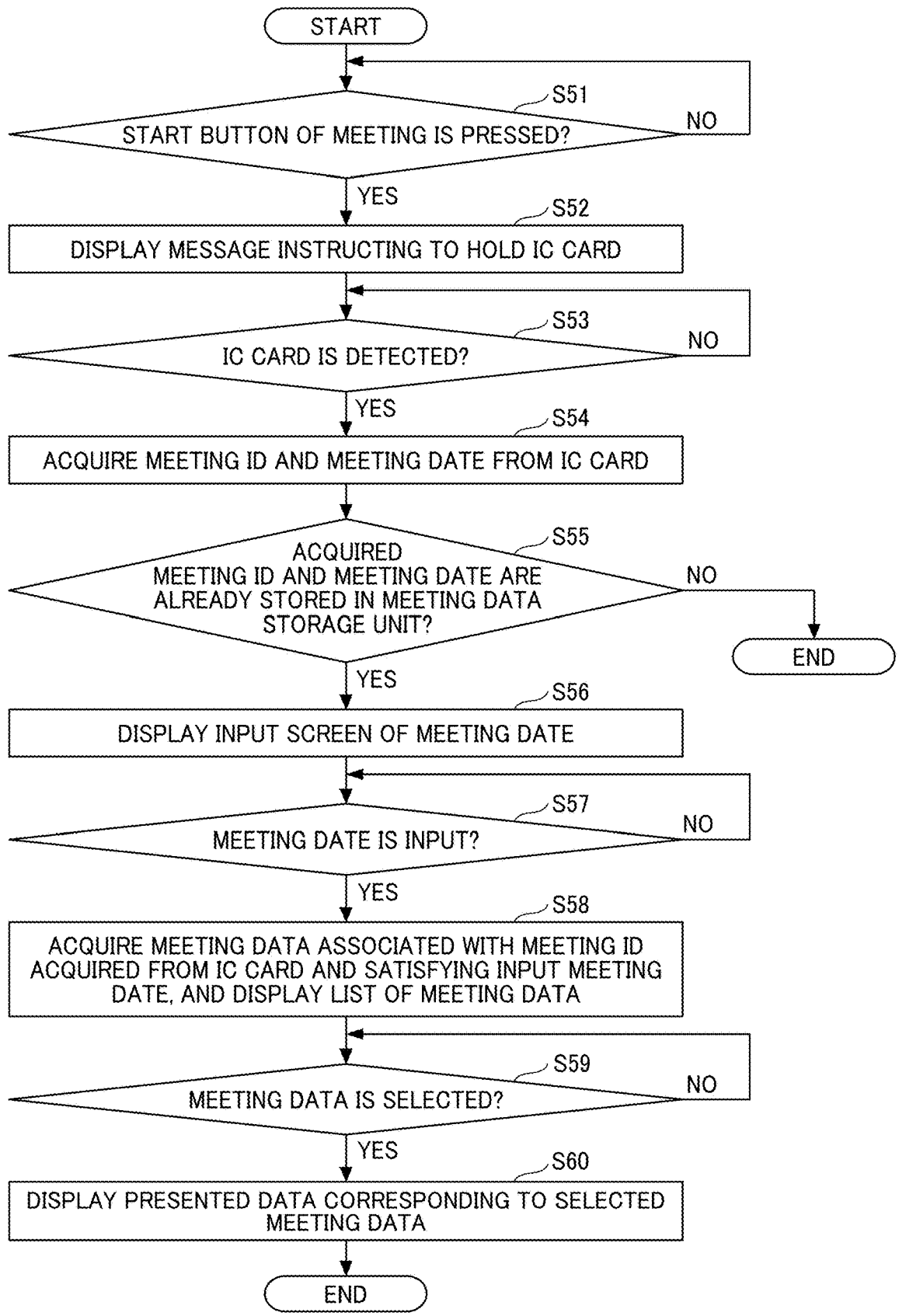
FIG. 29 is an example of a flowchart illustrating processing performed by a display apparatus according to an embodiment 5 of this disclosure.

FIG. 29 is an example of a flowchart illustrating processing performed by the display apparatus 2. FIG. 29 illustrates the processing performed at a start of a meeting. A difference with respect to FIG. 11 is mainly described for FIG. 29. The processing in steps S51 to S53 are the same as those in step S21 to S23 of FIG. 11

If the IC card 50 is detected (step S53: YES), the short-range communication unit 23 acquires or obtains the meeting ID and the meeting date from the IC card 50 (step S54). If the user inputs a meeting date using the input screen 330, the IC card 50 does not need to transmit the meeting date to the display apparatus 2.

Then, the meeting data acquisition unit 27 determines whether the read-out meeting ID is stored in the meeting data storage unit 301 (step S55). If the meeting data acquisition unit 27 determines that the read-out meeting ID is not stored in the meeting data storage unit 301 (step S55: NO), the display apparatus 2 cannot display the meeting data, and the sequence of FIG. 29 ends.

If the meeting data acquisition unit 27 determines that the read-out meeting ID is stored in the meeting data storage unit 301 (step S55: YES), the display control unit 22 displays the input screen 330 of meeting date on the display 3 (step S56).

Then, the operation reception unit 28 determines whether or not a particular meeting date is input (step S57).

If the operation reception unit 28 determines that the particular meeting date is input (step S57: YES), the meeting data acquisition unit 27 acquires or obtains the meeting data associated with the meeting ID acquired from the IC card 50 and satisfying the input particular meeting date from the meeting data storage unit 301, and then the display control unit 22 displays a list of meeting data on the display 3 (step S58).

Then, the operation reception unit 28 determines whether or not particular meeting data is selected (step S59).

If the operation reception unit 28 determines that the particular meeting data is selected (step S59: YES), the meeting data acquisition unit 27 acquires or obtains the selected particular meeting data from the meeting data storage unit 301, and then the display control unit 22 displays the presented data (step S60).s Further, in the embodiment 5, the user inputs the particular meeting date, but the user operation of inputting the particular meeting date can be omitted. In this case, when the display apparatus 2 receives the meeting ID and the meeting date from the IC card 50, the display apparatus 2 displays the list of meeting data corresponding to a chronological order of the meeting date going back from the present date, on the display 3.

As described above, in the embodiment 5, the meeting data searched by using the meeting date can be displayed on the display apparatus 2 in addition to the effect of the embodiment 1.

Embodiment 6

In an embodiment 6 of the image processing system 1, a description is given of a case that the meeting data is stored in the data server 70.

Configuration of Image Processing System

Figure 30:
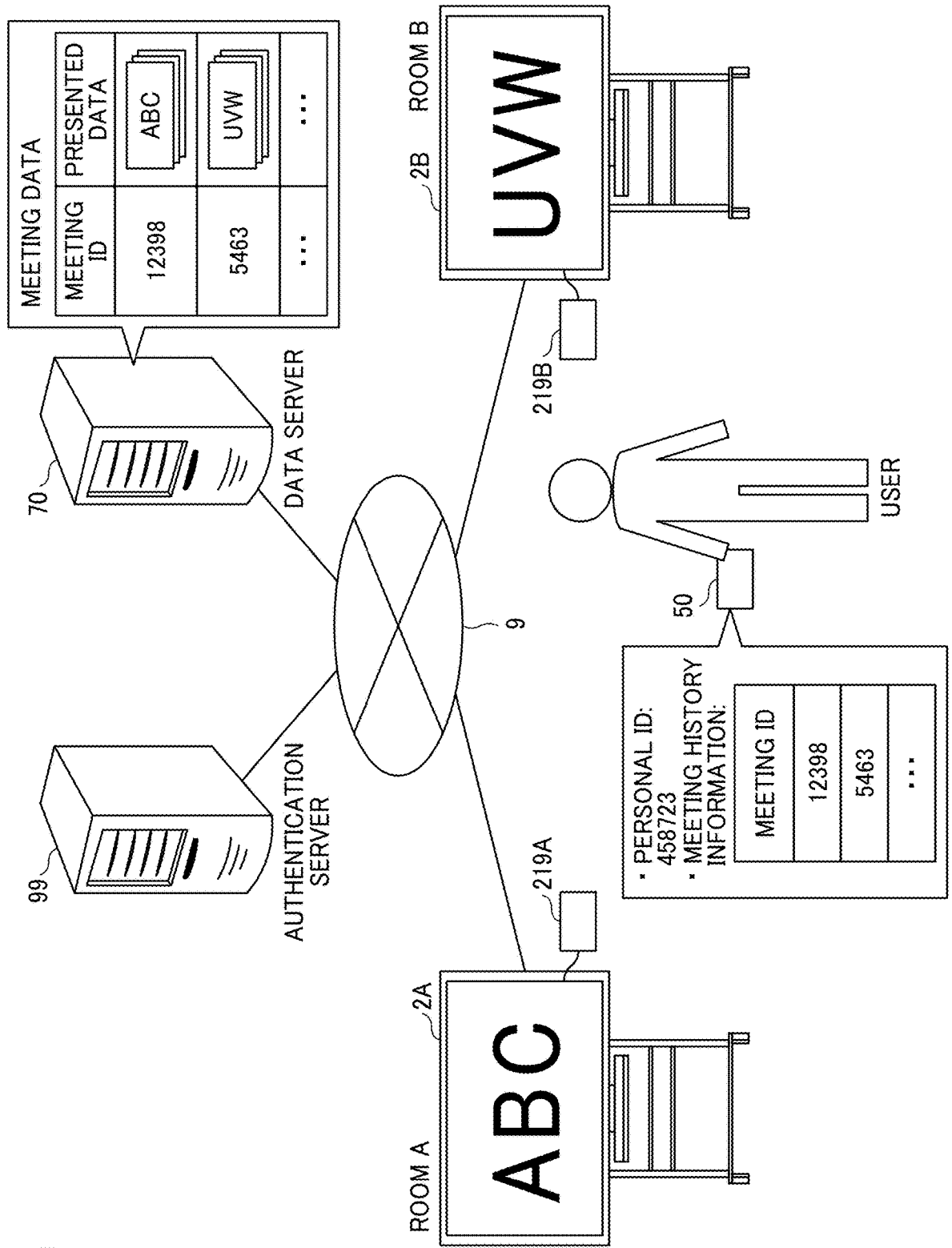
FIG. 30 is an example of configuration of an image processing system according to an embodiment 6.

FIG. 30 is an example of configuration of the image processing system 1 of the embodiment 6. A short-range communication circuit 219A is connected to a display apparatus 2A disposed in a meeting room A, and a short-range communication circuit 219B is connected to a display apparatus 2B disposed in a meeting room B.

The authentication server 99 registers the user ID and the password of the users who use the display apparatus 2. The authentication server 99 determines whether the user ID and the password, transmitted from the display apparatus 2, matches the user ID and the password registered in advance. The data server 70 stores the meeting ID, the presented data, or the like.

Functional Configuration

Figure 31:
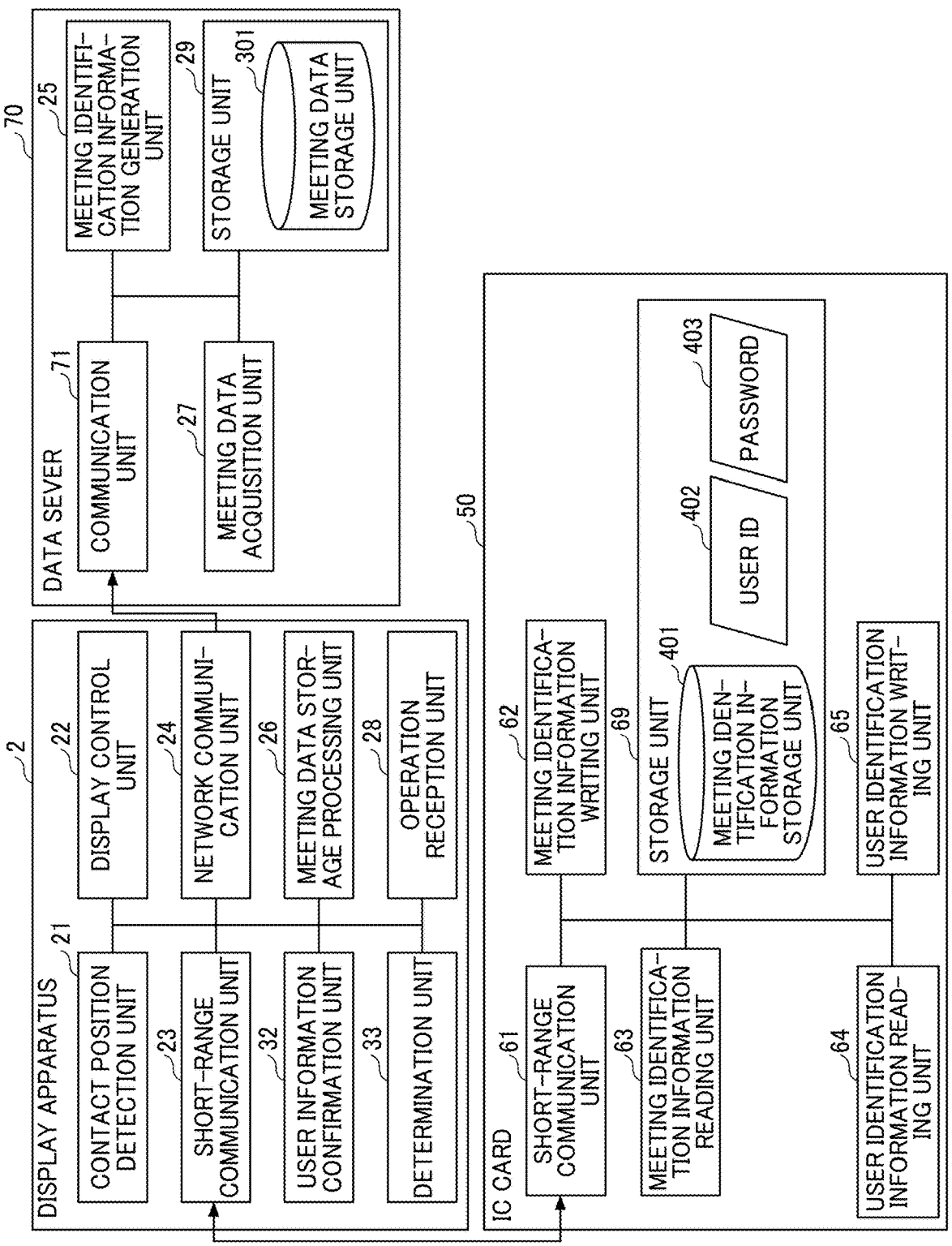
FIG. 31 is an example of configuration of functional block diagram of a display apparatus, an IC card, and a data server according to an embodiment 6.

FIG. 31 is an example of configuration of functional block diagram of the display apparatus 2, the IC card 50, and the data server 70 of the embodiment 6. The IC card 50 may be the same as in FIG. 20 of the embodiment 4, but password 403 (hereinafter, code is omitted) is stored in the storage unit 69.

Data Server

As illustrated in FIG. 31, the data server 70 includes, for example, communication unit 71, meeting identification information generation unit 25, and meeting data acquisition unit 27. Each of the functional units of the data server 70 is a function or means implemented by any one of the components illustrated in FIG. 4 under the instruction from the CPU 501 executing programs loaded on the RAM 503 from the HD 504.

The communication unit 71 connects to the communication network 9 to transmit and receive various data with the display apparatus 2 or the like. For example, the communication unit 71 transmits and receives the meeting data. The communication unit 71 stores the received meeting data in the meeting data storage unit 301.

The meeting data acquisition unit 27 acquires or obtains the meeting data identified by the meeting ID from the meeting data storage unit 301.

Further, the data server 70 includes the meeting data storage unit 301 implemented by the HD 504 or RAM 503 illustrated in FIG. 4. The configuration of meeting data stored in the meeting data storage unit 301 may be the same as in Table 1.

Display Apparatus

As illustrated in FIG. 31, the display apparatus 2 includes, for example, user information confirmation unit 32, and determination unit 33, but omitting the meeting identification information generation unit 25, the meeting data acquisition unit 27, the user identification information checking unit 31, and the meeting data storage unit 301 illustrated in FIG. 6. As illustrated in FIG. 31, the data server 70 includes the meeting data acquisition unit 27, and the meeting data storage unit 301.

The user information confirmation unit 32 transmits the user ID and the password read out from the IC card 50 to the authentication server 99. If the authentication result received from the authentication server 99 is successful, the user information confirmation unit 32 allows the user to use the display apparatus 2, and if the authentication result received from the authentication server 99 is failure, the user information confirmation unit 32 does not allow the user to use the display apparatus 2. These processing is referred to as the user authentication. Further, the user can use one or more resources of the display apparatus 2 when the user authentication is successful. The user authentication processing may be also referred to as the login processing.

The determination unit 33 determines whether the meeting ID transmitted from the IC card 50 is zero. If the meeting ID transmitted from the IC card 50 is zero, it means that the meeting ID is not stored in the IC card 50.

Further, the network communication unit 24 transmits the request to the authentication server 99 and the data server 70 using a communication protocol, such as hypertext transfer protocol (HTTP), and receives a response.

Procedure

Figure 32:
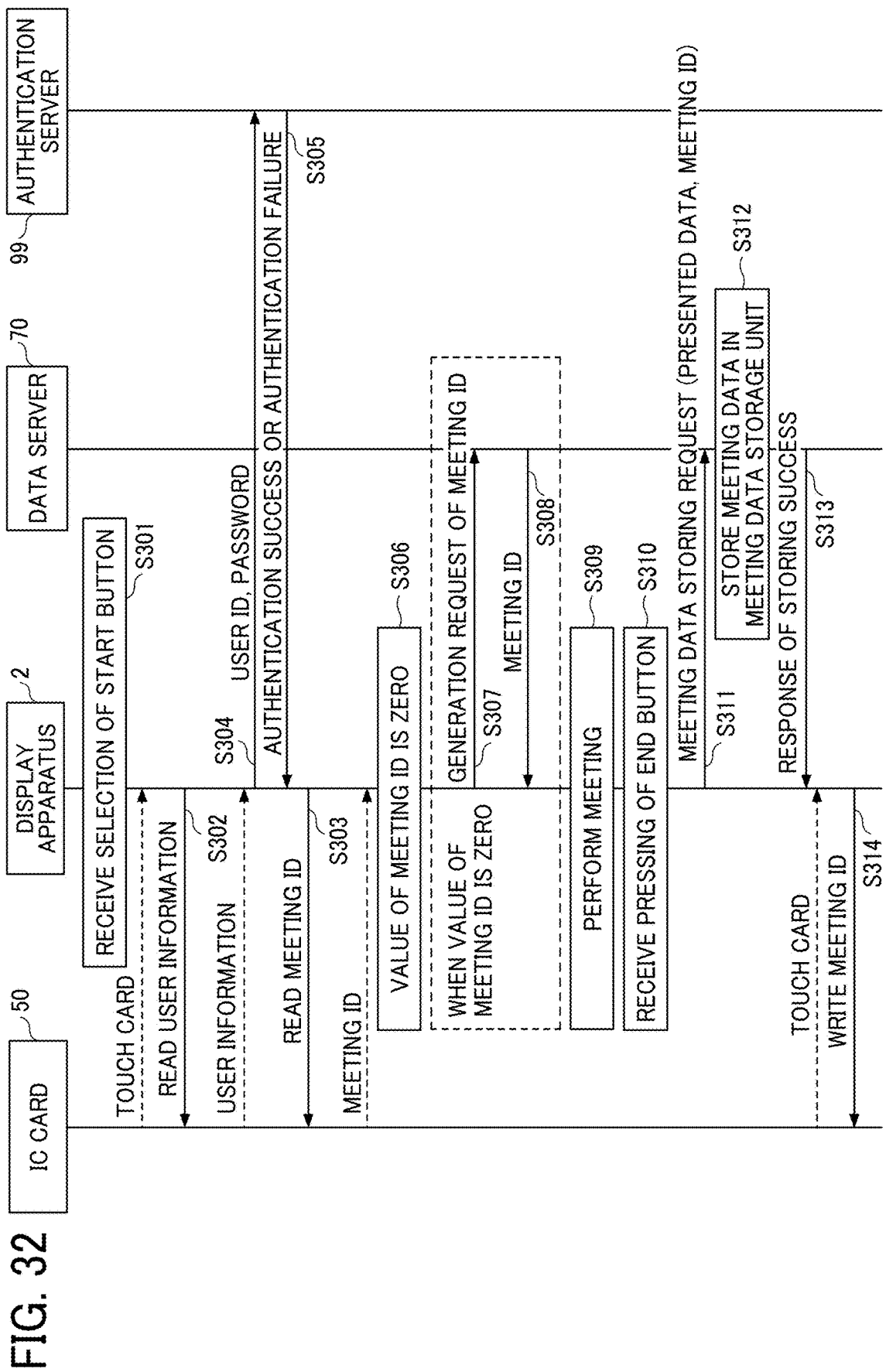
FIG. 32 is an example of a sequence diagram of processing performed by an IC card, a display apparatus, and a data server according to an embodiment 6.

FIG. 32 is an example of a sequence diagram of processing performed by the IC card 50, the display apparatus 2, and the data server 70. The screen transition of the embodiment 6 is similar to that of FIG. 7 and FIG. 8 of the embodiment 1.

S301: The display apparatus 2 displays the start button 311 of meeting at the right corner of the display 3 (FIG. 7A). If the user selects the start button 311 of meeting, the operation reception unit 28 receives the selection of the start button 311, and then the display control unit 22 of the display apparatus 2 displays the message 312 of "Please hold IC card" on the display 3 (FIG. 7B).

S302: When the user holds the IC card 50 over the short-range communication circuit 219, the short-range communication unit 23 of the display apparatus 2 transmits a read command of user information to the IC card 50.

When the short-range communication unit 61 of the IC card 50 receives the read command, the short-range communication unit 61 transfers the read command to the user identification information reading unit 64, and then the user identification information reading unit 64 reads out the user ID and the password from the storage unit 69. Then, the short-range communication unit 61 of the IC card 50 sets the user ID and the password in a response, and transmits the response to the display apparatus 2.

S303: The short-range communication unit 23 of the display apparatus 2 also transmits the read command of meeting ID to the IC card 50. When the short-range communication unit 61 of the IC card 50 receives the read command, the short-range communication unit 61 transfers the read command to the meeting identification information reading unit 63, and then the meeting identification information reading unit 63 reads out the meeting ID from the meeting identification information storage unit 401.

Then, the short-range communication unit 61 of the IC card 50 sets the meeting ID in a response, and transmits the response to the display apparatus 2. Further, if no meeting ID is stored in the meeting identification information storage unit 401, the short-range communication unit 61 of the IC card 50 sets a value of zero for the meeting ID.

S304: The user information confirmation unit 32 of the display apparatus 2 transmits, to the authentication server 99, the user ID and the password included in the response with respect to the read command of user information.

S305: When the authentication server 99 receives the response including the user ID and the password, the authentication server 99 determines whether the received user ID and the password are registered in the HD 504. If the user ID and password matching the received user ID and the password are registered in the HD 504, the authentication server 99 transmits the authentication success information to the display apparatus 2, and if the user ID and password matching the received user ID and the password are not registered in the HD 504, the authentication server 99 transmits the authentication failure information to the display apparatus 2. If the display control unit 22 of the display apparatus 2 receives the authentication failure information, the display control unit 22 displays a message of "this apparatus is unavailable for use" on the display 3, and returns to the login screen 320.

S306: If the display apparatus 2 receives the authentication success information, the determination unit 33 determines whether a value of the meeting ID received from the IC card 50 is zero or not.

S307: If the value of the meeting ID is zero, the network communication unit 24 of the display apparatus 2 transmits a request for generating a meeting ID to the data server 70.

S308: If the communication unit 71 of the data server 70 receives the generation request of meeting ID, the meeting identification information generation unit 25 generates a meeting ID, and the communication unit 71 sets the generated meeting ID in a response, and transmits the response to the display apparatus 2. Then, the meeting identification information generation unit 25 of the data server 70 stores the generated meeting ID in the meeting data storage unit 301.

S309: The network communication unit 24 of the display apparatus 2 stores the meeting ID received from the data server 70 in the RAM 203. Then, the user performs the meeting.

S310: When the user ends the meeting, the user presses the end button 315 of meeting displayed on the display 3. Then, the operation reception unit 28 receives the pressing of the end button 315.

S311: The network communication unit 24 of the display apparatus 2 includes the presented data, used during the meeting, with the meeting ID in a meeting data storing request, and transmits the meeting data storing request to the data server 70.

S312: When, the communication unit 71 of the data server 70 receives the meeting data storing request, the communication unit 71 stores the presented data in the meeting data storage unit 301 in association with the meeting ID as the meeting data.

S313: Further, the communication unit 71 of the data server 70 transmits a response of success of storing to the display apparatus 2.

S314: When the network communication unit 24 of the display apparatus 2 receives the response of success of storing, the display control unit 22 of the display apparatus 2 displays the message 312 of "Please hold IC card" on the display 3. When the user holds the IC card 50 over the short-range communication circuit 219, the short-range communication unit 23 of the display apparatus 2 sets the meeting ID, stored in the RAM 203, in a write command, and transmits the write command to the IC card 50.

When the short-range communication unit 61 of the IC card 50 receives the write command, the short-range communication unit 61 transmits the write command to the meeting identification information writing unit 62, and then the meeting identification information writing unit 62 writes the meeting ID included in the write command to the meeting identification information storage unit 401.

Figure 33A:
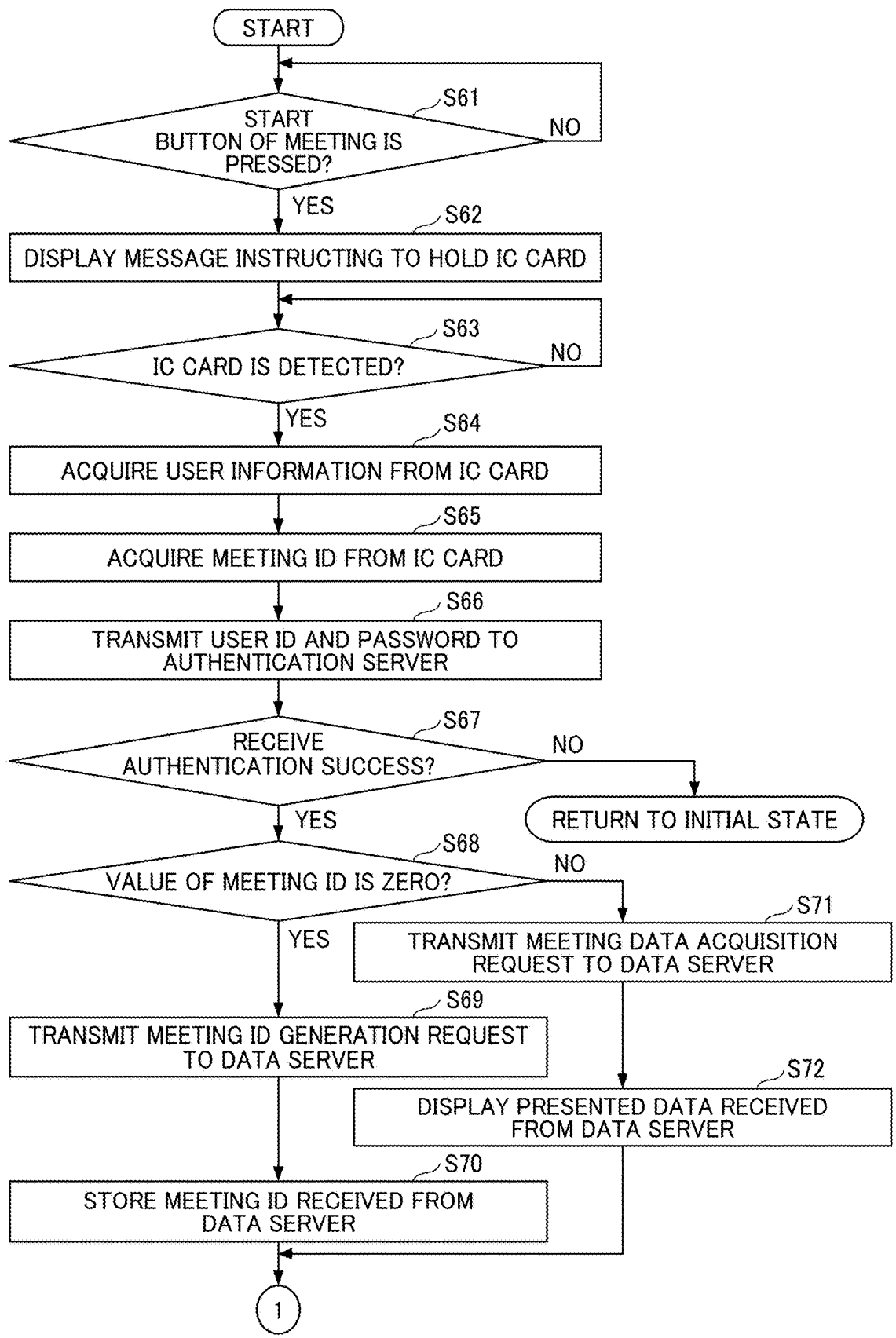
FIGS. 33A and 33B are an example of a flowchart illustrating processing performed by a display apparatus according to an embodiment 6.
Figure 33B:
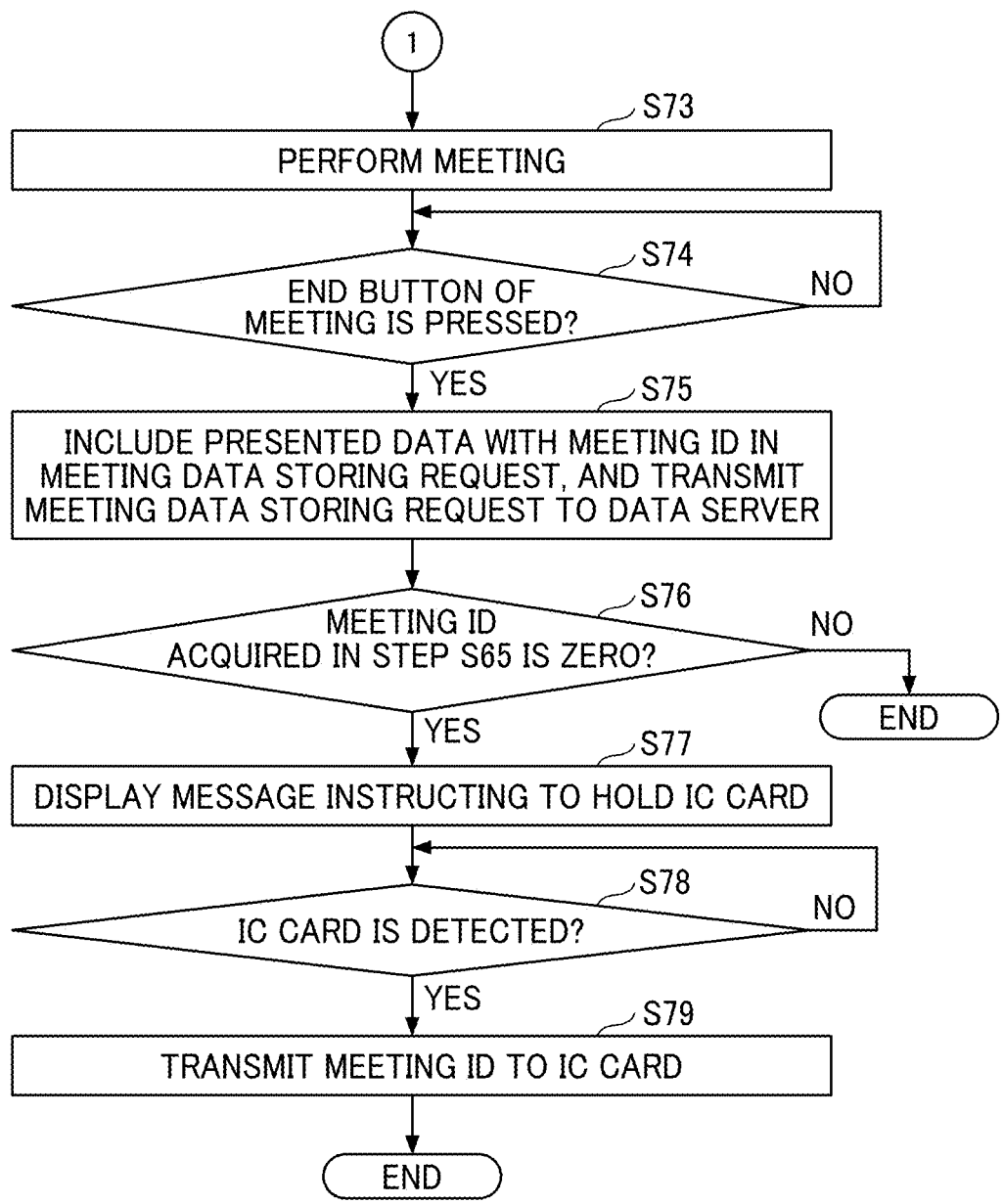

FIGS. 33A and 33B are an example of a flowchart illustrating processing performed by the display apparatus 2.

The operation reception unit 28 of the display apparatus 2 determines whether the start button 311 of meeting is pressed (step S61).

If the start button 311 of meeting is pressed (step S61; YES), the display control unit 22 displays a message of holding the IC card 50 over the display 3 (step S62).

Then, the short-range communication unit 23 determines whether or not the IC card 50 can be detected (step S63). If the communication with the IC card 50 can be performed, the IC card 50 is detected.

If the IC card 50 is detected (step S63: YES), the short-range communication unit 23 acquires or obtains the user information (e.g., user ID, password) from the IC card 50 (step S64).

Further, the short-range communication unit 23 acquires or obtains the meeting ID from the IC card 50 (step S65).

Then, the network communication unit 24 of the display apparatus 2 transmits the user ID and the password to the authentication server 99 (step S66).

Then, the network communication unit 24 determines whether or not the network communication unit 24 receives the authentication success from the authentication server 99 (step S67). If the network communication unit 24 receives the authentication failure (step S67: NO), the sequence of FIGS. 33A and 33B ends.

Then, if the network communication unit 24 receives the authentication success (step S67: YES), the determination unit 33 determines whether or not the value of the meeting ID received from the IC card 50 is zero (step S68).

If the determination unit 33 determines that the meeting ID is zero (step S68: YES), the network communication unit 24 transmits a meeting ID generation request to the data server 70 (step S69). When the data server 70 receives the meeting ID generation request, the meeting identification information generation unit 25 generates a meeting ID, and sets the meeting ID in a response with respect to the meeting ID generation request, and transmits the response to the display apparatus 2.

When the network communication unit 24 of the display apparatus 2 receives the response, the network communication unit 24 stores the meeting ID in the RAM 203 (step S70).

If the determination unit 33 determines that the meeting ID is not zero (step S68: NO), the network communication unit 24 transmits a meeting data acquisition request including the meeting ID to the data server 70 (step S71). When the data server 70 receives the meeting data acquisition request, the meeting data acquisition unit 27 acquires or obtains the presented data associated with the meeting ID from the meeting data storage unit 301, the meeting data acquisition unit 27 sets the presented data in a response with respect to the meeting data acquisition request, and then the meeting data acquisition unit 27 transmits the response to the display apparatus 2.

When the network communication unit 24 of the display apparatus 2 receives the response, the display control unit 22 displays the presented data on the display 3 (step S72).

Then, when the user performs a meeting (step S73), and ends the meeting by pressing the end button 315 of meeting displayed on the display 3 (step S74: YES). Then, the operation reception unit 28 receives the pressing of the end button 315.

Then, the meeting data storage processing unit 26 of the display apparatus 2 includes the presented data used for the meeting with the meeting ID in the meeting data storing request, and transmits the meeting data storing request to the data server 70 via the network communication unit 24 (step S75).

When the data server 70 receives the meeting data storing request, the data server 70 stores the presented data in association with the meeting ID in the meeting data storage unit 301, and returns a response of success of storing to the display apparatus 2.

Then, the determination unit 33 determines whether the meeting ID acquired in step S65 is zero or not (step S76). If the determination unit 33 determines that the meeting ID acquired in step S65 is not zero (step S76: NO), since the meeting ID is already stored, the sequence ends.

If the determination unit 33 determines that the meeting ID acquired in step S65 is zero (step S76: YES), the display control unit 22 of the display apparatus 2 displays the message 312 of "Please hold IC card" on the display 3 (step S77).

When the short-range communication unit 23 of the display apparatus 2 detects the IC card 50 (step S78: YES), the short-range communication unit 23 transmits the meeting ID to the IC card 50 (step S79). Then, the meeting ID having the value of not-zero is stored in the IC card 50.

Figure 34:
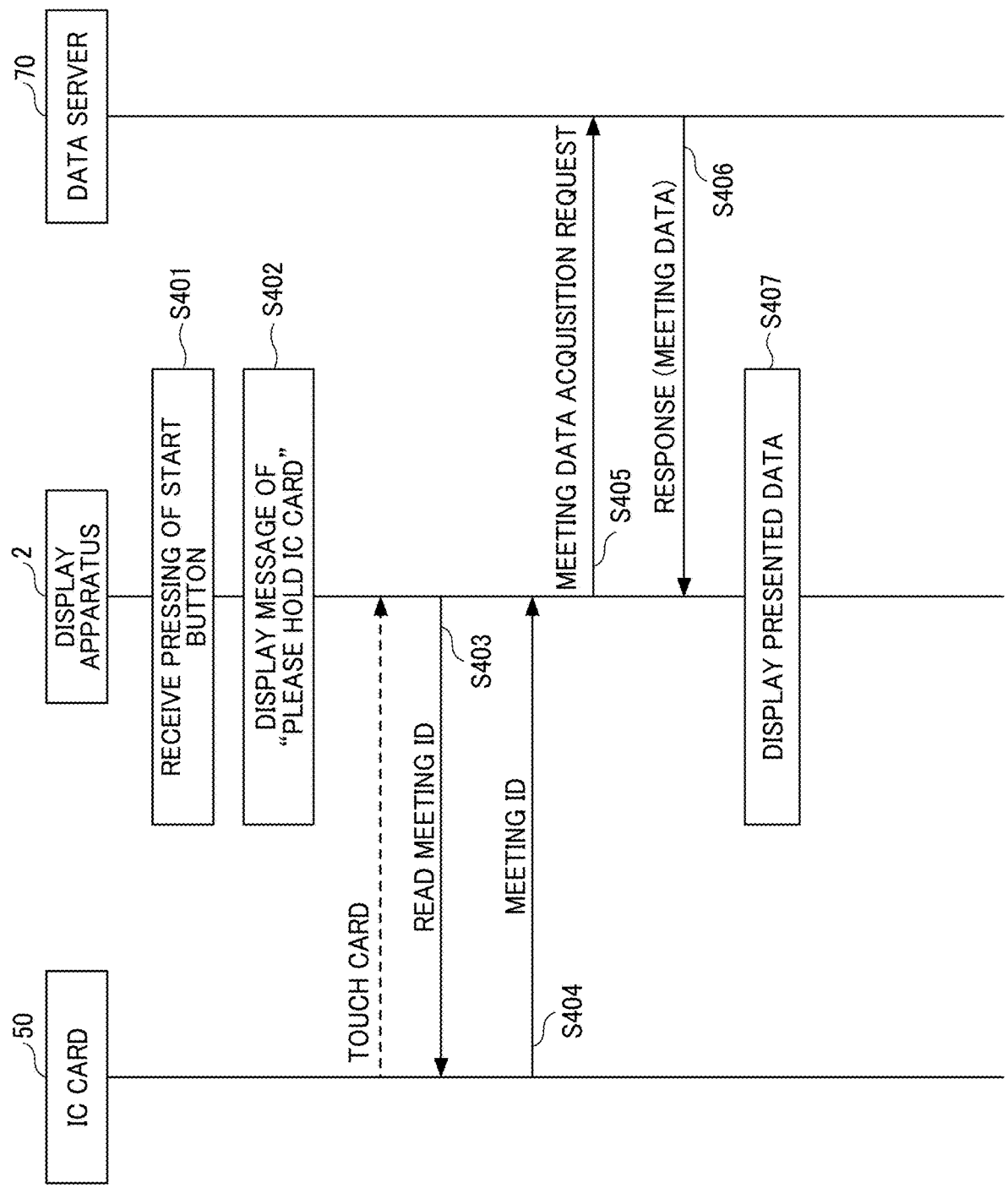
FIG. 34 is an example of a sequence diagram illustrating processing performed by an IC card, a display apparatus, and a data server when a user resumes a meeting according to an embodiment 6.

FIG. 34 is an example of a sequence diagram illustrating processing performed by the IC card 50, the display apparatus 2, and the data server 70 when a user resumes a meeting.

S401: A user presses the start button 311 of meeting displayed on the display 3 to resume the meeting. Then, the operation reception unit 28 receives the pressing of the start button 311.

S402: The display control unit 22 of the display apparatus 2 displays the message 312 of "Please hold IC card" on the display 3.

S403: When the user holds the IC card 50 over the short-range communication circuit 219, the short-range communication unit 23 of the display apparatus 2 transmits a read command of meeting ID to the IC card 50. When the short-range communication unit 61 of the IC card 50 receives the read command, the short-range communication unit 61 transfers the read command to the meeting identification information reading unit 63, and then the meeting identification information reading unit 63 reads out the meeting ID (value=12398) from the meeting identification information storage unit 401.

S404: Then, the short-range communication unit 61 of the IC card 50 sets the meeting ID in a response, and transmits the response to the display apparatus 2.

S405: When the short-range communication unit 23 of the display apparatus 2 receives the response, the short-range communication unit 23 transmits the received meeting ID to the network communication unit 24. Then, the network communication unit 24 includes the meeting ID in a meeting data acquisition request, and transmits the meeting data acquisition request to the data server 70.

S406: The meeting data acquisition unit 27 of the data server 70 acquires or obtains the meeting data (e.g., presented data), associated with the meeting ID included in the meeting data acquisition request, from the meeting data storage unit 301, and then the meeting data acquisition unit 27 sets the meeting data (e.g., presented data) in a response, and then transmits the response to the display apparatus 2.

S407: When the network communication unit 24 of the display apparatus 2 receives the meeting data (e.g., presented data), the display control unit 22 displays the presented data on the display 3. With this configuration, the meeting identified by the meeting ID=12398 is resumed.

In the embodiment 6, the presented data is associated with the meeting ID, but the meeting identification information described in the embodiments 1 to 5 can be associated with the presented data. That is, the meeting name of the embodiment 2, the meeting ID and the meeting room ID of the embodiment 3, or the meeting date of the embodiment 5 can be associated with the presented data. Further, the user identification information storage unit 302 of the embodiment 4 may be provided for the data server 70 so that the data server 70 can confirm or authenticate the user.

As described above, in the embodiment 6, in addition to the effect of the embodiment 1, any display apparatus 2 connected to the data server 70 can display the meeting data even if any display apparatus 2 was not actually used for performing the meeting by the user previously.

Embodiment 7

In an embodiment 7, a description is given of a case that the display apparatus 2 displays an image using a projection system. In a case of the display apparatus 2 such as projector that projects the image, the short-range communication circuit 219 is connected to the display apparatus 2, or the display apparatus 2 and the short-range communication circuit 219 can be configured to communicate wirelessly.

Alternative Example 1: Configuration of Display Apparatus

Although the display apparatus 2 of the above described embodiments has a large touch panel as above described, the display apparatus 2 is not limited to those having the touch panel.

Figure 35:
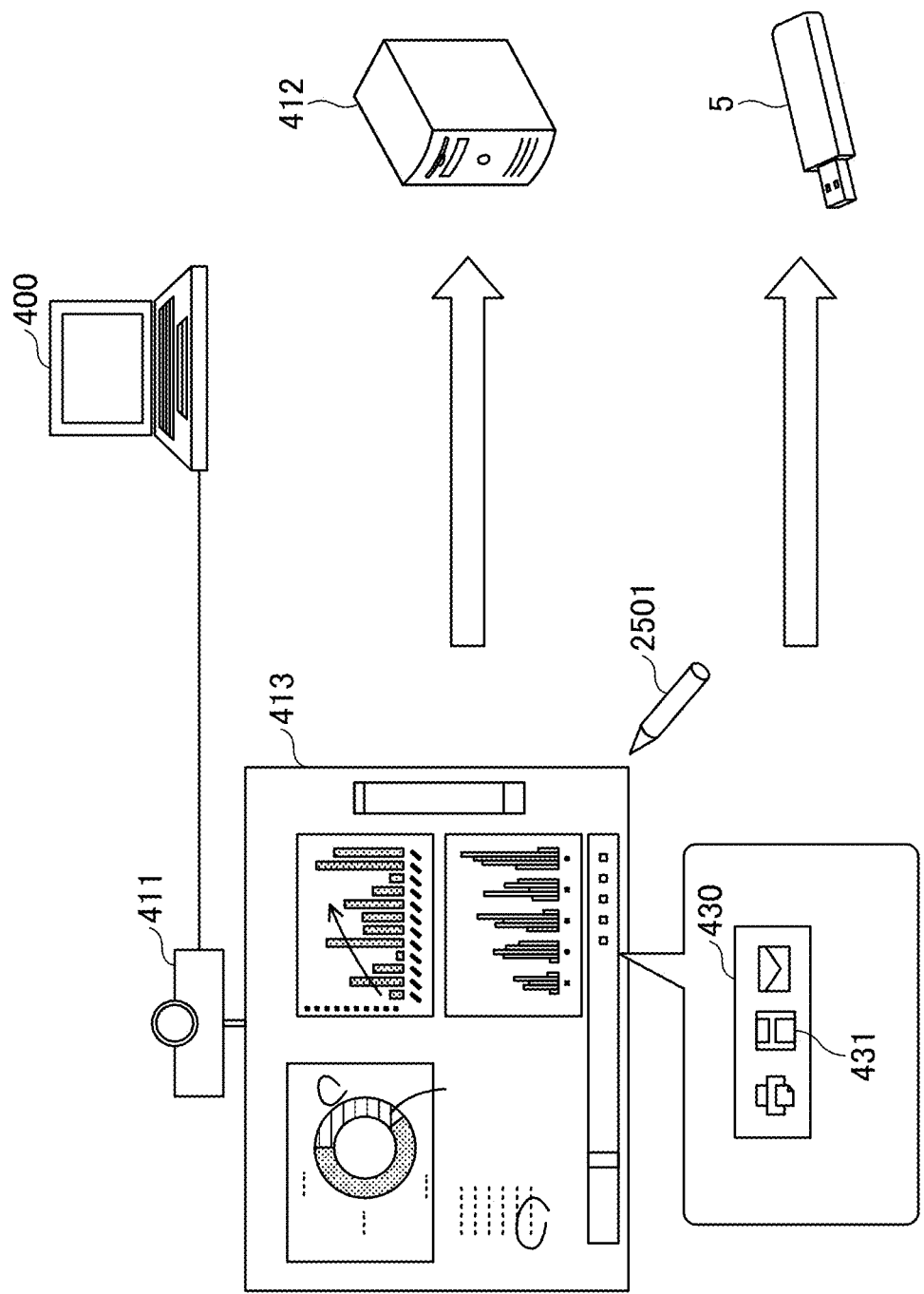
FIG. 35 is an example of configuration of a display apparatus according to an embodiment 7.

FIG. 35 is an example of configuration of the display apparatus of the embodiment 7. In an example case of FIG. 35, a projector 411 is disposed at the upper side of a whiteboard 413. The projector 411 corresponds to the display apparatus 2. The whiteboard 413 is not a flat panel display that is integrated with a touch panel, but the whiteboard 413 is a normal whiteboard that a user can write directly using a marker. Further, the whiteboard may be a blackboard, and may be a flat plane used for projecting images.

The projector 411 has an optical system of an ultra-short focus system to project images having little distortion onto the whiteboard 413 from about 10-cm distance. The image may be transmitted from a PC 400 connected wirelessly or by wire, or may be stored in the projector 411.

The user writes to the whiteboard 413 using a dedicated electronic pen 2501. The electronic pen 2501 has, for example, a light emitting unit at one end, in which a switch is turned on when the user presses the one end on the whiteboard 413 when performing a handwriting operation. The wavelength of light is not visible in the eye of user because the light is near-infrared ray or infrared ray. The projector 411 has a camera to capture an image of the light emitting unit, and the image is analyzed to identify the direction of the electronic pen 2501. Further, the electronic pen 2501 emits sound waves together with the light emission, and the projector 411 calculates a distance to the electronic pen 2501 based on the arrival time of sound waves. The position of the electronic pen 2501 can be determined by the direction and calculated distance. A stroke is drawn or projected at the position of the electronic pen 2501.

Since the projector 411 projects a menu 430, when the user presses a button on the menu 430 using the electronic pen 2501, the projector 411 determines the pressed button based on the position of the electronic pen 2501 and the switch ON signal. For example, when a save button 431 is pressed, a stroke (i.e., set of coordinates) written by the user is stored at the projector 411. The projector 411 stores handwritten information to a server 412 or a universal serial bus (USB) memory 5. The handwritten information is stored page by page. Since the handwritten information is stored as coordinate information instead of image data, the user can re-edit the handwritten information. Further, in the embodiment 7, since the operation command can be called by handwriting, the menu 430 may not be displayed.

Alternative Example 2: Configuration of Display Apparatus

Figure 36:
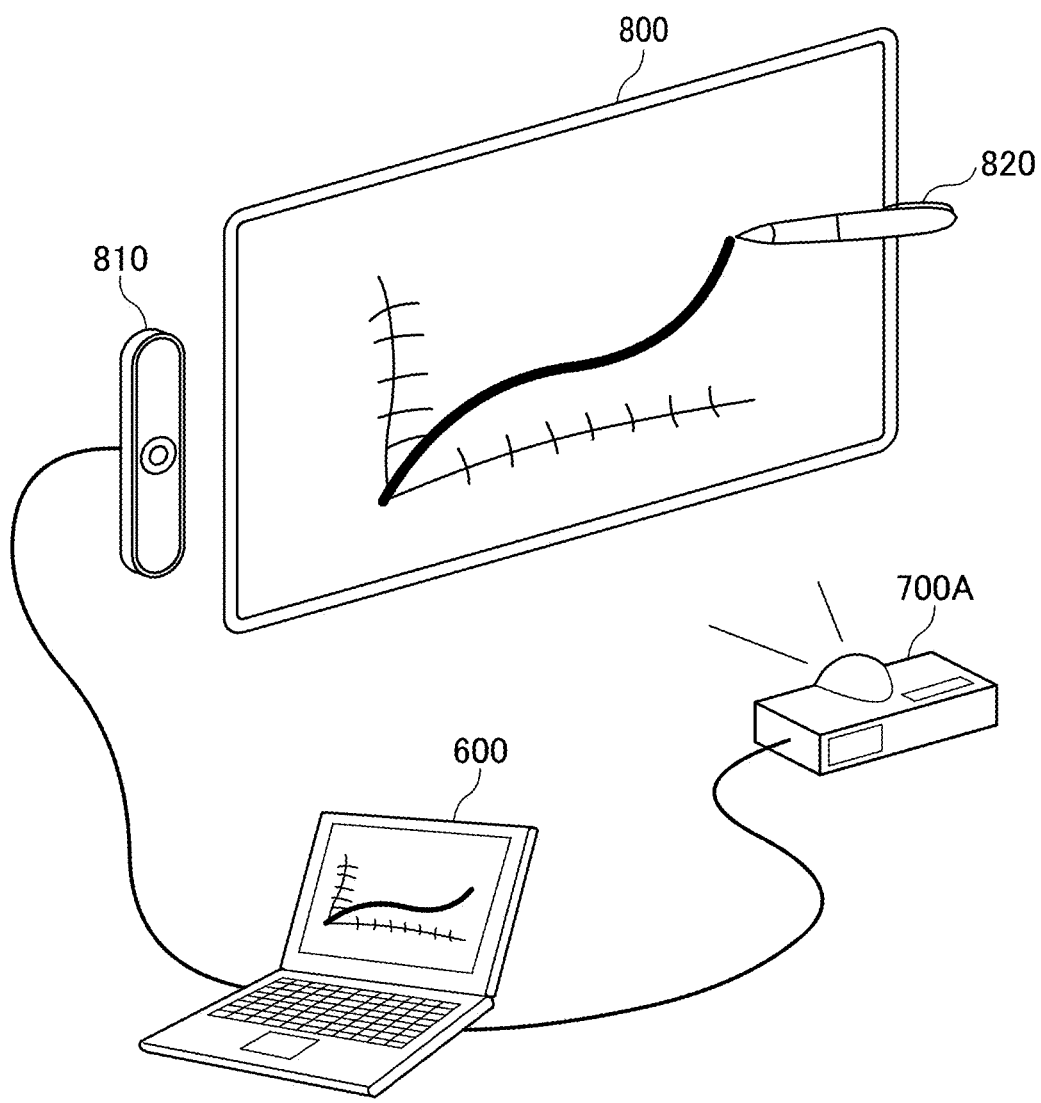
FIG. 36 is another example of configuration of a display apparatus according to an embodiment 7.

FIG. 36 is another example of configuration of the display apparatus of the embodiment 7. In an example case of FIG. 36, the display apparatus includes, for example, a terminal device 600, an image projection apparatus 700A, and a pen motion detection device 810.

The terminal device 600 is connected to the image projection apparatus 700A and the pen motion detection device 810 by wire. The image projection apparatus 700A projects image data input by the terminal device 600 on a screen 800.

The pen motion detection device 810 communicates with the electronic pen 820, and detects a motion of the electronic pen 820 in the vicinity of the screen 800. Specifically, the electronic pen 820 detects coordinate information indicating a point indicated by the electronic pen 820 on the screen 800, and transmits the detected coordinate information to the terminal device 600.

The terminal device 600 generates image data of stroke image input by the electronic pen 820 based on the coordinate information received from the pen motion detection device 810, and causes the image projection apparatus 700A to draw or project the stroke image on the screen 800.

Further, the terminal device 600 generates superimposed image data representing an image superimposing the background image projected onto the image projection apparatus 700A and the stroke image input by the electronic pen 820.

Alternative Example 3: Configuration of Display Apparatus

Figure 37:
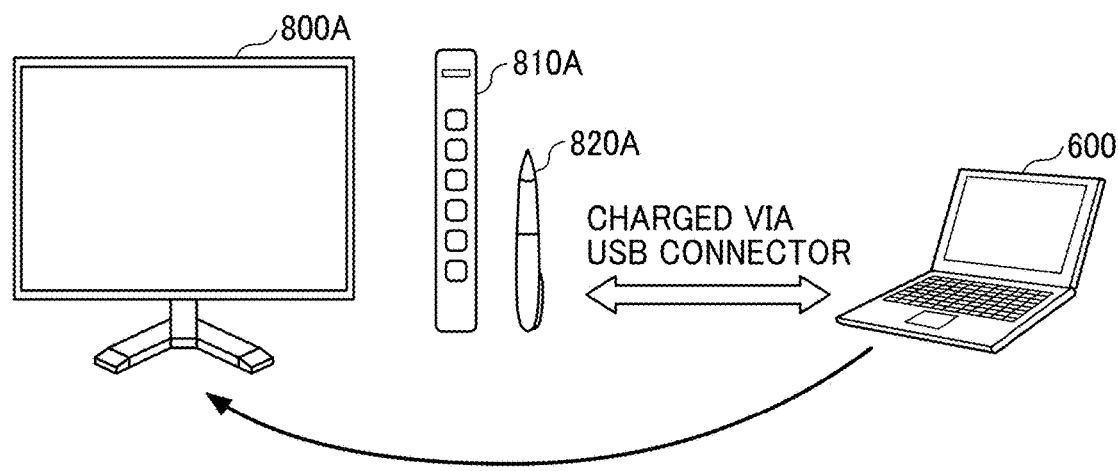
FIG. 37 is another example of configuration of a display apparatus according to an embodiment 7.

FIG. 37 is another example of configuration of the display apparatus of the embodiment 7. In an example case of FIG. 37, the display apparatus includes, for example, a terminal device 600, a display 800A, and a pen motion detection device 810A.

The pen motion detection device 810 A, disposed in the vicinity of the display 800A, detects coordinate information indicating a point indicated by the electronic pen 820A on the display 800A, and transmits the detected coordinate information to the terminal device 600. In an example case of FIG. 37, the electronic pen 820A may be charged using the terminal device 600 via a universal serial bus (USB) connector.

The terminal device 600 generates image data of the stroke image input by the electronic pen 820A based on the coordinate information received from the pen motion detection device 810A, and displays the image data on the display 800A.

Alternative Example 4: Configuration of Display Apparatus

Figure 38:
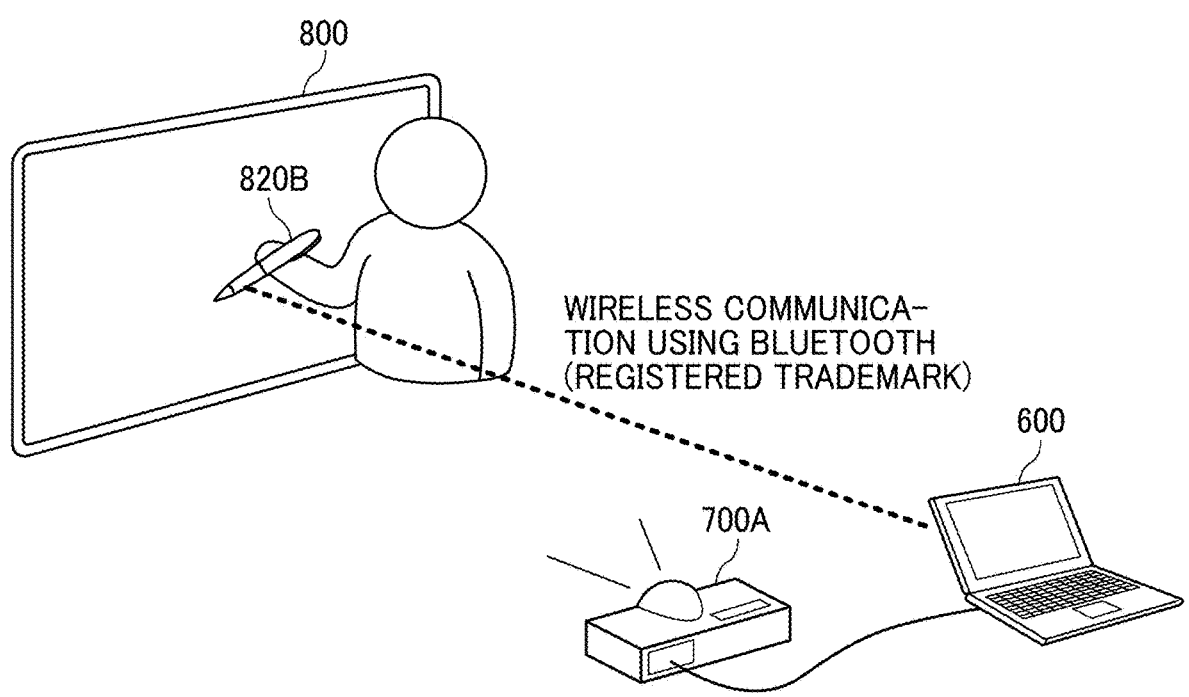
FIG. 38 is another example of configuration of a display apparatus according to an embodiment 7.

FIG. 38 is another example of configuration of the display apparatus of the embodiment 7. In an example case of FIG. 38, the display apparatus includes, for example, a terminal device 600, and an image projection apparatus 700A.

The terminal device 600 performs wireless communication, such as Bluetooth (registered trademark), with an electronic pen 820B, and receives coordinate information of a point indicated by the electronic pen 820B on a screen 800. Then, the terminal device 600 generates image data of stroke image input by the electronic pen 820B based on the received coordinate information, and projects the stroke image using an image projection apparatus 700A.

Further, the terminal device 600 generates superimposed image data representing an image superimposing the background image projected onto the image projection apparatus 700A and the stroke image input by the electronic pen 820B.

As described above, each of the above described embodiments may be applied to a variety of system configurations.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

For example, in the above-described embodiments, the display apparatus that can be used as an electronic information board is described, but the display apparatus may be any apparatus that can display an image, such as, digital signage or the like.

In the above-described embodiments, an electronic information board is described as an example, but an information processing apparatus having a touch panel can be applied for the above-described embodiments. Apparatuses or devices having similar functions of the electronic information board are also referred to as electronic blackboard, electronic information board, interactive board, or the like. The information processing apparatus equipped with the touch panel may include, for example, an output device such as projector (PJ), digital signage, head-up display (HUD) device, industrial machine, imaging device, audio collection device, medical device, network appliance, note personal computer (PC), cellular phone, smart phone, tablet terminal, game device, personal digital assistant (PDA), digital camera, wearable PC, and desktop PC.

In the above-described embodiments, the coordinates of pen are detected by a method of detecting the coordinates of the pen end on the touch panel, but the coordinates of the pen end may be detected using the ultrasonic wave. In this case, the pen outputs ultrasonic waves together with the light emission, and the display apparatus 2 calculates the distance based on the arrival time of ultrasonic waves. The position of the electronic pen 2501 can be determined by the direction and calculated distance. The projector draws (projects) a trace of the pen as a stroke.

In the conventional technologies, the presented data cannot be displayed unless the environment necessary for the user authentication is constructed. The user authentication may require a server that performs the user authentication. However, installing the server used for the user authentication is burdensome for users who use the display apparatuses on a stand-alone basis. Further, even if the display apparatus is configured to perform the user authentication, administrators have to register user information used for the user authentication, which is burdensome for the administrators.

As to the above described embodiment, a display apparatus that can display presented data without performing the user authentication is provided.

Further, the example configuration illustrated in FIG. 6 is divided according to the main functions in order to facilitate the understanding of the processing by the display apparatus 2. This disclosure is not limited by the method and name of the division of the processing unit. The processing performed by the display apparatus 2 may be divided into more processing units in accordance with the processing contents. Further, the processing performed by the display apparatus 2 may be divided into more processing units by including more processing in one processing unit.

Further, each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. A display apparatus capable of displaying previously-displayed presented data stored in association with meeting identification information identifying each meeting, the display apparatus comprising:

circuitry configured to receive particular meeting indentification information stored at an information processing apparatus from the information processing apparatus; and display at least a part of particular presented data associated with the received particular meeting indentification information, on a display.

2. The display apparatus of claim 1, wherein the circuitry generates new meeting identification information, wherein the circuitry transmits the generated new meeting indentification information to the information processing apparatus, and causes the information processing apparatus to store the new meeting indeitification information.

3. The display apparatus of claim 1, wherein the meeting indentification information is a meeting identifier (ID) identifying each meeting.

4. The display apparatus of claim 1, wherein the meeting indentification information is a meeting name, wherein the circuitry displays an input screen of meeting name, on the display, wherein the circuitry transmits a particular meeting name input on the input screen to the information processing apparatus, and causes the information processing apparatus to store the particular meeting name, wherein in response to receiving the particular meeting name stored in the information processing apparatus from the information processing apparatus, the circuitry displays at least a part of particular presented data associated with the particular meeting name, on the display.

5. The display apparatus of claim 1, wherein the meeting indentification information is a meeting identifier (ID) identifying each meeting, and a meeting room identifier (ID) identifying each meeting room, wherein in response to receiving a particular meeting (D and a particular meeting room ID stored at the information processing apparatus, from the information processing apparatus, the circuitry displays at least a part of particular presented data associated with the particular meeting ID and the particular meeting room ID, on the display.

6. The display apparatus of claim 5, wherein in response to receiving a plurality of pairs of the meeting ID and the meeting room ID from the information processing apparatus, the circuitry displays the plurality of pairs of the meeting ID and the meeting room ID, on the display, and the circuitry displays the particular presented data associated with the particular meeting ID and the particular meeting room ID selected by a user, on the display.

7. The display apparatus of claim 1, wherein the meeting indentification information is a meeting identifier (ID) identifying each meeting and a user identifier (ID) identifying each user, wherein in response to receiving a particular meeting ID stored in the information processing apparatus and a particular user ID stored in the information processing apparatus in advance, the circuitry displays a list of particular presented data associated with the particular meeting ID and the particular user ID, on the display, and the circuitry displays one presented data selected from the list of the particular presented data by a user, on the display.

8. The display apparatus of claim 1, wherein the meeting identification information is a meeting identifier (ID) and a meeting date of each meeting, wherein in response to receiving a particular meeting ID stored at the information processing apparatus from the information processing apparatus, the circuitry determines whether or not particular presented data associated with the particular meeting ID exists, wherein when the particular presented data associated with the particular meeting ID exists, the circuitry displays an input screen of a range of meeting date, the circuitry displays a list of the particular presented data associated with the particular meeting ID and corresponding to a specific range of meeting date input by using the input screen, and then the circuitry displays one presented data selected from the list of the particular presented data by a user.

9. The display apparatus of claim 1, wherein the meeting identification information is a meeting identifier (ID) and a meeting date of each meeting, wherein in response to receiving a particular meeting ID and a particular meeting date stored at the information processing apparatus from the information processing apparatus, the circuitry displays particular presented data associated with the particular meeting ID and having a meeting date matching the particular meeting date received from the information processing apparatus as a list of the particular presented data, on the display, and then the circuitry displays one presented data selected from the list of the particular presented data by a user, on the display.

10. The display of claim 1, wherein the display apparatus is capable of communication with a data server via a network, wherein the circuitry transmits the meeting indentification information and the presented data to the data server, wherein in response to receiving particular meeting indentification information from the information processing apparatus, the circuitry transmits the particular meeting identification information to the data server to acquire the particular presented data associated with the particular meeting identification information from the data server, and then the circuitry displays at least a part of the particular presented data, on the display.

11. The display apparatus of claim 10, wherein in response to receiving the particular meeting indentification information having a value of zero from the information processing apparatus, the circuitry transmits a generation request of new meeting indentification information to the data server to acquire the new meeting identification information from the data server, and transmits the new meeting identification information and the particular presented data to the data server, wherein in response to receiving the particular meeting indentification information having a value of not zero from the information processing apparatus, the circuitry transmits the particular meeting indentification information received from the information processing apparatus to the data server to acquire the particular presented data associated with the particular meeting indentification information from the data server.

12. A method of displaying previously-displayed presented data stored in association with meeting identification information identifying each meeting, the method comprising:

receiving particular meeting identification information stored at an information processing apparatus from the information processing apparatus; and displaying at least a part of particular presented data associated with the received particular meeting identification, on a display.

13. An image processing system comprising:

an information processing apparatus configured to store meeting identification information identifying each meeting; and a display apparatus configured to store presented data, displayed on the display apparatus, in association with the meeting identification information, the information processing apparatus includes a memory that stores the meeting identification information transmitted from the display apparatus, the display apparatus includes circuitry configured to receive particular meeting identification information stored at the information processing apparatus from the information processing apparatus; and display at least a part of particular presented data associated with the received particular meeting identification information, on a display.

* * * * *